US012737871B2

(12) United States Patent
Shapiro et al.

(10) Patent No.: US 12,737,871 B2
(45) Date of Patent: Sep. 15, 2026

(54) EDGE DETECTION FOR COMPUTER NUMERICALLY CONTROLLED FABRICATION

(71) Applicant: MAKEBLOCK HONGKONG HOLDING LIMITED, Hong Kong (CN)

(72) Inventors: Daniel Shapiro, Mercer Island, WA (US); Mark Gosselin, Seattle, WA (US); Therese Seldon, Seattle, WA (US); Kevin McVey, Seattle, WA (US); Penelope Ackerman, Seattle, WA (US); Michael Natkin, Seattle, WA (US); Bonny P. Lau, Seattle, WA (US); Jonathan Daniel Park, Seattle, WA (US); Daniel Martinec, Kirkland, WA (US)

(73) Assignee: MAKEBLOCK HONGKONG HOLDING LIMITED, Hongkong (CN)

( * ) Notice: Subject to any disclaimer, the term of this patent is extended or adjusted under 35 U.S.C. 154(b) by 468 days.

(21) Appl. No.: 17/668,988

(22) Filed: Feb. 10, 2022

(65) Prior Publication Data

US 2023/0029940 A1 Feb. 2, 2023

Related U.S. Application Data

(60) Provisional application No. 63/227,479, filed on Jul. 30, 2021.

(51) Int. Cl.
*G06K 9/00* (2022.01)
*G06T 7/00* (2017.01)
(Continued)

(52) U.S. Cl.
CPC .............. *G06T 7/0006* (2013.01); *G06T 7/13* (2017.01); *G06T 7/20* (2013.01)

(58) Field of Classification Search
CPC ......... B22F 12/90; G06T 7/13; G06T 7/0006; G06T 7/20; G06T 2207/30136; G06T 7/62; G05B 19/4099; B23K 26/36
See application file for complete search history.

(56) References Cited

U.S. PATENT DOCUMENTS

2015/0091215 A1* 4/2015 Reetz .................. B23K 26/046 264/400
2018/0150058 A1* 5/2018 Shapiro .................... G06T 7/40
(Continued)

FOREIGN PATENT DOCUMENTS

CN 208276343 U 12/2018
CN 109146781 A 1/2019
(Continued)

OTHER PUBLICATIONS

Dalalah, Doraid, Samir Khrais, and Khaled Bataineh. "Waste minimization in irregular stock cutting." Journal of Manufacturing Systems 33.1 (2014): 27-40. (Year: 2014).*
(Continued)

*Primary Examiner* — Gregory A Morse
*Assistant Examiner* — Owais Iqbal Memon
(74) *Attorney, Agent, or Firm* — PV IP PC; Wei Te Chung

(57) ABSTRACT

Systems and methods disclosed herein include one or more computing devices configured to obtain one or more images of a material that has been placed at least partially within a CNC machine, where the one or more images are captured via one or more sensors associated with the CNC machine, determine one or more edges of the material based on the one or more images of the material, and determine whether
(Continued)

the material can accommodate one or more placements of a design on the material based at least in part on the one or more edges of the material. Some embodiments additionally or alternatively include determining one or more material margins based on the one or more material edges, and determining whether the material can accommodate one or more placements of a design on the material based at least in part on the one or more material margins.

18 Claims, 25 Drawing Sheets

(51) Int. Cl.
*G06T 7/13* (2017.01)
*G06T 7/20* (2017.01)

(56) References Cited

U.S. PATENT DOCUMENTS

| | | | | |
|---|---|---|---|---|
| 2021/0121985 | A1 | 4/2021 | Rubens et al. | |
| 2021/0237205 | A1 | 8/2021 | Lie | |
| 2021/0308787 | A1* | 10/2021 | Kiefer | G06T 7/13 |

FOREIGN PATENT DOCUMENTS

| | | | |
|---|---|---|---|
| CN | 210651907 U | | 6/2020 |
| CN | 109048072 B | | 7/2020 |
| CN | 111515523 A | | 8/2020 |
| CN | 113971661 A | | 1/2022 |
| CN | 215846437 U | | 2/2022 |
| CN | 108846819 A | | 5/2022 |
| JP | 2013039591 A | * | 2/2013 |

OTHER PUBLICATIONS

Ma, Heng, and Chia-Cheng Liu. "Fast nesting of 2-D sheet parts with arbitrary shapes using a greedy method and semi-discrete representations." IEEE Transactions on Automation Science and Engineering 4.2 (2007): 273-282. (Year: 2007).*

Koo, Bongjin, et al. "Towards zero-waste furniture design." IEEE transactions on visualization and computer graphics 23.12 (2016): 2627-2640. (Year: 2016).*

Saakes, Daniel, et al. "PacCAM: material capture and interactive 2D packing for efficient material usage on CNC cutting machines." Proceedings of the 26th annual ACM symposium on User interface software and technology. 2013. (Year: 2013).*

PacCAM: Material Capture and Interactive 2D Packing for Efficient Material Usage on CNC Cutting Machines, dated Oct. 2013 (6 pages).

* cited by examiner

1300

1302 OBTAIN ONE OR MORE IMAGES OF A MATERIAL THAT HAS BEEN PLACED AT LEAST PARTIALLY WITHIN A CNC MACHINE

1304 DETERMINE ONE OR MORE EDGES OF THE MATERIAL BASED ON THE ONE OR MORE IMAGES OF THE MATERIAL

1306 DETERMINE ONE OR MORE MATERIAL MARGINS BASED ON THE MATERIAL AND THE ONE OR MORE EDGES OF THE MATERIAL

1308 CAN THE MATERIAL ACCOMMODATE THE FIRST PLACEMENT OF THE DESIGN ON THE MATERIAL BASED AT LEAST IN PART ON THE ONE OR MORE MATERIAL MARGINS?

YES

NO

1310 CAUSE DISPLAY OF THE FIRST PLACEMENT OF THE DESIGN ON A REPRESENTATION OF THE MATERIAL WITHIN A GRAPHICAL USER INTERFACE, WHEREIN THE REPRESENTATION OF THE MATERIAL COMPRISES (A) AT LEAST ONE IMAGE OF THE MATERIAL AND (B) AN INDICATION OF AT LEAST ONE OF THE ONE OR MORE MATERIAL MARGINS

1312 CAN THE MATERIAL ACCOMMODATE A SECOND PLACEMENT OF THE DESIGN ON THE MATERIAL BASED AT LEAST IN PART ON THE ONE OR MORE MATERIAL MARGINS?

YES

1314 CAUSE DISPLAY OF THE SECOND PLACEMENT OF THE DESIGN ON A REPRESENTATION OF THE MATERIAL WITHIN THE GRAPHICAL USER INTERFACE, WHEREIN THE REPRESENTATION OF THE MATERIAL COMPRISES (A) AT LEAST ONE IMAGE OF THE MATERIAL AND (B) AN INDICATION OF AT LEAST ONE OF THE ONE OR MORE MATERIAL MARGINS

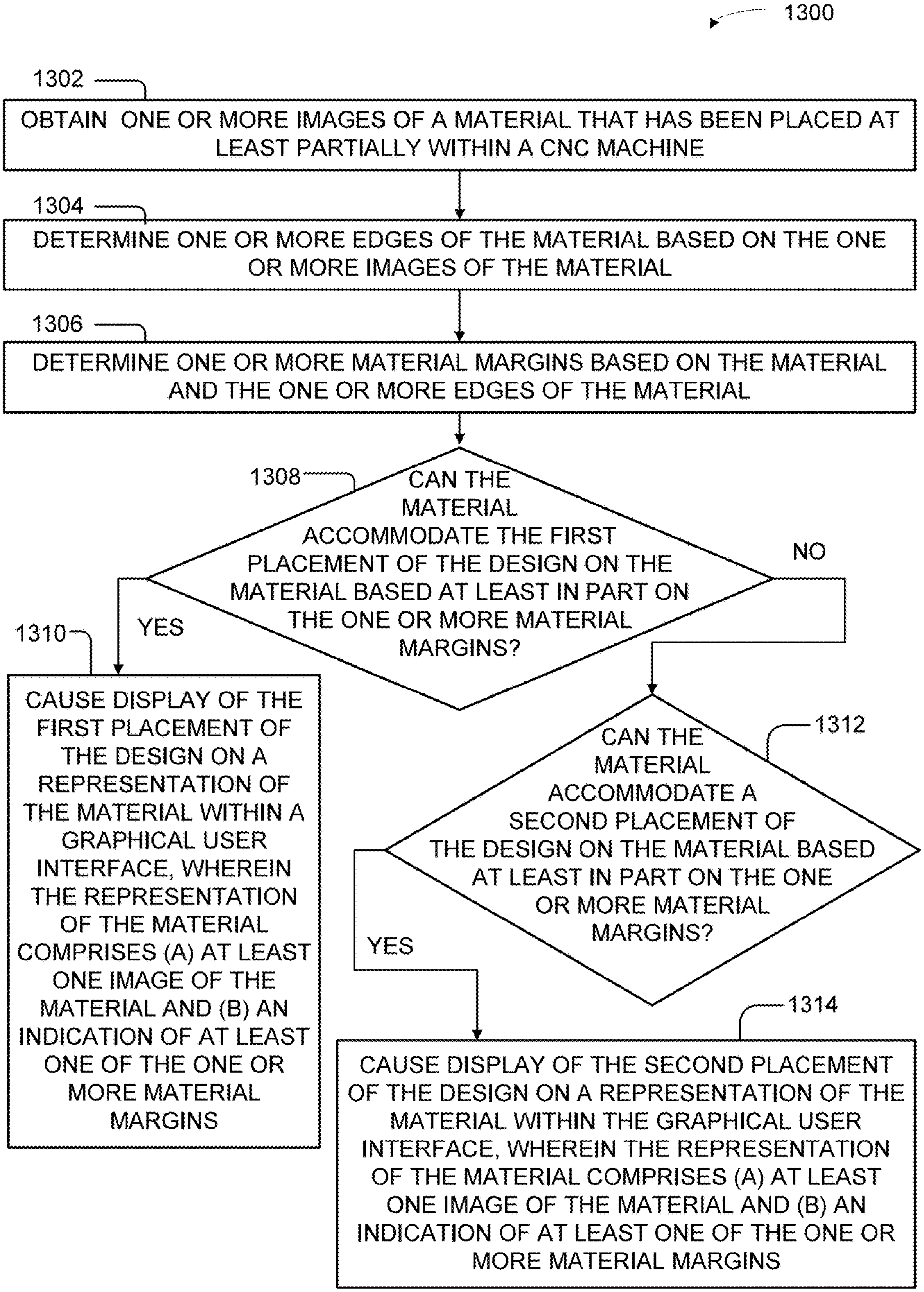

FIG. 13

EDGE DETECTION FOR COMPUTER NUMERICALLY CONTROLLED FABRICATION

CROSS-REFERENCE TO RELATED APPLICATIONS

This application claims priority to U.S. Provisional App. No. 63/227,479 titled "Edge Detection for Computer Numerically Controlled Fabrication," filed on Jul. 30, 2021. The entire contents of App. No. 63/227,479 are incorporated herein by reference.

FIELD OF THE DISCLOSURE

The subject matter described herein relates generally to computer numerically controlled fabrication and more specifically to various techniques associated with material edge detection.

BACKGROUND

Computer controlled manufacturing systems, such as "3-D printers," laser cutter/engravers, computer numerically controlled milling machines, and the like, can be used to fabricate complicated objects where traditional manufacturing techniques like moldings or manual assembly fail. Such automated methods operate based on instructions that specify the cuts, engravings, patterns, and other actions to be performed by a Computer Numerical Control (CNC) machine. The instructions implemented by the CNC machine to process materials can be in the form of computer files transferred to the memory of a computer controller for the CNC machine and interpreted at run-time to provide a series of steps in the manufacturing process.

SUMMARY

Systems, methods, and articles of manufacture, including apparatuses, are provided for computer numerically controlled fabrication aided with edge detection individually or in combination with material margin detection. In one aspect, there is provided a method that includes: detecting, by a controller, one or more edges of a material disposed at least partially inside a computer numerically controlled machine; determining, by the controller, based at least on the one or more edges of the material, a first placement of a first design on the material; and generating by the controller, a feedback corresponding to a difference between the first placement of the first design and a second placement of the first design on the material.

In some variations, one or more features disclosed herein including the following features can optionally be included in any feasible combination. The method may further include: capturing, by one or more cameras at the computer numerically controlled machine, one or more images of the material; and detecting, based at least on a contrast in the one or more images of the material, the one or more edges.

In some variations, the one or more images include a first image captured by a first camera mounted to a lid of the computer numerically controlled machine. The one or more images may further include a second image captured by a second camera mounted to a head of the computer numerically controlled machine. The second image may be captured by moving the head to a location determined based at least on the first image.

In some variations, the one or more edges may be detected based at least on a first pattern present on the material and/or a second pattern present in a working area of the computer numerically controlled machine.

In some variations, the one or more edges may be detected based at least on a height and/or a thickness of the material.

In some variations, the first placement of the first design may include the first design being placed within the one or more edges of the material and/or a material margin defined relative to the one or more edges of the material.

In some variations, the first placement of the first design may include packing the first design to maximize a quantity of designs that the material is able to accommodate and/or to minimize a quantity of unused material between two or more adjacent designs.

In some variations, the first placement of the first design may exclude placing the first design in one or more portions of the material having one or more features. The one or more features may include a cut, a score, an engraving, or a natural variation present in the material.

In some variations, the method may further include: upon determining that the material is unable to accommodate the first design in its entirety, splitting, by the controller, the first design along one or more edges of the material; and generating the feedback to further include a recommendation to place a remaining portion of the first design on a different piece of material.

In some variations, the feedback may include an alert when the controller detects an above-threshold difference between the second placement of the first design and the first placement of the first design.

In some variations, the feedback may include a change in a perceived physical property of the first design and/or the material. The change in the perceived physical property may be proportional to the difference between the second placement of the first design and the first placement of the first design.

In some variations, the perceived physical property may include a density, a drag, a weight, a velocity, and/or a friction.

In some variations, the feedback may include a perceived attractive force between the first design and a second design placed on the material.

In some variations, the feedback may include a first portion of the material that is consistent with the first placement exhibiting a greater perceived attractive force to the first design than a second portion of the material that is inconsistent with the first placement.

In some variations, the feedback may include one or more indicators corresponding to a first material use efficiency associated with the first placement of the first design and/or a second material use efficiency associated with the second placement of the first design.

In some variations, the feedback may include an automatic repositioning of the first design to minimize the difference between the first placement of the first design and the second placement of the first design.

In some variations, the method may further include generating a preview of the first placement of the first design and/or the second placement of the first design.

In some variations, the preview may include an outline of the one or more edges of the material and/or a three-dimensional simulation of the material disposed on the material bed.

In some variations, the method may further include receiving one or more user inputs corresponding to the second placement of the first design.

In some variations, the method may further include: identifying, based at least on the one or more edges of the material, the first design from a plurality of pre-existing designs as being capable of being fit on the material; and generating, by the controller, a recommendation to use the first design for the material.

In some variations, the method may further include: generating, by the controller, an alert upon detecting an available quantity of the material being below a threshold level and/or insufficient for completing a project associated with the first design.

In another aspect, there is provided a method that includes: detecting, by a controller, one or more edges of a material disposed at least partially inside a computer numerically controlled machine; generating, by the controller, a preview of the material displaying the one or more edges of the material; receiving one or more user inputs indicating a placement of a design on the material; and updating, by the controller, the preview of the material to display the placement of the design relative to the one or more edges of the material.

In another aspect, there is provided a method that includes: detecting, by a controller, an openable barrier of a computer numerically controlled machine being transitioned to a closed position; upon detecting the openable barrier being transitioned to the closed position, detecting, by the controller, one or more edges of a material disposed at least partially inside the computer numerically controlled machine; and performing, by the controller, a calibration of the computer numerically controlled machine, the calibration being performed based on the one or more edges of the material to avoid performing the calibration outside of the one or more edges of the material where the material is absent.

In some variations, one or more features disclosed herein including the following features can optionally be included in any feasible combination. The calibration may include an autofocus to adjust the focal point of electromagnetic energy (e.g., focus the laser power) applied to the surface of the material and/or calibrate the power of the electromagnetic energy delivered to the material by the computer numerically controlled machine.

In some variations, the calibration may include a scan to detect one or more variations in a height and/or a thickness of the material.

In another aspect, there is provided a method that includes: detecting, by a controller, a first edge on a first side of a material disposed at least partially inside a computer numerically controlled machine, the material having been processed by the computer numerically controlled machine to effect a design on the first side of the material; determining, by the controller, based at least on the first edge, a transform describing a rotation of the material; applying the transform to the design to determine a placement of the design on the second side of the material such that the design on the second side of the material is aligned with the design on the first side of the material; and after detecting the second side of the material, processing, based at least on the determined placement, the design on the second side of the material.

In another aspect, there is provided a method that includes: detecting, by a controller, one or more edges of a material disposed at least partially within a computer numerically controlled machine, the material having been processed to effect a first design in the material; identifying, by the controller, based at least on the one or more edges, an unused portion of the material; updating, by the controller, a database to include one or more indications of the unused portion of the material; after receiving, by the controller, a second design, querying the database to identify the unused portion of the material as capable of accommodating the second design; and generating, by the controller, a recommendation to use the unused portion of the material for the second design.

Further aspects of the disclosed embodiments include a CNC machine and/or a controller or other computing system configured to control or otherwise operate the CNC machine configured to perform functions comprising: (i) obtaining one or more images of a material that has been placed at least partially within a CNC machine, where the one or more images are captured via one or more sensors associated with the CNC machine; (ii) determining one or more edges of the material based on the one or more images of the material; and (iii) determining whether the material can accommodate a first placement of a design on the material based at least in part on the one or more edges of the material.

When the material can accommodate the first placement of the design on the material, the functions further include causing display of the first placement of the design on a representation of the material via a graphical user interface, where the representation of the material comprises (a) at least one image of the material and (b) an indication of at least one of the one or more edges of the material.

When the material cannot accommodate the first placement of the design on the material, the functions further include determining whether the material can accommodate a second placement of the design on the material based at least in part on the one or more edges of the material. And when the material can accommodate the second placement of the design on the material based at least in part on the one or more edges of the material, the functions further include causing display of the second placement of the design on a representation of the material via the graphical user interface, wherein the representation of the material comprises (a) at least one image of the material and (b) an indication of at least one of the one or more edges of the material.

When the material cannot accommodate any placement of the design on the material based at least in part on the one or more edges of the material, some embodiments additionally include causing display of a notification via the graphical user interface that the material cannot accommodate the design. When the material cannot accommodate any placement of the design on the material based at least in part on the one or more edges of the material, some embodiments additionally or alternatively include providing a suggestion (e.g., via the graphical user interface) to at least one of (i) alter the design (e.g., change the scale of the design to make the design smaller) and/or (ii) use an alternative material for the design. In some embodiments, the suggestion to use the alternative material includes displaying a set (e.g., a list) of known material and/or suggesting one or more materials from the set of known materials.

In some embodiments, the functions additionally include determining one or more material margins based on the material and the one or more edges of the material. As explained in more detail herein, a material margin refers to an area of the material where processing by the CNC machine is not recommended or perhaps even prohibited. In some embodiments, margins may be implemented as one or more processing rules (e.g., processing is prevented from taking place within the margins) or as one or more processing guidelines (e.g., feedback provided to a user may discourage the user from placing a design within the margins margins). In practice, margins may be user defined and/or determined by a controller application based on the type of the material to be processed, the type of processing operation to be performed by the CNC machine (e.g., cut, score, engrave, and/or the like) to achieve the design, and/or the presence of previous designs (e.g., to avoid cuts and/or other artifacts from a previous operations). In some instances, the margins may be displayed as part of the preview in a graphical user interface to help avoid the placement of designs beyond the margins.

In embodiments that additionally include determining one or more material margins based on the material and the one or more edges of the material, the process of determining one or more material margins based on the material and the one or more edges of the material includes determining the one or more material margins based on at least one of (i) a physical characteristic of the material, (ii) a type of operation to be performed on the material, or (iii) a user input associated with at least one material margin.

Additionally, in some embodiments that include determining one or more material margins based on the material and the one or more edges of the material, the process of determining whether the material can accommodate a first placement of a design on the material includes determining whether the material can accommodate the first placement of the design on the material based at least in part on the one or more material margins.

When the material can accommodate the first placement of the design on the material based at least in part on the one or more material margins, the functions additionally include causing display of the first placement of the design on a representation of the material via the graphical user interface, where the representation of the material includes (a) at least one image of the material and (b) an indication of one or both of (i) at least one of the one or more edges of the material and/or (ii) at least one of the one or more material margins.

When the material cannot accommodate the first placement of the design on the material based at least in part on the one or more material margins, the functions additionally include determining whether the material can accommodate a second placement of the design on the material based at least in part on the one or more material margins.

When the material can accommodate the second placement of the design on the material based at least in part on the one or more material margins, the functions additionally include causing display of the second placement of the design on a representation of the material via the graphical user interface, where the representation of the material includes (a) at least one image of the material and (b) an indication of one or both of (i) at least one of the one or more edges of the material and/or (ii) at least one of the one or more material margins.

And when the material cannot accommodate any placement of the design on the material based on the one or more material margins, some embodiments additionally include causing display of a notification via the graphical user interface that the material cannot accommodate the design.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, a connection over a network (e.g. the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to performing material edge detection to aid automated manufacturing processes such as a computer numerically controlled fabrication process, it should be readily understood that such features are not intended to be limiting.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 13 depicts a flowchart illustrating aspects of an example method involving edge detection and material margin detection according to some embodiments When practical, similar reference numbers denote similar structures, features, or elements.

DETAILED DESCRIPTION

Figure 1A:
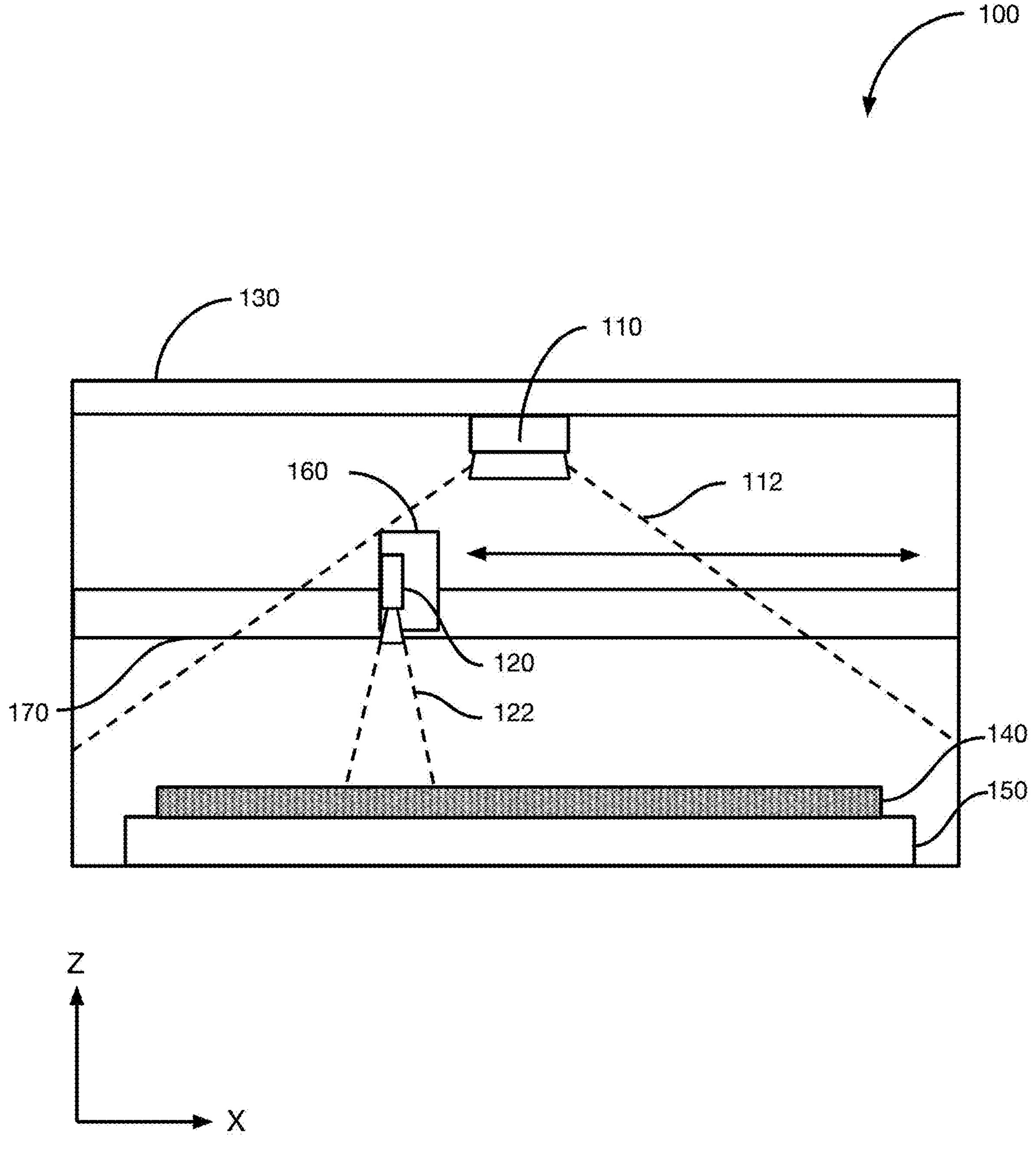
FIG. 1A depicts an elevational view of an example of a computer numerically controlled machine consistent with some implementations of the current subject matter.

A computer numerically controlled machine may effect, in a material, one or more changes (e.g., cuts, scores, engravings, and/or the like) corresponding to one or more user-specified designs. With subtractive manufacturing, the computer numerically controlled machine may achieve the intended final appearance of the material by removing portions of the material. However, the material may exhibit certain features and characteristics that prevent the designs from being placed anywhere on the material. For example, non-uniform and/or non-ideal portions of the material (e.g., voids, defects, and/or the like) may be unsuitable for the designs. The size, shape, and/or contours of the material may render the material (or portions of the material) unsuitable for the designs. In some cases, the material may be disposed at a suboptimal position where the computer numerically controlled machine is unable to process at least a portion of the material. Thus, the process of converting the user-specified design into a motion plan controlling the corresponding actions of the computer numerically controlled machine may include adapting the motion to the properties of the material. A "motion plan" contains the data that determines the actions of components of the CNC machine at different points in time. The motion plan may be generated on the CNC machine itself or at least partially on another computing system. The motion plan may include a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, the motion plan may be defined by the presence of a temporal element, either explicit or inferred, indicating the time or time offset at which each action should occur. This allows for one of the key functions of a motion plan, coordinated motion, wherein multiple actuators coordinate to have a single, pre-planned affect. For example, in some implementations of the current subject matter, various features and characteristics of the material may be identified in order to determine one or more optimal regions of the material for placing the user-specified designs, and for controlling a motion plan for implementing a design on the material.

Precise and detailed information regarding various features and characteristics of a material may be required in order for the computer numerically controlled machine to process the material such that the final appearance of the material is consistent with an intended final appearance of the material. Such information may also increase the efficiency of the material processing including by minimizing scrap material and maximizing output. The availability of information on the features and characteristics of the material may be crucial for decentralized small-scale manufacturing, where the degree of user skill is typically low and batch sizes are relatively small (e.g., fabricating a single item for home use or producing several hundred (or low thousands) of an item for a small business operation). The technical and economic advantages that increase the robustness and reliability of commercial-scale production are not practical or accessible to more decentralized, modest-scale productions for at-home hobbyists and small businesses. This deficiency limits the appeal and ease of use as well as increases costs associated with decentralized, modest-scale manufacturing. Thus, the efficiency of the computer numerically controlled fabrication and the quality of the output may be improved if more information on the features and characteristics of the material are incorporated into the manufacturing process without requiring skilled professionals to assist in the design and manufacturing process. Obviating specialty knowledge from the manufacturing process may increase the appeal and adoption of computer numerically controlled fabrication for decentralized, modest-scale manufacturing activities.

In some implementations of the current subject matter, various techniques may be applied in order to identify one or more features and characteristics of the material (e.g., the material edges and/or material margins) for processing by a computer numerically controlled machine. The computer numerically controlled machine may include a source configured to emit electromagnetic energy, for example, in the form of a laser. Electromagnetic energy from the source may be routed to a head configured to deliver the electromagnetic energy to a destination such as, for example, a portion of the material disposed on top of a material bed and positioned in a working area defined by limits within which the head is commanded to cause delivery of the electromagnetic energy. Moreover, the working area may be inside an interior space of the computer numerically controlled machine, which may be defined by a housing including an openable barrier, for example, a lid, a door, a hatch, a flap, and/or the like, that attenuates the transmission of electromagnetic energy between the interior space and an exterior of the computer numerically controlled machine when the openable barrier is in a closed position.

In some implementations of the current subject matter, edge detection may be performed in order to detect one or more edges of the material. For example, edge detection may include detecting a transition from a presence of the material to an absence of the material and/or a presence of a different material. Thus, it should be appreciated that an edge may be present not only around an outer perimeter of the material but also in areas where portions of the material are absent due to a hole or cutout in material, a natural cut feature of material, and/or the like. One or more edges may also be present in the material due to the presence of another material, which may be the case when the material is a mixed material that combines multiple materials. An edge may also be present when the material is partially obscured by another material not intended for processing such as one or more weights, stickers, magnets, pins, tape, and/or the like.

Identifying one or more edges of the material may enable the placement of one or more designs on the material. For example, the electromagnetic energy delivered by the computer numerically controlled machine may go beyond the edges of the material when designs are placed too close to, or beyond, the edges of the material. The material may also be more likely to catch fire when electromagnetic energy is delivered too close to the edge of the material. As such, a design may be placed on a material, based at least on the location of the one or more edges of the material, to avoid exceeding the one or more edges and/or a margin defined relative to the one or more edges. Alternatively and/or additionally, the design may be placed relative to the one or more edges, which may include being centered, parallel, adjacent, and/or packed with respect to the one or more edges. In cases where the design is too large for the material, the design may be split along one or more edges of the material and a recommendation may be provided to place the remaining portion of the design on a different piece of material.

In some implementations of the current subject matter, feedback may be provided to discourage an incorrect design placement relative to the one or more edges. Example feedback may include an alert, an automatic re-positioning of the design, and a modification of the interaction model presented via a user interface (e.g., a graphical user interface and/or the like). In some cases, the modification of the interaction model presented in a user interface may include a change in a perceived density, drag, weight, velocity, and/or friction of the design and/or the material to encourage the design from being placed in a suboptimal location, for example, too close to one or more edges of the material.

In some implementations of the current subject matter, edge detection, including the identification of shapes and/or visually distinct patterns that may be present along one or more edges of the material, may enable the precise placement of a design that spans multiple sides of the material. Precision in design placement and in the processing of the material to effect the corresponding changes may be critical in order for a portion of the design on one side of the material to join seamlessly with another portion of the design on a different side of the material. Nevertheless, processing multiple sides of the material, such as opposite sides of the material, may be desirable and even necessary under a variety of circumstances. For example, both sides of the material may be processed in order to achieve a double-sided design. Alternatively and/or additionally, for material that is too thick to cut through with a single pass from one side, the computer numerically controlled machine may effect a first partial cut through one side of the material before effecting, on an opposite side of the material, a second partial cut that meets the first partial cut. In some cases, opposite sides of the material may be engraved in order to avoid the char associated with engraving only a single side of the material.

In some implementations of the current subject matter, edge detection may be performed automatically, for example, upon detecting that an openable barrier of the computer numerically controlled machine is in the closed position. Doing so may increase the speed, accuracy, and computational efficiency of the computer numerically controlled processing workflow including various types of calibration including, for example, the detection of the height and/or variations in the height (and/or thickness) of the material, and/or the like. For example, recognizing the bounds of the material may expedite calibration of the computer numerically controlled machine at least because calibration may be performed only in areas where the material is present while avoiding areas where the material is not present. Otherwise, calibration may rely on the placement of one or more designs on the material, which may result in an incorrect outcome if the designs are placed beyond the one or more edges of the material.

In some implementations of the current subject matter, edge detection may be performed in order to locate, on the material, one or more identifiers conveying information associated with the material. For example, the one or more identifiers may include a Quick Response (QR) code, a stock keeping unit (SKU) code, a barcode, and/or the like that enable a determination of one or more characteristics of the material. In cases where the identifier is disposed within a threshold distance relative to an edge of the material, the search for the identifier may be narrowed based on identifying the one or more edges of the material and limiting the search to within the threshold distance relative to the one or more edges of the material.

In some implementations edge detection may be performed using one or more markings that are patterned across the material, in which case at least some portions of the material including one or more edges may be identified based on the one or more markings. For a mixed material that combines, for example, a first material and a second material, a first identifier may be patterned over the first material while a second identifier may be patterned over the second material to enable a differentiation between the first material and the second material including one or more boundaries between the first material and the second material. Alternatively and/or additionally, the orientation of the one or more markings that are patterned across the material may be used for edge detection for a mixed material.

As used herein, the term “cutting” can generally refer to altering the appearance, properties, and/or state of a material. Cutting can include, for example, making a through-cut, engraving, bleaching, curing, burning, etc. Engraving, when specifically referred to herein, indicates a process by which a computer numerically controlled machine modifies the appearance of the material without fully penetrating it. For example, in the context of a laser cutter, it can mean removing some of the material from the surface and/or discoloring the material (e.g. through an application of focused electromagnetic energy delivering electromagnetic energy as described below).

As used herein, the term “laser” includes any electromagnetic energy or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, “cameras” includes, for example, visible light cameras, black and white cameras, IR or UV sensitive cameras, individual brightness sensors such as photodiodes, sensitive photon detectors such as a photomultiplier tube or avalanche photodiodes, detectors of infrared energy far from the visible spectrum such as microwaves, X-rays, or gamma rays, optically filtered detectors, spectrometers, and other detectors that can include sources providing electromagnetic energy for illumination to assist with acquisition, for example, flashes, UV lighting, etc.

Also, as used herein, reference to “real-time” actions includes some degree of delay or latency, either programmed intentionally into the actions or as a result of the limitations of machine response and/or data transmission. “Real-time” actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term “material” is the material that is on the bed of the computer numerically controlled machine. For example, if the computer numerically controlled machine is a laser cutter, the material is what is placed in the computer numerically controlled machine to be cut, for example, the raw materials, stock, or the like. The computer numerically controlled (CNC) machine may be a machine that is used to perform subtractive processing (e.g., by removing the material) under the control of a computer, in which case the computer numerically controlled machine may include one or more motors (or other actuators) that move one or more heads performing the removal of the material.

As used herein, the terms “render” or “rendering” generally refer to the action of displaying an image or other representation on a screen or display device, emitting an auditory sound or signal or series of sounds and/or signals, recreating a physical embodiment of an object or a creative work, printing a document, or the like. A rendering machine may include, for example, a printer, a three-dimensional (3D) printer, a computer numerically controlled (CNC) machine, a display screen, an audio device, a personal computing device, a fabricator, or other similar device capable of rendering an object or signal as previously described.

As used herein the terms “fabricating” and/or “printing” generally refer to altering the appearance, properties, and/or state of a material, and can include, for example, making a through-cut, engraving, bleaching, curing, burning, etc. Engraving, when specifically referred to herein, indicates a process by which a computer numerically controlled machine modifies the appearance of the material without fully penetrating it. For example, in the context of a laser cutter, it can mean removing some of the material from the surface, or discoloring the material e.g., through an application of focused electromagnetic energy delivering electromagnetic energy.

Figure 1B:
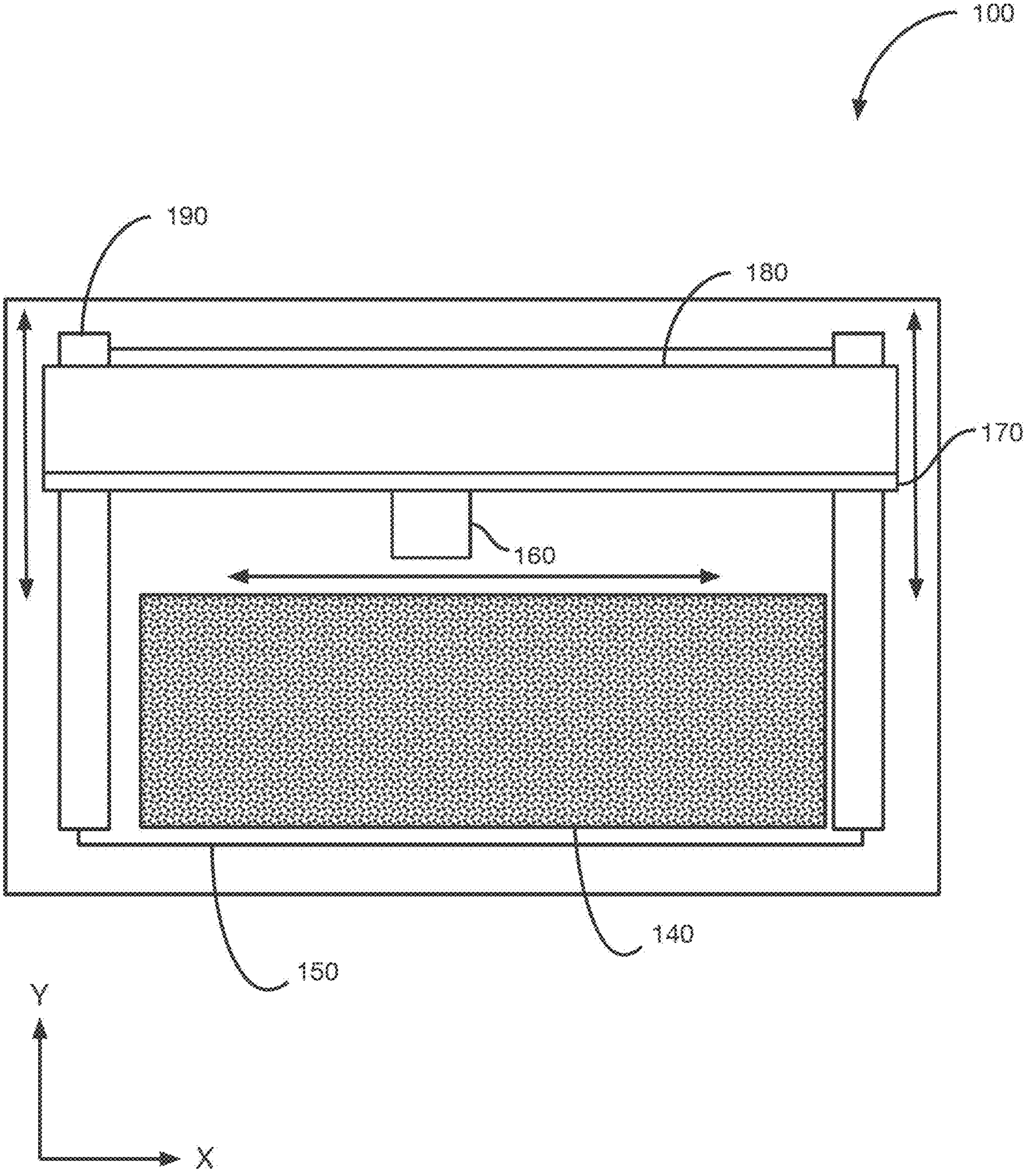
FIG. 1B depicts a top view of an example of a computer numerically controlled machine consistent with implementations of the current subject matter.

FIG. 1A depicts an elevational view of an example of a computer numerically controlled machine 100, consistent with implementations of the current subject matter. The example of the computer numerically controlled machine 100 shown in FIG. 1A may include a camera 110 positioned to capture an image of an entire material bed 150 and another camera 120 positioned to capture an image of a portion of the material bed 150, consistent with some implementations of the current subject matter. FIG. 1B depicts a top view of the example of the computer numerically controlled machine 100 shown in FIG. 1A.

In some implementations of the current subject matter, the computer numerically controlled machine 100 may be a laser cutter/engraver that uses electromagnetic energy (e.g., laser) to perform various forms of subtractive processing including, for example, cutting, engraving, and/or the like. While some features are described herein in the context of a laser cutter, this is by no means intended to be limiting. Many of the features described below can be implemented with other types of computer numerically controlled machines.

As a laser cutter/engraver, the computer numerically controlled machine 100 may be subject to particularly challenging design constraints. For example, a laser cutter/engraver is subject to regulatory guidelines that restrict the egress of electromagnetic energy from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself.

Liquid cooling is common in laser cutter/engravers to cool the laser, requiring fluid flow considerations. Airflow is important in laser cutter/engraver designs, as air may become contaminated with byproducts of the laser’s interaction with the material such as smoke, which may in turn damage portions of the machine for example fouling optical systems. The air exhausted from the machine may contain undesirable byproducts such as, for example, smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object.

Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being effected, and air or other gasses may be used to aid the cutting process in a different manner, by facilitating combustion or clearing debris, for example.

Referring again to FIG. 1A, the computer numerically controlled machine 100 can have a housing surrounding an enclosure or interior area defined by the housing. The housing can include walls, a bottom, and one or more openings to allow access to the computer numerically controlled machine 100. In addition, the material bed 150 may be disposed at least partially within the housing of the computer numerically controlled machine 100 and may include a top surface on which the material 140 generally rests.

In the example of the computer numerically controlled machine 100 shown in FIG. 1A, the computer numerically controlled machine 100 can also include an openable barrier as part of the housing to allow access between an exterior of the computer numerically controlled machine and an interior space of the computer numerically controlled machine. The openable barrier can include, for example, one or more doors, hatches, flaps, lids, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure.

Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the computer numerically controlled machine 100. These access points can be for access to power, air, water, data, etc. Any of these access points can be monitored by cameras, position sensors, switches, etc. If they are accessed unexpectedly, the computer numerically controlled machine 100 can execute actions to maintain the safety of the user and the system, for example, a controlled shutdown. In other implementations, the computer numerically controlled machine 100 can be completely open (i.e. not having a lid 130, or walls). Any of the features described herein can also be present in an open configuration, where applicable.

The computer numerically controlled machine 100 can have one or more heads including, for example, the head 160, which can be operated to alter the material 140. The head 160 may be configured to steer a beam of electromagnetic energy to a desired location on the material 140 positioned in the working area of the computer numerically controlled machine 100. For instance, the head 160 may be mobile including by translating and/or rotating to locate a beam of electromagnetic energy from a source configured to generate and/or emit the electromagnetic energy. Alternatively, the head 160 may be stationary and the beam of electromagnetic energy may be located by translating and/or rotating one or more optical components configured to route the electromagnetic energy from the head 160. It should be appreciated that the computer numerically controlled machine 100 may include multiple heads that operate independently or in unison to locate the beam of electromagnetic energy.

In some implementations of the current subject matter, the head 160 can be configured to include a combination of optical, electronic, and/or mechanical components that can, in response to commands, cause a laser beam or electromagnetic energy to be delivered to cut, score, or engrave the material 140. As used herein, a cut is created when the electromagnetic energy cuts through the material 140 whereas a score is created when the electromagnetic energy effects a shallow line that penetrates the material 140 to a certain depth but does not cut through the material 140. The source (e.g., an emitter and/or the like) generating the electromagnetic energy may be part of the head 160 or separate from the head 160. The computer numerically controlled machine 100 can also execute operation of a motion plan for causing movement of the head 160 in implementations where the head 160 is configured to be mobile.

In some implementations of the current subject matter, the computer numerically controlled machine 100 may accept a user drawing, acting as a source file that describes the designs the user wants to create or the cuts that a user wishes to make. Examples of source files include .STL files that define a three-dimensional object that can be fabricated with a 3D printer or carved with a milling machine, .SVG files that define a set of vector shapes that can be used to cut or draw on material, JPG files that define a bitmap that can be engraved on a surface, and CAD files or other drawing files that can be interpreted to describe the object or operations. Other examples of source files include PDF files, DXF files, and/or the like.

A source file may be converted into a machine file (e.g., by a computer program and/or the like) that can be interpreted by the computer numerically controlled machine 100 to take certain actions. The machine file may describe the idealized motion of the computer numerically controlled machine 100 to achieve a desired outcome. As one example, if the source file specifies a rectangle, then the machine file can instruct the computer numerically controlled machine 100 to translate the head 160 (and/or one or more optical elements) to deliver the electromagnetic energy to effect the rectangle in the material 140. The machine file can omit some information (e.g., the dimensions of the rectangle and/or the like) and/or add information (e.g., an instruction to move the head 160 from its home position to a corner of the rectangle to begin fabrication). The instructions can even depart from the directly expressed intent of the user.

Once the machine file has been created, a motion plan for the computer numerically controlled machine 100 can be generated. As used herein, a "motion plan" may contain the data that determines the actions of components of the computer numerically controlled machine 100 at different points in time. The motion plan may be generated on the computer numerically controlled machine 100 itself or at least partially on another computing system. The motion plan may include a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, the motion plan may be defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a maximum speed of one inch per second, while maintaining a constant number of revolutions per second of a cutting tool." The motion plan may therefore take into consideration that the motors cannot accelerate instantly, and instead must "spin up" at the start of motion and "spin down" at the end of motion. The motion plan would then specify pulses (e.g. sent to stepper motors or other apparatus for moving the head or other parts of computer numerically controlled machine 100) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the computer numerically controlled machine 100, taking into account the exact state of the computer numerically controlled machine 100 at that moment and physical limitations of the machine. The signals can be step and direction pulses fed to stepper motors or location signals fed to servomotors among other possibilities, which create the motion and actions of the computer numerically controlled machine 100, including the operation of elements like actuation of the head 160, moderation of heating and cooling, and other operations. In some implementations of the current subject matter, a compressed file of electrical signals can be decompressed and then directly output to the motors. These electrical signals can include binary instructions similar to 1's and 0's to indicate the electrical power that is applied to each input of each motor over time to effect the desired motion.

In some implementations of the current subject matter, the motion plan may take into account the detailed physics of the computer numerically controlled machine 100 itself, and translates the idealized machine file into implementable steps. For example, a particular computer numerically controlled machine 100 might have a heavier head, and require more gradual acceleration. This limitation is modeled in the motion planner and affects the motion plan. Different models of the computer numerically controlled machine 100 can require precise tuning of the motion plan based on its measured attributes (e.g. motor torque) and observed behavior (e.g. belt skips when accelerating too quickly). The computer numerically controlled machine 100 can also tune the motion plan on a per-machine basis to account for variations from machine to machine.

The motion plan can be generated and fed to the output devices in real-time, or nearly so. The motion plan can also be pre-computed and written to a file instead of streamed to the computer numerically controlled machine 100, and then read back from the file and transmitted to the computer numerically controlled machine 100 at a later time. Transmission of instructions to the computer numerically controlled machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

Electromagnetic energy effecting one or more changes in the material 140 that is at least partially contained within the interior space of the computer numerically controlled machine 100 may therefore be delivered by moving the head 160. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head 160 can be linear, for example on an x-axis, a y-axis, or a z-axis. In other implementations, the head 160 can combine motions along any combination of directions in a rectilinear, cylindrical, or spherical coordinate system.

A working area for the computer numerically controlled machine 100 can be defined by the limits within which the head 160, whether stationary or mobile, can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the computer numerically controlled machine, that 400 $in^3$ volume can be considered to be the working area.

The working area can be defined by the extents of positions in which material 140 can be worked by the computer numerically controlled machine 100. As such, the boundaries of the working area may not necessarily be defined or limited by the range of travel of any one component. For example, if the head 160 could turn at an angle, then the working area could extend in some direction beyond the travel of the head 160. By this definition, the working area can also include any surface, or portion thereof, of any material 140 placed in the computer numerically controlled machine 100 that is at least partially within the working area, if that surface can be worked by the computer numerically controlled machine 100. Similarly, for oversized material, which may extend even outside the computer numerically controlled machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the computer numerically controlled machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the computer numerically controlled machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent (or enable) some or all functions of the computer numerically controlled machine 100 while an openable barrier, for example the lid 130, is in the open state (e.g. not in a closed state). The reverse can be true as well, meaning that some functions of the computer numerically controlled machine 100 can be prevented (or enabled) while in a closed state. There can also be interlocks in series where, for example, the computer numerically controlled machine 100 will not operate unless both the lid 130 and the front door are both closed. In some examples, the detection of a change in state of the interlock (e.g., the interlock moving from an open to a closed state or vice-versa) may trigger certain operations within the computer numerically controlled machine. For example, upon detection that the interlock is moving from an open state to a closed state, a procedure (e.g., calibration procedure, material edge detection procedure, etc.) of the computer numerically controlled machine may be initiated. Furthermore, some components of the computer numerically controlled machine 100 can be tied to states of other components of the computer numerically controlled machine, such as not allowing the lid 130 to open while the laser is on, a movable component moving, a motor running, sensors detecting a certain gas, and/or the like. The interlock can prevent emission of electromagnetic energy from the head 160 when detecting that the lid 130 is not in the closed position.

One or more cameras can be mounted inside the computer numerically controlled machine 100 to acquire image data during operation of the computer numerically controlled machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be one or more cameras mounted such that they gather image data (also referred to as 'view' or 'image') from an interior portion of the computer numerically controlled machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the computer numerically controlled machine 100 is in a closed position. In particular, in some preferred embodiments, the one or more cameras can image the material 140 while the computer numerically controlled machine 100 is closed and, for example, while machining the material 140. In some implementations, one or more cameras can be mounted within the interior space and opposite the working area. In other implementations, there can be one or more cameras attached to the lid 130. One or more cameras can also be capable of motion such as translation to a plurality of positions, rotation, and/or tilting along one or more axes. One or more cameras mounted to a translatable support, such as a gantry 180, which can be any mechanical system that can be commanded to move (movement being understood to include rotation) the one or more cameras or a mechanism such as a mirror that can redirect the view of the one or more cameras, to different locations and view different regions of the computer numerically controlled machine. The head 160 is a special case of the translatable support, where the head 160 is limited by the track 190 and the translation rail 170 that constrain its motion.

Lenses can be chosen for wide angle coverage, for extreme depth of field so that both near and far objects may be in focus, or many other considerations. The one or more cameras may be placed to additionally capture the user so as to document the building process, or placed in a location where the user can move the camera, for example on the underside of the lid 130 where opening the computer numerically controlled machine 100 causes the camera to point at the user. Here, for example, the single camera described above can take an image when the lid is not in the closed position. Such an image can include an object, such as a user, that is outside the computer numerically controlled machine 100. One or more cameras can be mounted on movable locations like the head 160 or lid 130 with the intention of using video or multiple still images taken while the one or more cameras are moving to assemble a larger image, for example scanning the one or more cameras across the material 140 to get an image of the material 140 in its totality so that the analysis of image data may span more than one image.

As shown in FIG. 1A, a lid camera 110, or multiple lid cameras, can be mounted to the lid 130. In particular, as shown in FIG. 1A, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1A, a head camera 120, or multiple head cameras, can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the computer numerically controlled machine 100 to view users or view external features of the computer numerically controlled machine 100.

Multiple cameras can also work in concert to provide a view of an object or material 140 from multiple locations, angles, resolutions, etc. For example, the lid camera 110 can identify the approximate location of a feature in the computer numerically controlled machine 100. The computer numerically controlled machine 100 can then instruct the head 160 to move to that location so that the head camera 120 can image the feature in more detail.

While the examples herein are primarily drawn to a laser cutter, the use of the cameras for machine vision in this application is not limited to only that specific type of computer numerically controlled machine 100. For example, if the computer numerically controlled machine 100 were a lathe, the lid camera 110 can be mounted nearby to view the rotating material 140 and the head 160, and the head camera 120 located near the cutting tool. Similarly, if the computer numerically controlled machine 100 were a 3D printer, the head camera 120 can be mounted on the head 160 that deposits material 140 for forming the desired piece.

An image recognition program can identify conditions in the interior portion of the computer numerically controlled machine 100 from the acquired image data. The conditions that can be identified are described at length below, but can include positions and properties of the material 140, the positions of components of the computer numerically controlled machine 100, errors in operation, etc. Based in part on the acquired image data, instructions for the computer numerically controlled machine 100 can be created or updated. The instructions can, for example, act to counteract or mitigate an undesirable condition identified from the image data. The instructions can include changing the output of the head 160. For example, where the computer numerically controlled machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 180. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The computer numerically controlled machine 100 can execute the instructions to create the motion plan or otherwise effect the changes described above. In some implementations, the movable component can be the gantry 180, the head 160, and/or the like. An identifiable mark may be disposed on the moveable component to facilitate tracking changes in the position of the moveable component. The movable component, for example the gantry 180, can have a fixed spatial relationship to the head 160. The image data can update software controlling operation of the computer numerically controlled machine 100 with a position of the head 160 and/or the gantry 180 with their position and/or any higher order derivative thereof.

Because the type of image data required can vary, and/or because of possible limitations as to the field of view of any individual camera, multiple cameras can be placed throughout the computer numerically controlled machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. Alternatively and/or additionally, images produced by multiple cameras may be used for stereovision, which is a process that includes comparing features found in two or more images to determine the distance between the cameras and the feature. Stereovision may be one example of a technique used to determine the height (or thickness) of the material 140 at various locations across the material 140.

The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods.

Figure 2:
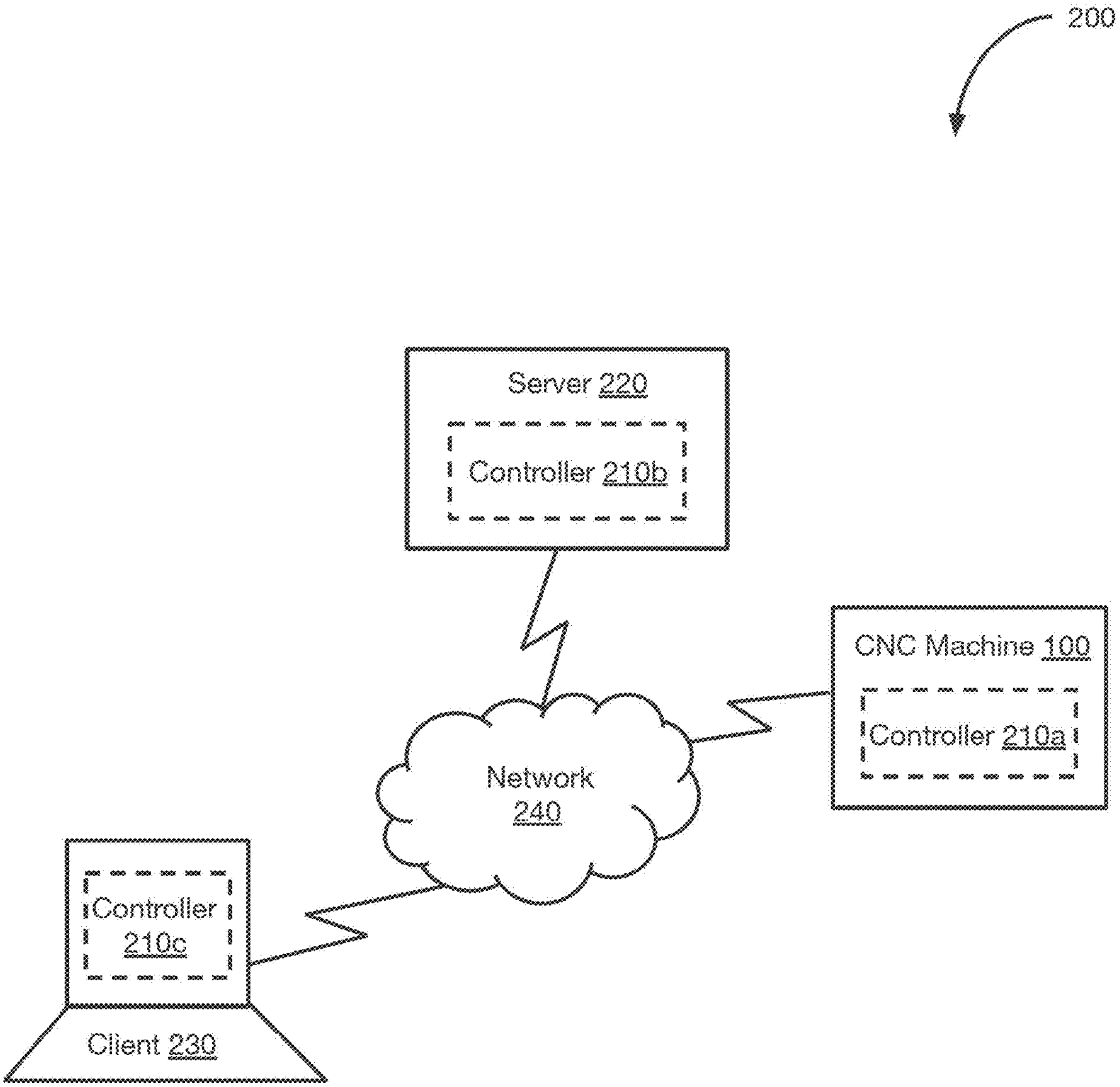
FIG. 2 depicts a system diagram illustrating an example of a computer numerically controlled processing system consistent with implementations of the current subject matter.

In some implementations of the current subject matter, the computer numerically controlled machine 100 may be part of a computer numerically controlled processing system. To further illustrate, FIG. 2 depicts a block diagram illustrating an example of a computer numerically controlled processing system 200 consistent with implementations of the current subject matter. As shown in FIG. 2, the computer numerically controlled processing system 200 may include the computer numerically controlled machine 100 and a controller 210 configured to control the operations of the computer numerically controlled machine 100. Moreover, as shown in FIG. 2, the controller 210 may be deployed at one or more locations. For example, as shown in FIG. 2, a first controller 210*a* may be deployed at the computer numerically controlled machine 100. Alternatively and/or additionally, a second controller 210*b* may be deployed at a server device 220 and/or a third controller 210*c* may be deployed at the client device 230. The server device 220 and the client device 230 may be communicatively coupled with the computer numerically controlled machine 100.

Accordingly, one or more functionalities of the controller 210, including those associated with analyzing the material 140 to identify one or more features and characteristics of the material 140 such as one or more edges of the material 140, may be performed at the computer numerically controlled machine 100, the server device 220, and/or the client device 230. Whether performed at the computer numerically controlled machine 100, the server device 220, and/or the client device 230, it should be appreciated that the analysis of the material 140 may be performed as part of a fabrication or fabrication process in which the computer numerically controlled machine 100 processes, for example, the material 140 to achieve one or more designs.

As shown in FIG. 2, the computer numerically controlled machine 100 may be communicatively coupled with the server device 220 and/or the client device 230 via a network 240. Moreover, the client device 230 and the server device 220 may also be communicatively coupled via the network 240. The network 240 may be a wired network and/or a wireless network including, for example, a local area network (LAN), a virtual local area network (VLAN), a wide area network (WAN), a public land mobile network (PLMN), the Internet, and/or the like. The client device 230 and the server device 220 may be one or more processor-based computing devices such as, for example, a smartphone, a tablet computer, a laptop computer, a desktop computer, a workstation, a wearable apparatus, an Internet-of-Things (IoT) appliance, and/or the like. The client device 230 and the server device 220 may include computer software and hardware configured to provide one or more functionalities of the controller 210 such that the functionalities of the controller 210 are accessible, via the network 240, to the computer numerically controlled machine 100.

In some implementations of the current subject matter, the controller 210 may be configured to analyze the material 140 to identify one or more features and characteristics of the material 140. For example, the controller 210 may perform edge detection in order to identify one or more edges of the material 140. Edge detection may be performed to identify one or more portions of the material 140 that are obscured by another material. Alternatively and/or additionally, edge detection may be performed to identify one or more portions of the material 140 subjected to previous processing. For instance, a previously engraved region of the material 140 or an area of the material 140 with damage from previous processing (e.g., burns, fraying, and/or the like) may be treated as an edge. Thus, as used herein, an edge of the material 140 may include a boundary between a first portion of the material 140 suitable for placement of a design to a second portion of the material 140 unsuitable for the placement of a design. One example of such a boundary may include an area of the material 140 where a transition from a presence of the material 140 to an absence of the material 140 and/or a presence of a different material occurs. Another example may include an area of the material 140 where a transition from an unprocessed and/or an undamaged portion of the material 140 to a processed and/or damaged portion of the material 140.

It should be appreciated that an edge may be present around an outer perimeter of the material 140 as well as in areas where portions of the material 140 are absent due to a hole or cut out in the material 140, a natural cut feature of the material 140, and/or the like. In cases where the material 140 is a mixed material combining, for example, a first material and a second material, an edge may be present where the first material transitions to the second material. An edge may also be present where the material 140 is partially obscured by another material not intended for processing including, for example, one or more weights, stickers, magnets, pins, tape, and/or the like. For example, in cases where the other material obscuring the material 140 is not intended for processing, the portions of the material 140 obscured may be removed such that the resulting preview of the material 140 includes one or more cutouts corresponding to the other material. The preview of the material 140 obscured by another material not intended for processing may therefore include edges introduced by the other material. Contrastingly, when the material 140 is obscured by another material that is intended for processing, the preview of the material 140 may include the portion of the other material disposed on the material 140 but not the portion of the other material not disposed on the material 140. The preview of the material 140 obscured by another material intended for processing may thus include the edges of the material 140 obscured by the other material.

In some implementations of the current subject matter, the controller 210 may perform edge detection automatically, for example, upon detecting that the lid 130 of the computer numerically controlled machine 100 is in the closed position. For example, the controller 210 may receive one or more triggers indicating the lid 130 is in the closed position. In one example, a sensor tied to the lid 130 produces a trigger when the lid 130 is closed that is detected by, for example, controller 210*a* that is deployed at the computer numerically controlled machine. In another example, the controller 210 may receive a message transmitted from the computer numerically controlled machine 100 or the controller 210*a* that is disposed on the computer numerically controlled machine 100 indicating that the lid 130 is in the closed position. The message may be sent, for example, to the controller 210*b* and/or 210*c* via the network 240. Performing edge detection automatically may expedite subsequent calibrations of the computer numerically controlled machine 100 including, for example, an autofocus technique to adjust the power of electromagnetic energy delivered to the material 140, a scanning technique to detect variations in the height (and/or thickness) of the material 140, and/or the like.

In some cases, the controller 210 may perform edge detection to detect changes in a position of the material 140 on the material bed 150. The controller 210 may also automatically adjust a prior placement of one or more designs on the material 140 in order to accommodate any detected changes in the position of the material 140 on the material bed 150.

As noted, edge detection may be performed in order to expedite the calibration of the computer numerically controlled machine 100. For example, once the material 140 has been placed on the material bed 150 and the lid 130 is in the closed position, the controller 210 may automatically perform edge detection to identify the bounds of the material 140 such that an autofocus technique may be performed to calibrate the power of the electromagnetic energy delivered to the material 140. With autofocus, a z-axis lens (e.g., in the head 160) may be used to focus the beam of electromagnetic energy delivered by the head 160 in accordance with the height (or thickness) of the material 140. In some examples, multipoint autofocus techniques in which the power of the electromagnetic energy is adjusted to account for variations in the height (or thickness) of the material 140 may require measuring the height (or thickness) of the material 140 at multiple locations across the material 140.

Thus, knowing where the edges of the material 140 are located may improve user experience at least because auto-focus techniques (and other calibration techniques) may be performed within the one or more edges of the material 140 where the material 140 is present but not outside of the one or more edges of the material 140 where the material 140 is absent. In some cases, the edges of the material 140 may be located with some user inputs adjusting the edges detected by the controller 210. However, in other cases, the edges of the material 140 may be located without requiring user input to indicate where the material 140 is present and not present. The calibration of the computer numerically controlled machine 100 may also be performed before the user places a design on the material 140. Precise placement of a design on a material 140 may be challenging without an understanding of the accurate location of the edges of the material 140. For example, the placement of one or more designs on the material 140 may result in an incorrect outcome if the designs are placed beyond the one or more edges of the material 140. In another example, design margins may be established to compensate for an inaccurate understanding of the edge locations, which may result in under-utilization of the material 140.

Edge detection may also improve the efficiency and outcome of material height detection techniques in which autofocus, for example, may be performed to determine the height (and/or thickness) of the material 140 at a single point or multiple points across the material, and the resulting measurement is used to adjust the focal point of the electromagnetic energy (e.g., focus the laser power) applied to the surface of the material and/or calibrate the power of the electromagnetic energy (e.g., calibrate the laser power) as well as for correcting distortions that may be present in the image captured by the lid camera 110 (e.g., barrel distortion and/or the like). In some cases, the material height detection technique may also be used to determine certain features and characteristics of the material 140, such as warpage and/or the like, for generating a model of the material 140. The model of the material 140 may be used to adjust the power of the electromagnetic energy (e.g., by adjusting the z-axis lens in the head 160) such that the power of the electromagnetic energy may be varied to accommodate warpage (or other height variations) in the material 140. The model of the material 140 may also be used to identify cutout pieces of the material 140, which may have fallen through the surface of the material 140 and onto the material bed 150. The cutout pieces of the material 140 may obscure the visual characteristics of the material bed 150 (e.g., honeycomb-like structure) and are thus difficult to identify without the model of the material 140. Alternatively and/or additionally, the model of the material 140 may be used to detect vertical tilt in the placement of the material 140 on the material bed 150 such as, for example, when debris on the material bed 150 is holding the material 140 up on one side.

Understanding the bounds of the material 140 through edge detection may allow material height detection techniques to be performed automatically, for example, without the need for user input to define areas of the material 140 to measure. It should be appreciated that the results of edge detection may, in some cases, minimize (or even eliminate) the need for imposing a margin around the material 140 at least because the results of the edge detection may precisely identify specific edges where one or more designs are at risk for not fitting on the material or within a margin defined relative to the one or more edges of the material 140.

In some implementations of the current subject matter, identifying one or more edges of the material 140 may enable the placement of one or more designs on the material 140. For example, a design may be placed, based at least on the location of the one or more edges, to avoid exceeding the one or more edges and/or a margin defined relative to the one or more edges. Alternatively and/or additionally, the design may be placed relative to the one or more edges, which include, for example, being centered, parallel, adjacent, and/or packed with respect to the one or more edges. In some cases, the controller 210 may determine that a design may not be placed on the material 140 in its entirety, for example, because one or more dimensions of the design exceed the dimensions of the material 140 (e.g., a design that is too wide and/or too long for the material 140). In those cases, the controller 210 may determine to split the design along one or more edges of the material 140 and provide a recommendation to place the remaining portion of the design on another piece of material. The controller 210 may split the design such that the design may be applied to two or more separate pieces of material that may be subsequently joined to form the intended design.

For instance, upon detecting the edges of the material 140, the controller 210 may respond to one or more user commands by centering the design relative to the edges of the material 140 or rotating the design parallel to the edges of the material 140. In some cases, the controller 210 may retain the placement of the one or more designs when the orientation of the material 140 on the material bed 150 undergoes one or more changes. Thus, after the user moves the material 140, the controller 210 may determine that the same material is still present in the computer numerically controlled machine 100 and automatically place the designs such that the designs maintains their placement (e.g., centered, parallel, adjacent, packed, and/or the like) relative to the one or more edges of the material 140.

In some implementations of the current subject matter, the controller 210 may generate a preview of the placement of the design relative to one or more edges of the material 140. This preview may be displayed as part of a user interface, for example, at the computer numerically controlled machine 100, the client device 230, and/or the server device 220. Furthermore, the controller 210 may provide feedback configured to discourage an incorrect design placement relative to one or more edges of the material 140. For example, the controller 210 may trigger, at the computer numerically controlled machine 100, the client device 230, and/or the server device 220, an alert if the placement of the design exceeds one or more edges of the material 140. Alternatively and/or additionally, the controller 210 may automatically reposition the design on the material such that the placement of the design is consistent with the one or more edges of the material 140. As will be described in further detail, the feedback, which may be provided at the computer numerically controlled machine 100, the client device 230, and/or the server device 220, may include a response that corresponds to a proximity of the design relative to an edge of the material 140 to discourage the design from exceeding the edge of the material 140.

As noted, the design may be placed relative to one or more edges of the material 140. In some cases, the placement of the design may be further determined by a material margin defined relative to the one or more edges. It should be appreciated that a "material margin" may refer to an area of the material 140 where processing by the computer numerically controlled machine 100 is not recommended or is prohibited. That is, material margins may be implemented as “rules” (e.g., processing is prevented from taking place within the margins) or as “guidelines” (e.g., feedback may discourage the placement of designs within the margins margins). Moreover, these material margins may be user defined and/or determined by the controller 210 based on the type of the material 140, the type of operation (e.g., cut, score, engrave, and/or the like) required to achieve the design, and/or the presence of previous designs (e.g., to avoid cuts and/or other artifacts from a previous operations). Material margins may be displayed as part of the preview via the user interface to help avoid the placement of designs beyond the material margins. In some cases, material margins are necessary when the location of one or more edges in the material 140 cannot be precisely identified. Thus, in some cases, the presence and size of the material margins may be defined based on the accuracy with which the controller 210 is able to determine the location of the edges of the material 140.

For example, a hard, dense material (e.g., certain metals, glass, or plastics) may have a small material margin (i.e., the margin may be very close to the material edge) to reflect the fact that the material is sufficiently strong to withstand processing up to almost the edge of the material while still maintaining its structural integrity. By contrast, a softer material (e.g., certain papers, woods, or plastics) may have a larger material margin (i.e., the margin may be further from the material edge than the prior example) to reflect the fact that the material may not be sufficiently strong to withstand processing very close to the edge of the material, and as a result, the material may experience charring, deformation, or other undesirable deformities if processed too closely to the material edge.

In some implementations of the current subject matter, the controller 210 may determine, based at least on the one or more edges of the material 140, an optimal design placement that maximizes an efficiency in the utilization of the material 140 including by minimizing the quantity of scrap material and maximizing the output associated with the processing of the material 140. For example, to maximize material use efficiency, the controller 210 may place designs as closely as possible on the material 140 and/or maximize the quantity of designs (including replicas of the same design) produced from the material 140. Preview of the design placement may include the designs being moved automatically to an optimal placement or being encouraged to move towards the optimal placement, for example, by a perceived increased attractive force, as expressed via the user interface, towards an optimal position on the material 140. The controller 210 may also generate other feedback to encourage an optimal design placement including, for example, a metric indicative of the material use efficiency associated with different design placements. This metric may be computed based on an analysis of the dimensions of the scrap material that is associated with various design placements. As will be described in more detail, the controller 210 may track historical material use including across multiple projects, pieces of material, users, and/or computer numerically controlled machines.

In some implementations of the current subject matter, edge detection may be performed in order for the controller 210 to locate, on the material 140, one or more identifiers conveying information associated with the material 140. For example, the one or more identifiers may include a Quick Response (QR) code, a stock keeping unit (SKU) code, a barcode, and/or the like that enable a determination of one or more characteristics of the material 140 such as, for example, the type of the material 140, the thickness of the material 140, the density of the material 140, the composition of the material 140, and/or the like. In cases where the identifier is disposed within a certain region of the material, such as a threshold distance relative to an edge of the material 140, the controller 210 may limit the search for such an identifier to that region of the material 140 (e.g., within the threshold distance relative to one or more edges of the material 140) once the edges of the material have been determined.

Alternatively and/or additionally, the one or more markings may be patterned across the material 140, in which case at least some portions of the material 140 including one or more edges may be identified based on the one or more markings 140. For example, the one or more markings may form a fluorescent pattern (e.g., one or more ultraviolet (UV) barcodes and/or the like) that is invisible in the absence of a fluorescence inducing light source including, for example, a non-laser light source (e.g., light emitting diodes (LEDs) and/or the like), a laser light source (e.g., a Vertical-Cavity Surface Emitting Laser (VCSEL) array), and/or the like. The one or more markings may thus serve to identify various positions across the material 140. For instance, one or more edges in the material 140 may be detected based at least on the presence and/or absence of the one or more markings. Where the material 140 is a mixed material that combines, for example, a first material and a second material, a first identifier may be patterned over the first material while a second identifier may be patterned over the second material to enable a differentiation between the first material and the second material including one or more boundaries between the first material and the second material.

Figure 3A:
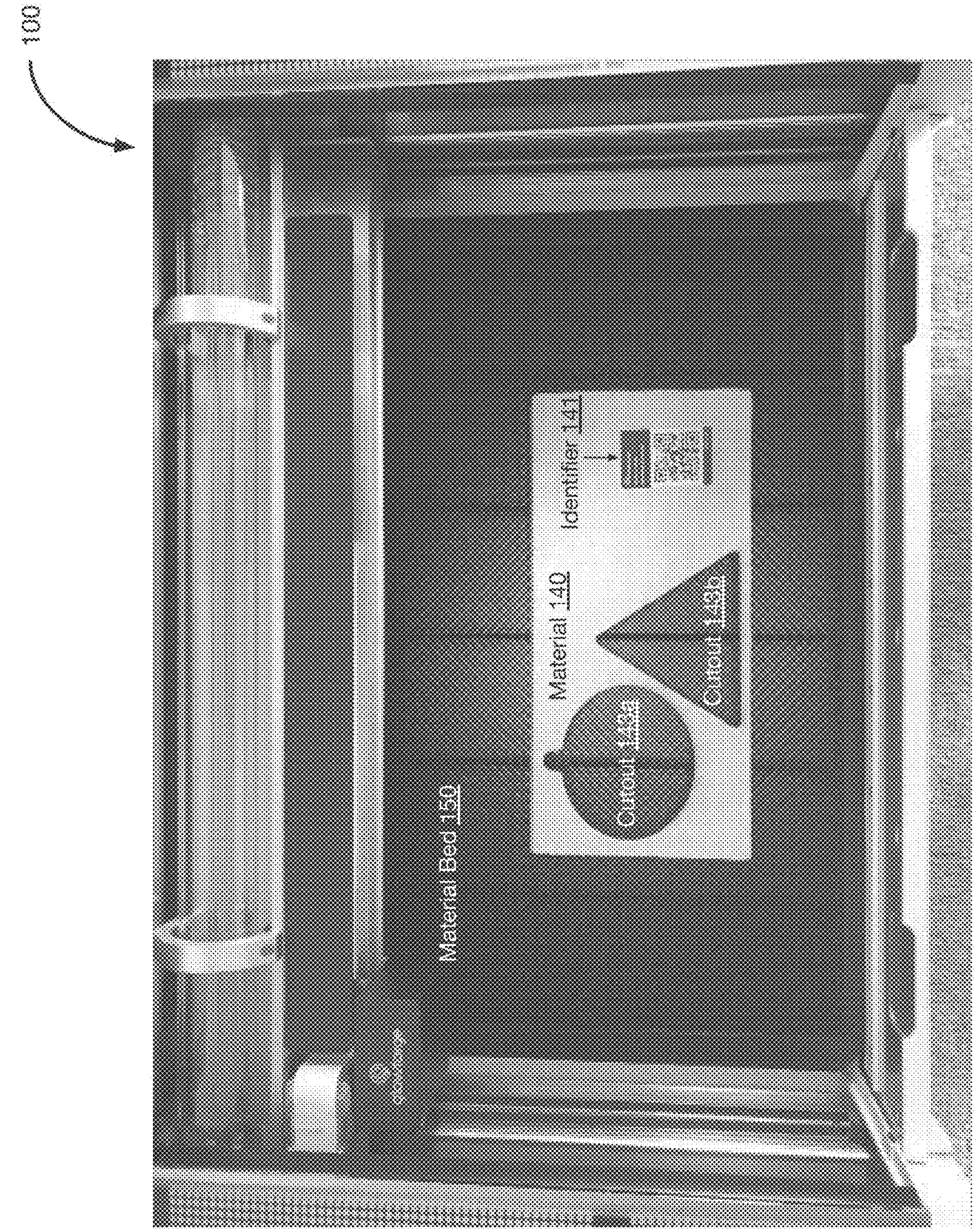
FIG. 3A depicts an image of an example of a material disposed on a material bed in a computer numerically controlled machine consistent with implementations of the current subject matter.
Figure 3B:
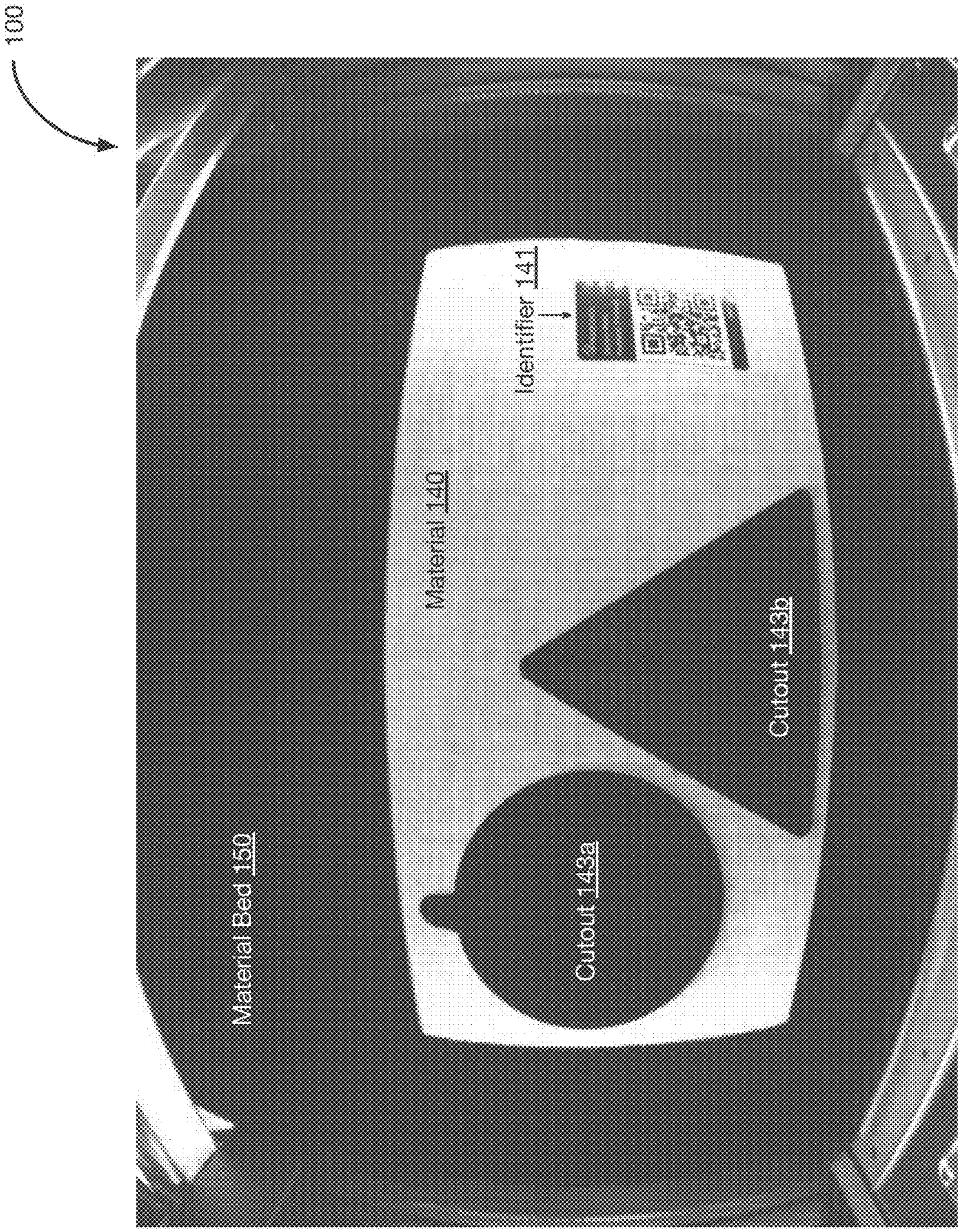
FIG. 3B depicts an image of an example of a material disposed on a material bed in a computer numerically controlled machine consistent with implementations of the current subject matter.
Figure 3C:
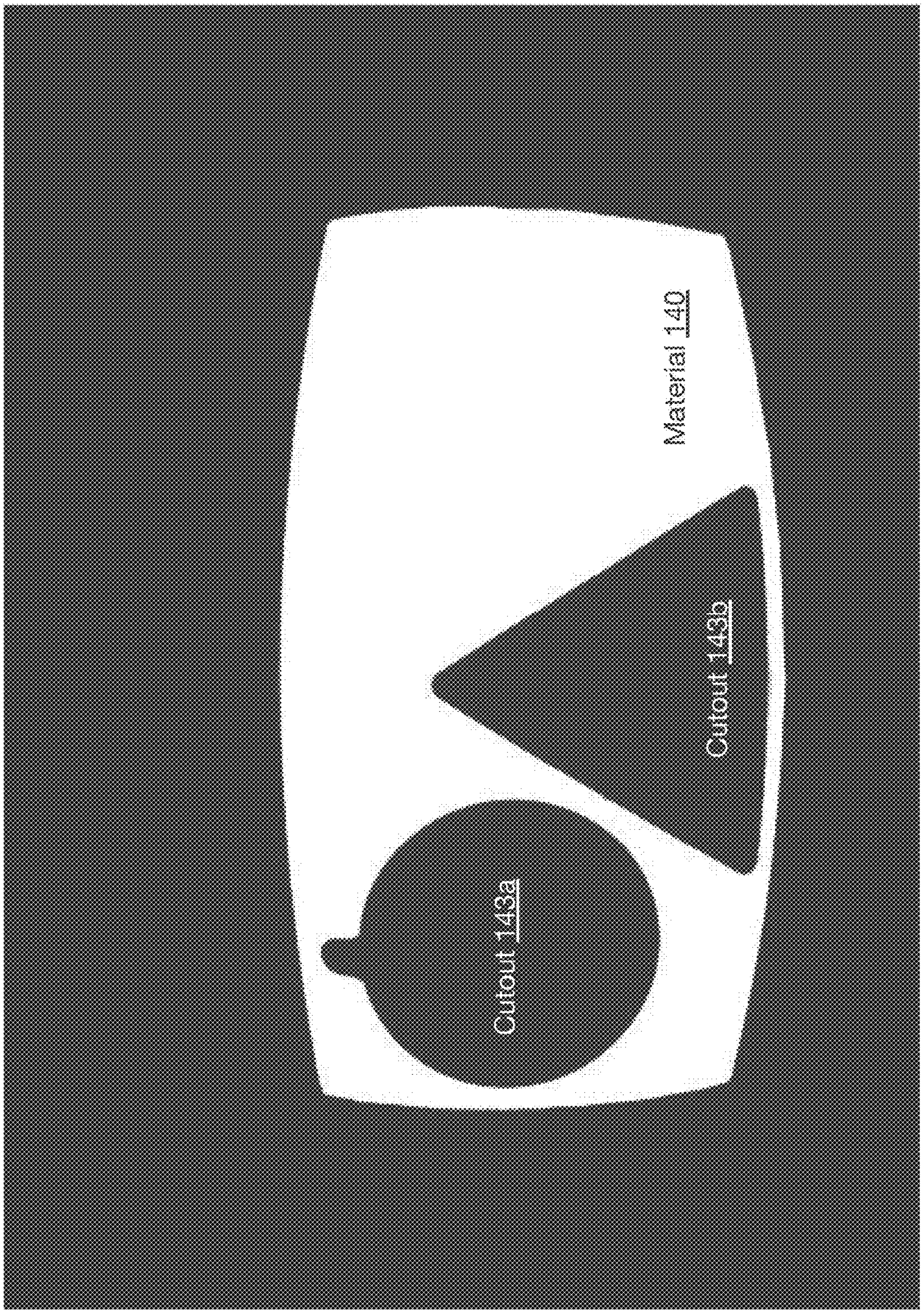
FIG. 3C depicts an example of an image of a material subjected to edge detection consistent with implementations of the current subject matter.

To further illustrate, FIGS. 3A-C depict an example of the material 140 disposed on the material bed 150 of the computer numerically controlled machine 100. FIG. 3A depicts an image of the material 140 corresponding to a “real world” observation of the material 140 whereas FIG. 3B depicts an image of the material 140 captured by one or more cameras at the computer numerically controlled machine 100, such as the lid camera 110 mounted to the lid 130 of the computer numerically controlled machine 100. In the example shown in FIGS. 3A-C, the material 140 includes an identifier 141, a first cutout 143*a*, and a second cutout 143*b*. The material bed 150 exhibits a honeycomb-like structure, which is visible around the material 140 and through each of the first cutout 143*a* and the second cutout 143*b* in the material 140.

FIG. 3C an example of an image of the material 140 rendered and/or processed by a controller 210 whereby the image was subjected to edge detection consistent with implementations of the current subject matter. As shown in FIG. 3C, the controller 210 may identify one or more edges present in the material 140, which may include the edges around the outer perimeter of the material 140 as well as the edges associated with the first cutout 143*a* and the second cutout 143*b* in the material 140. Doing so may enable the controller 210 to generate the image shown in FIG. 3C, which shows an area where the material 140 is present (i.e., shown in white in FIG. 3C) in sharp contrast to an area where the material is not present (i.e., shown in black in FIG. 3C). Note that the image shown in FIG. 3C removes the identifier 141, the material bed 150, and other components of the computer numerically controlled machine 100 visible in the images depicted in FIGS. 3A-B. Furthermore, in some implementations of the current subject matter, the controller 210 may determine, based at least on the location of the one or more edges of the material 140, a location of the identifier 141 on the material 140. For example, the identifier 141, which may be a Quick Response (QR) code, a stock keeping unit (SKU) code, a barcode, and/or the like, may be disposed within a certain region of the material 140, such as within a threshold distance from an edge of the material 140. As such, the controller 210 may confine the search for the identifier 141 to that region of the material 140, for example, by avoiding any search beyond the threshold distance from the one or more edges of the material 140.

Figure 4A:
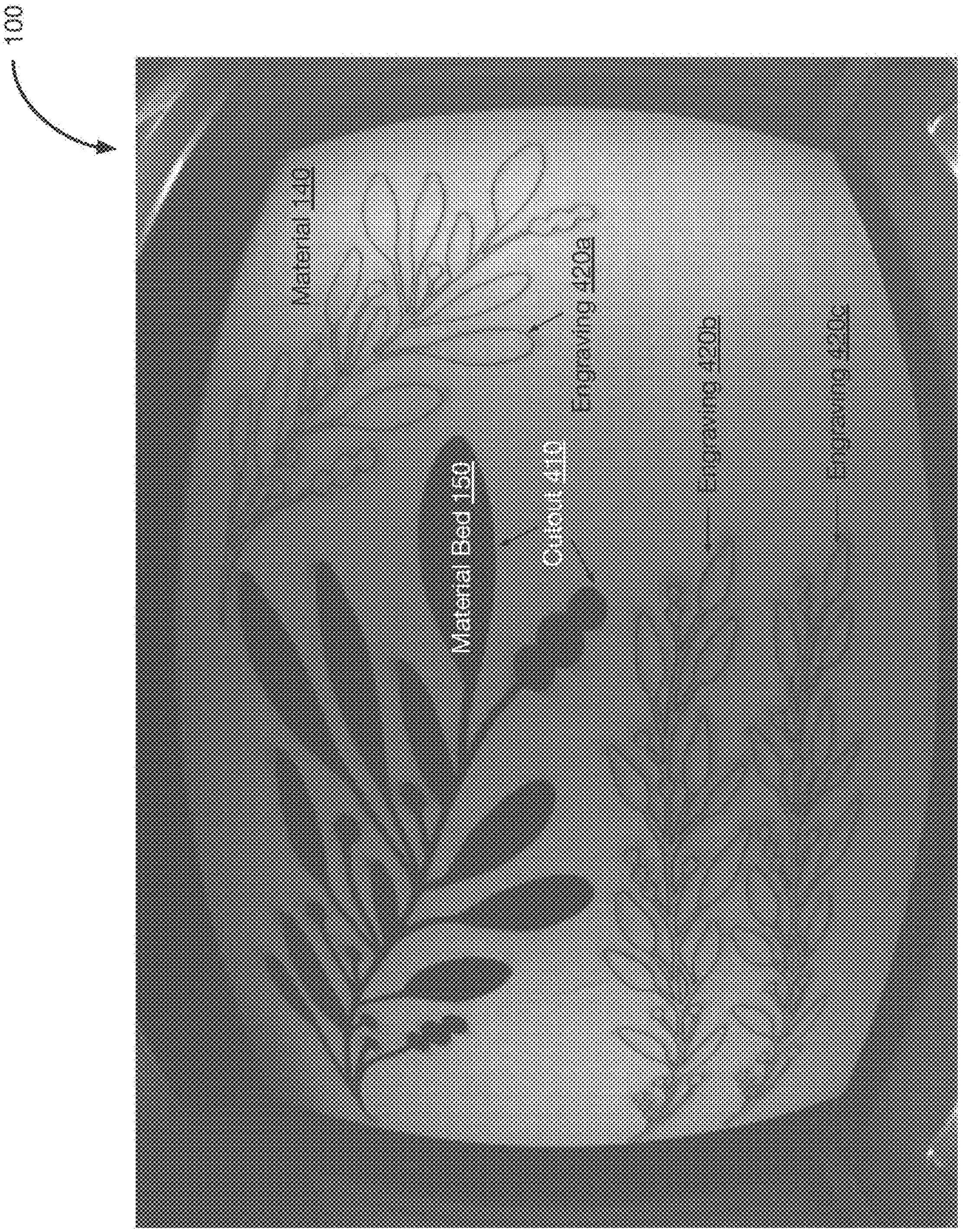
FIG. 4A depicts an image of another example of a material disposed on a material bed in a computer numerically controlled machine consistent with implementations of the current subject matter.
Figure 4B:
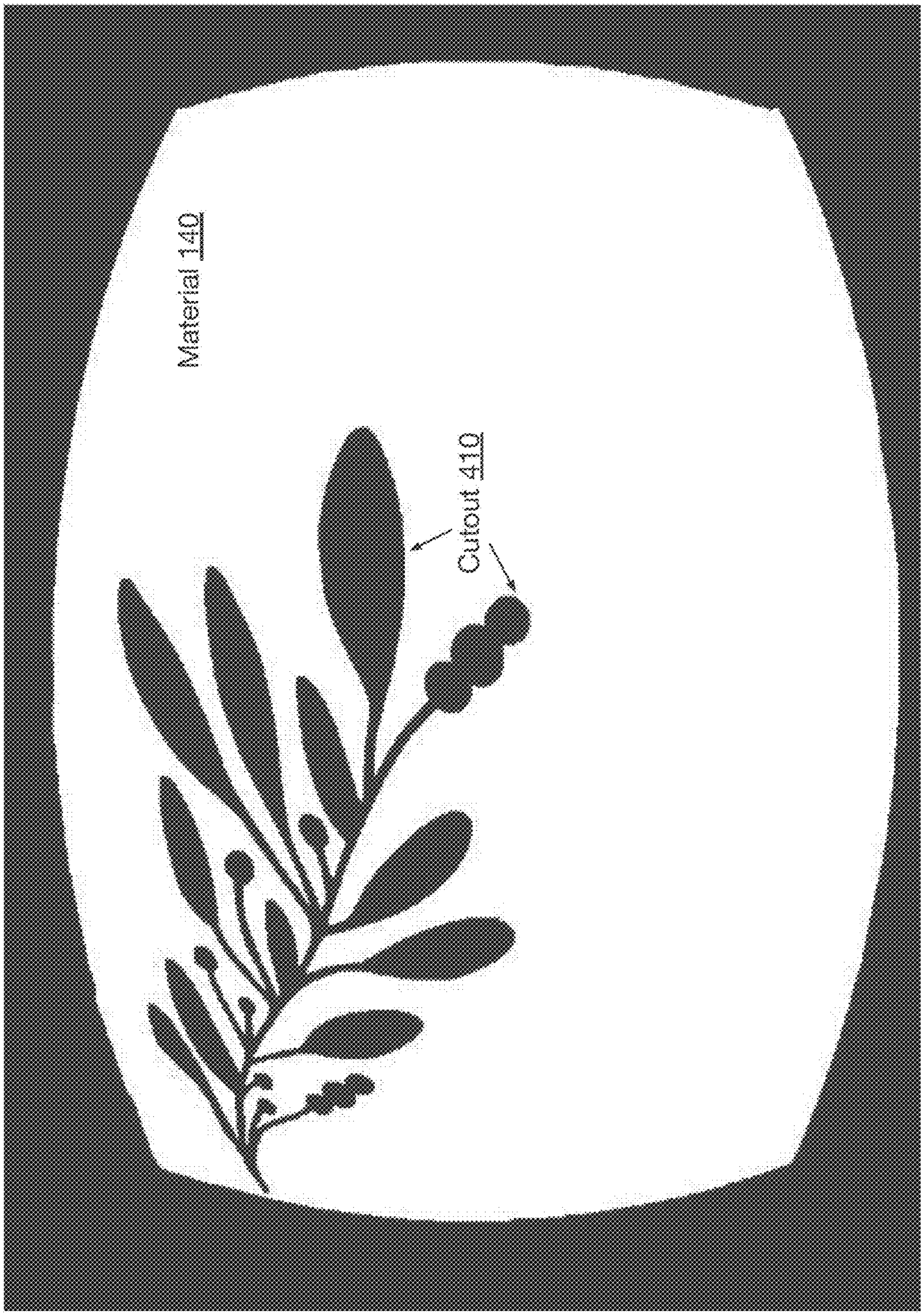
FIG. 4B depicts another example of an image of a material subjected to edge detection consistent with implementations of the current subject matter.

FIGS. 4A-B depict another example of the material 140 disposed on the material bed 150 of the computer numerically controlled machine 100. The example of the material 140 shown in FIGS. 4A-B includes a single cutout 410 and multiple etched designs including, for example, a first engraving 420*a*, a second engraving 420*b*, and a third engraving 420*c*. The image of the material 140 shown in FIG. 4A may be captured by one or more cameras at the computer numerically controlled machine 100, such as the lid camera 110 mounted to the lid 130 of the computer numerically controlled machine 100. The image shown in FIG. 4B may be rendered and/or processed by a controller 210 whereby the image depicts the result of edge detection by displaying an area where the material 140 is present (i.e., shown in white in FIG. 4B) in sharp contrast to an area where the material is not present (i.e., shown in black in FIG. 4B). Note that the first engraving 420*a*, the second engraving 420*b*, and the third engraving 420*c* as well as the components of the computer numerically controlled machine 100 such as the material bed 150, have been removed from the image.

Figure 5A:
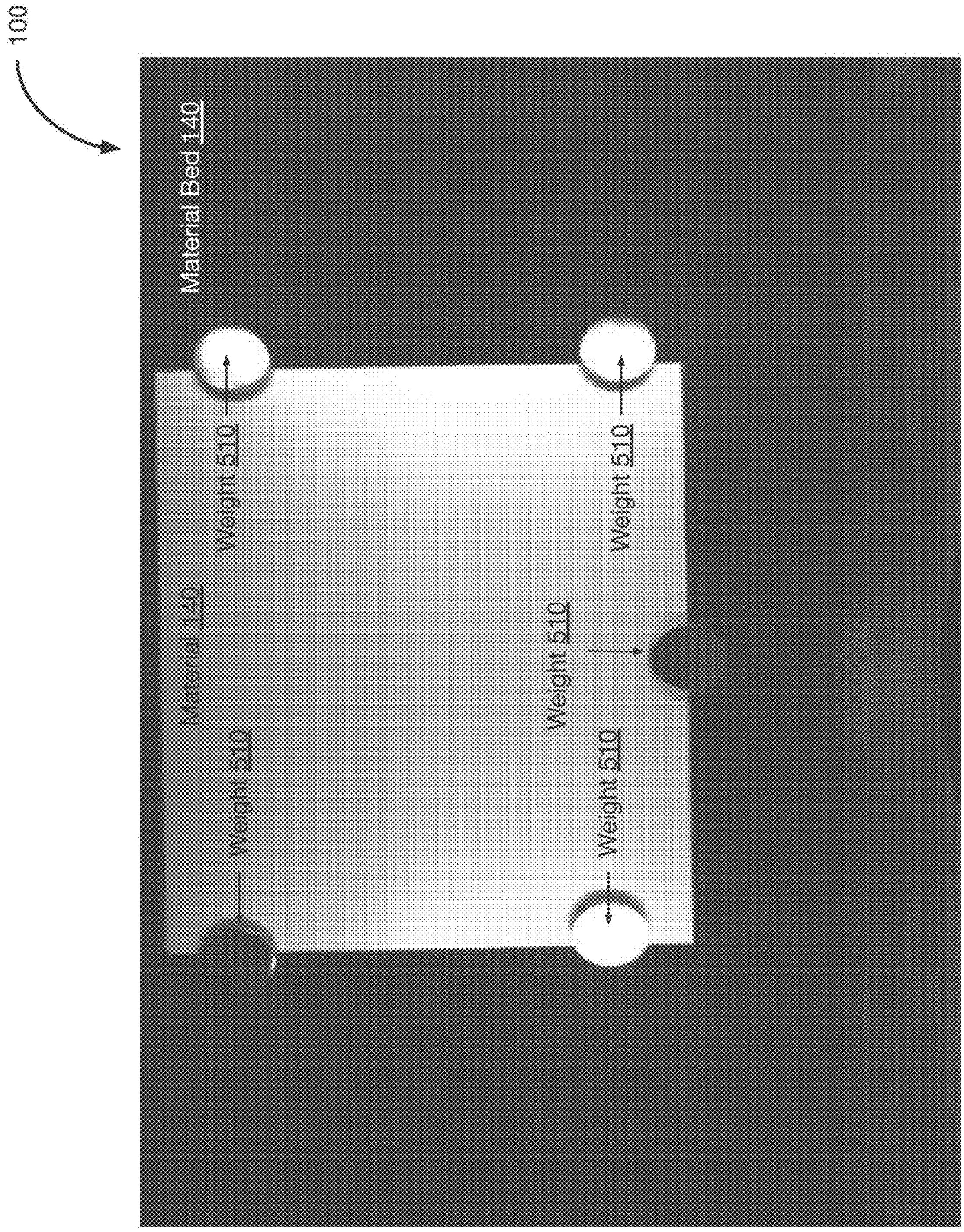
FIG. 5A depicts an image of another example of a material disposed on a material bed in a computer numerically controlled machine consistent with implementations of the current subject matter.
Figure 5B:
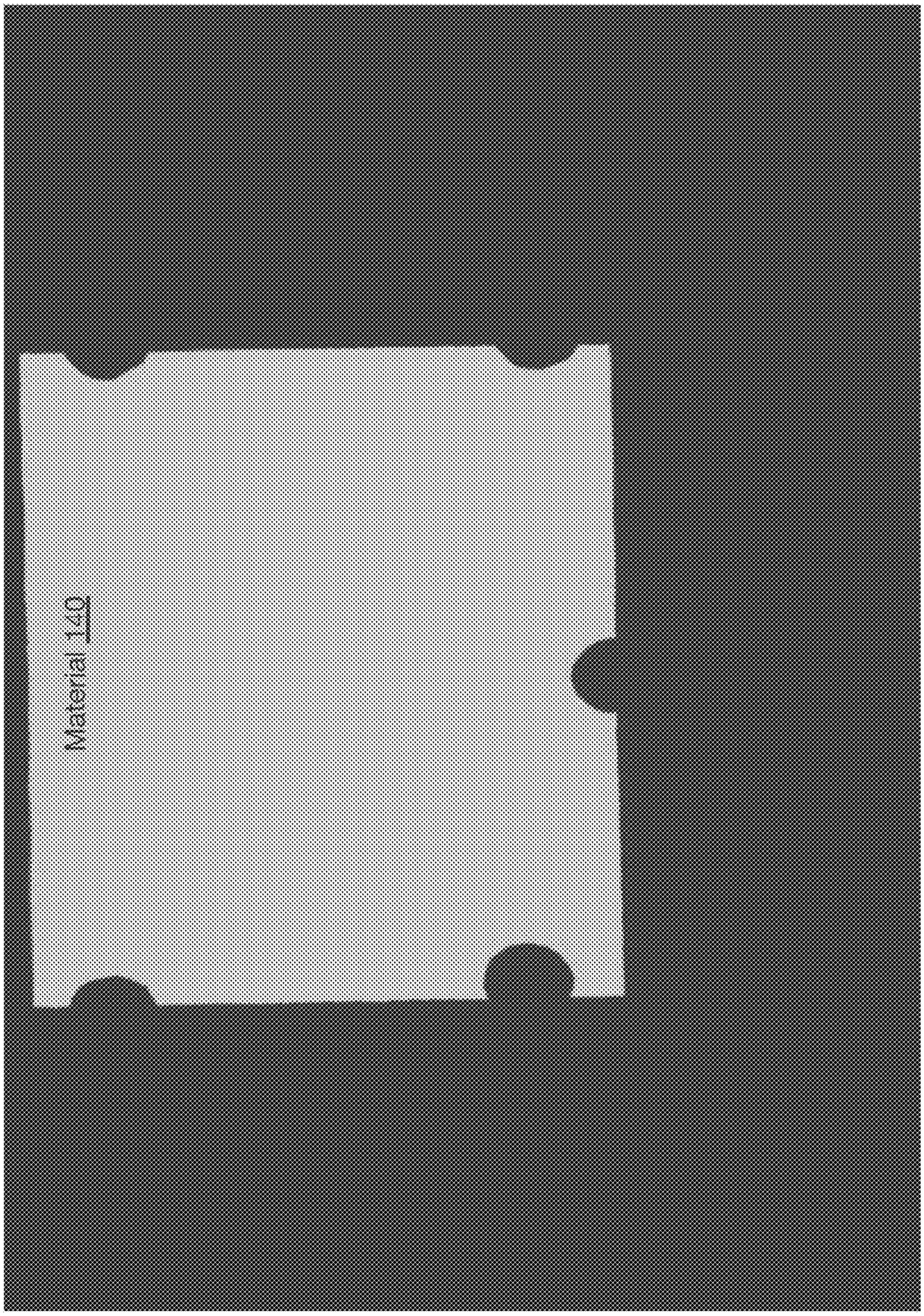
FIG. 5B depicts another example of an image of a material subjected to edge detection consistent with implementations of the current subject matter.

FIGS. 5A-B depict an example use case where portions of the material 140 are obscured by one or more weights 510, which may be used to secure the material 140 to the material bed 150. In this case, edge detection performed by the controller 210 may be used to further differentiate between the material 140 and the one or more weights 510. An image rendered and/or processed by a controller 210 showing the result of the edge detection performed by the controller 210 is shown in FIG. 5B by displaying an area where the material 140 is present (i.e., shown in white in FIG. 5B) in sharp contrast to an area where the material is not present (i.e., shown in black in FIG. 5B). Note that in this example the one or more edges of the material 140 include the portion of the material 140 where the material 140 transitions to the one or more weights 510.

Figure 6A:
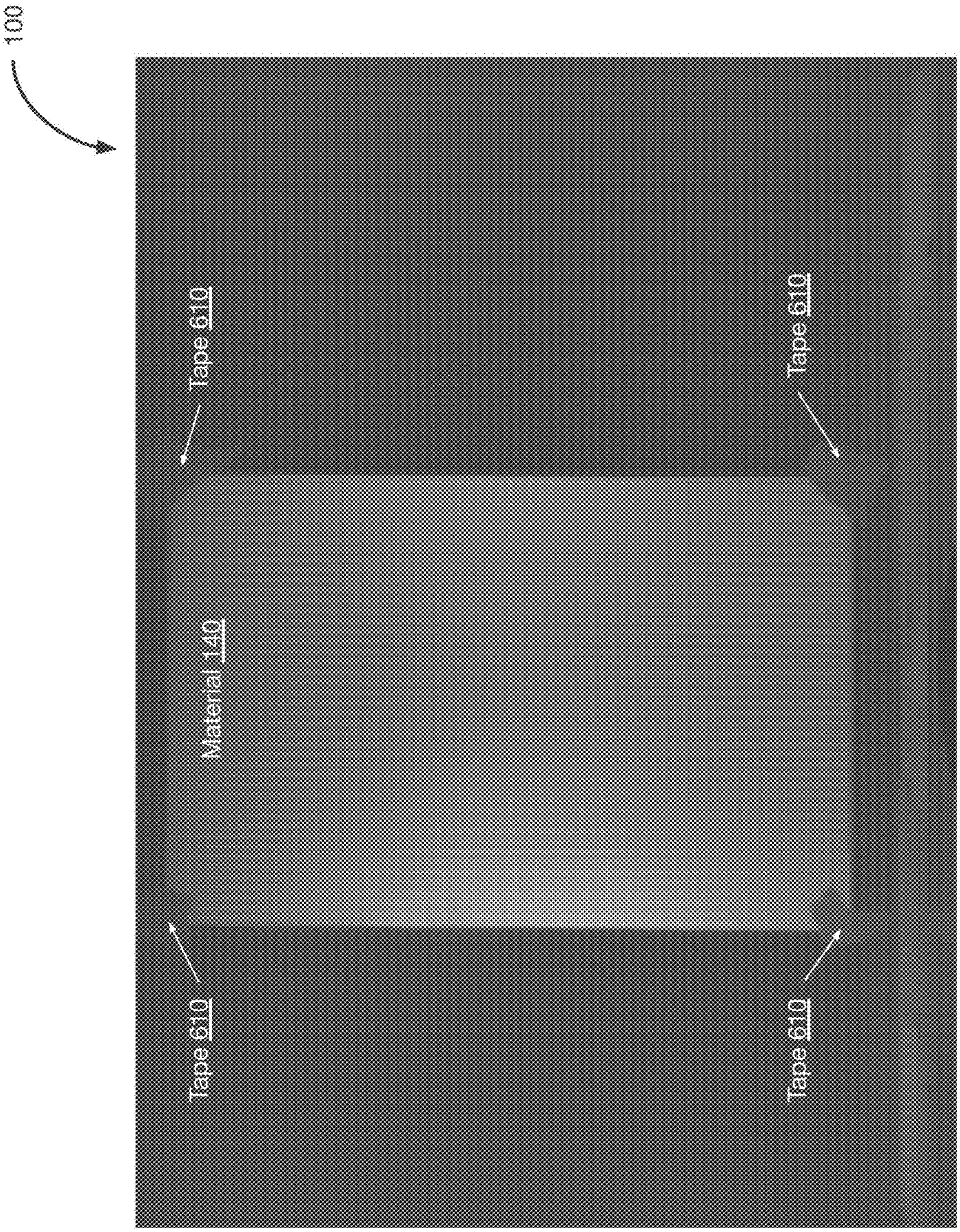
FIG. 6A depicts an image of another example of a material disposed on a material bed in a computer numerically controlled machine consistent with implementations of the current subject matter.
Figure 6B:
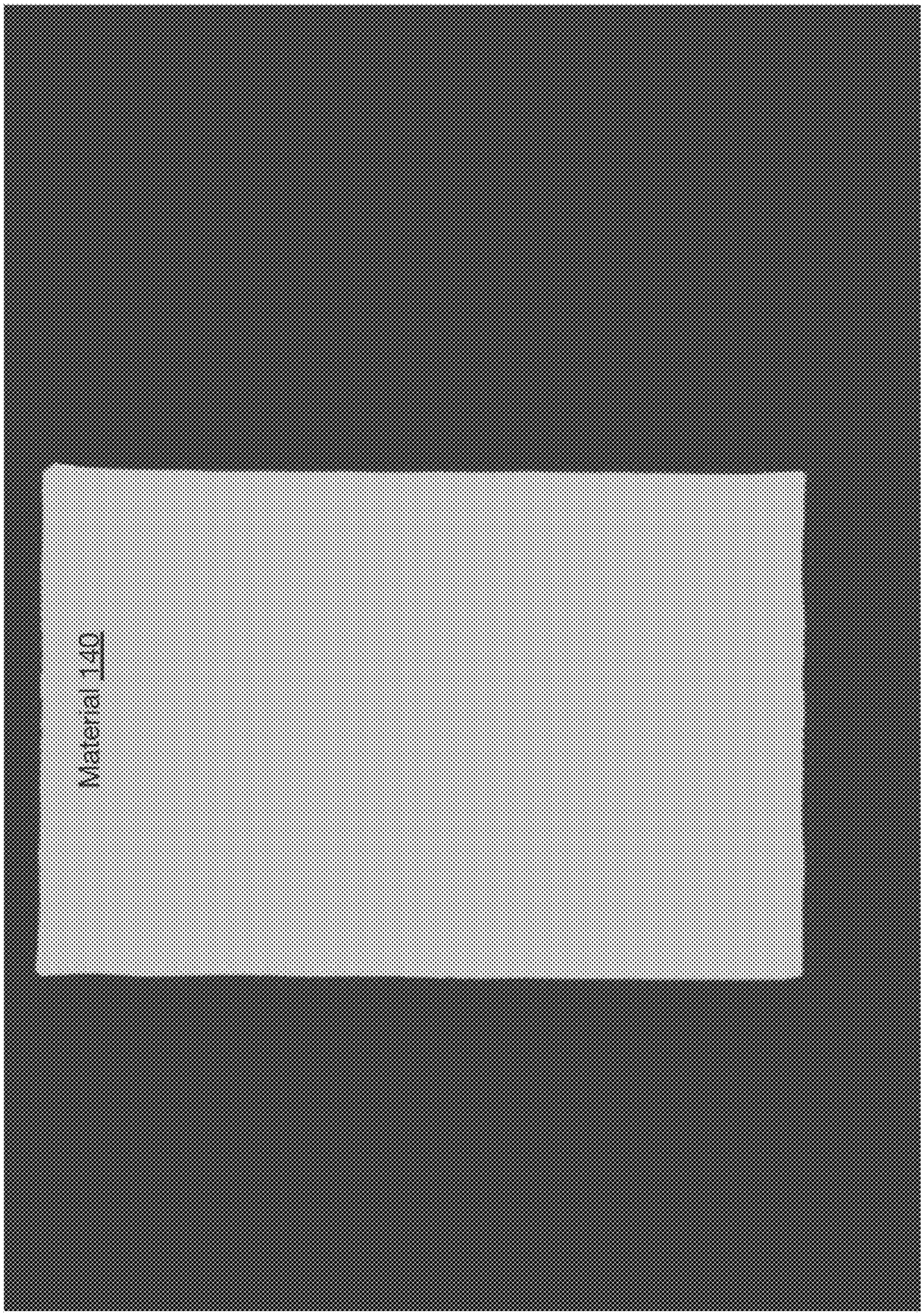
FIG. 6B depicts another example of an image of a material subjected to edge detection consistent with implementations of the current subject matter.

FIGS. 6A-B depict another example use case where portions of the material 140 are obscured by one or more pieces of tape 610, which may be another medium used to secure the material 140 to the material bed 150. In some example embodiments, the controller 210 may determine that a material (e.g., the tape 610) obscuring the material 140 may be subjected to processing by the computer numerically controlled machine 100. For example, the tape 610 may be cut through by the electromagnetic energy delivered by the computer numerically controlled machine 100. In such cases, when detecting the edges of the material 140, the controller 210 may connect the portions of the edge obscured by the tape 610 with the unobscured portions of the edge (e.g., by fitting a line or curve between the unobscured portions). An image showing the result of the edge detection performed by the controller 210 is shown in FIG. 6B. As shown in FIG. 6B, the area where the material 140 is present may be shown (i.e., shown in white in FIG. 6B) in sharp contrast to the area where the material is not present (i.e., shown in black in FIG. 6B). Because the tape 610 can be processed by the computer numerically controlled machine 100, instead of showing the material 140 with portions of its edges obscured by the tape 610, the result of the edge detection shown in FIG. 6B may display the edges of the material 140 obscured by the tape 610 and reconstructed by the controller 210.

It should be noted that areas covered by the tape may require different power levels to cut through compared to the material that is not covered by tape. These areas may be noted by the controller 210 such that a motion plan includes power adjustments when cutting or engraving a design through the tape. For example, for a motion plan corresponding to a design to be cut from or engraved on a material, some embodiments include altering one or more aspects of the motion plan to account for the tape on the material. In some embodiments, altering the motion to account for the tape on the material includes one or both of (i) increasing the laser power applied to the portions of the material covered by the tape when the laser is cutting through or engraving on the portions of the material covered by the tape and/or (ii) reducing the speed of the laser head (thereby increasing a laser dwell time) over the portions of the materials covered by the tape when the laser is cutting through or engraving on the portions of the material covered by the tape. Adjusting the motion plan to account for the tape on the material by either or both increasing the laser power and/or reducing the laser head speed over the portions of the material covered by the tape can help to ensure consistent cutting through and/or engraving on the material despite the presence of the tape.

Figure 7A:
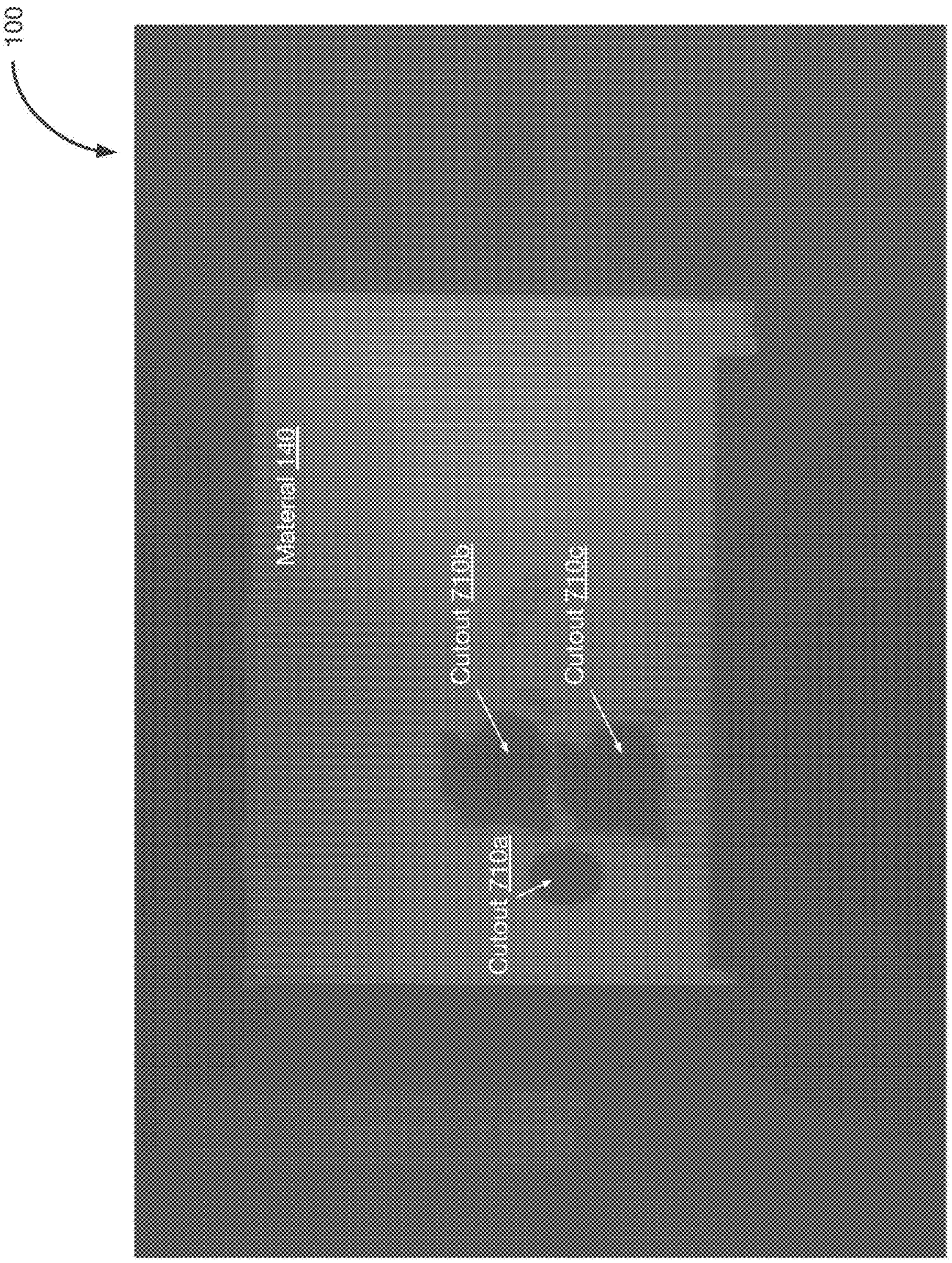
FIG. 7A depicts an image of another example of a material disposed on a material bed in a computer numerically controlled machine consistent with implementations of the current subject matter.
Figure 7B:
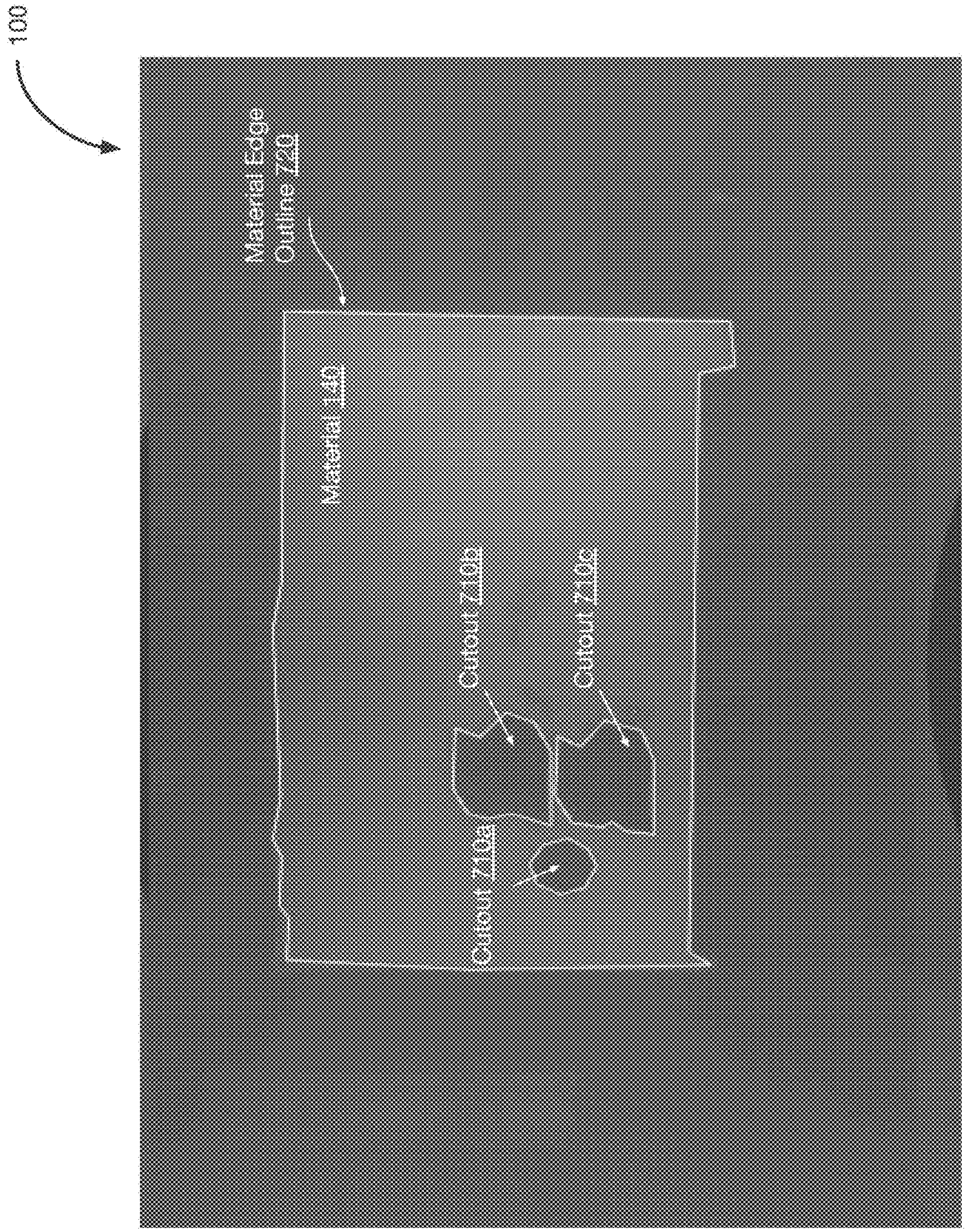
FIG. 7B depicts another example of an image of a material subjected to edge detection consistent with implementations of the current subject matter.
Figure 7C:
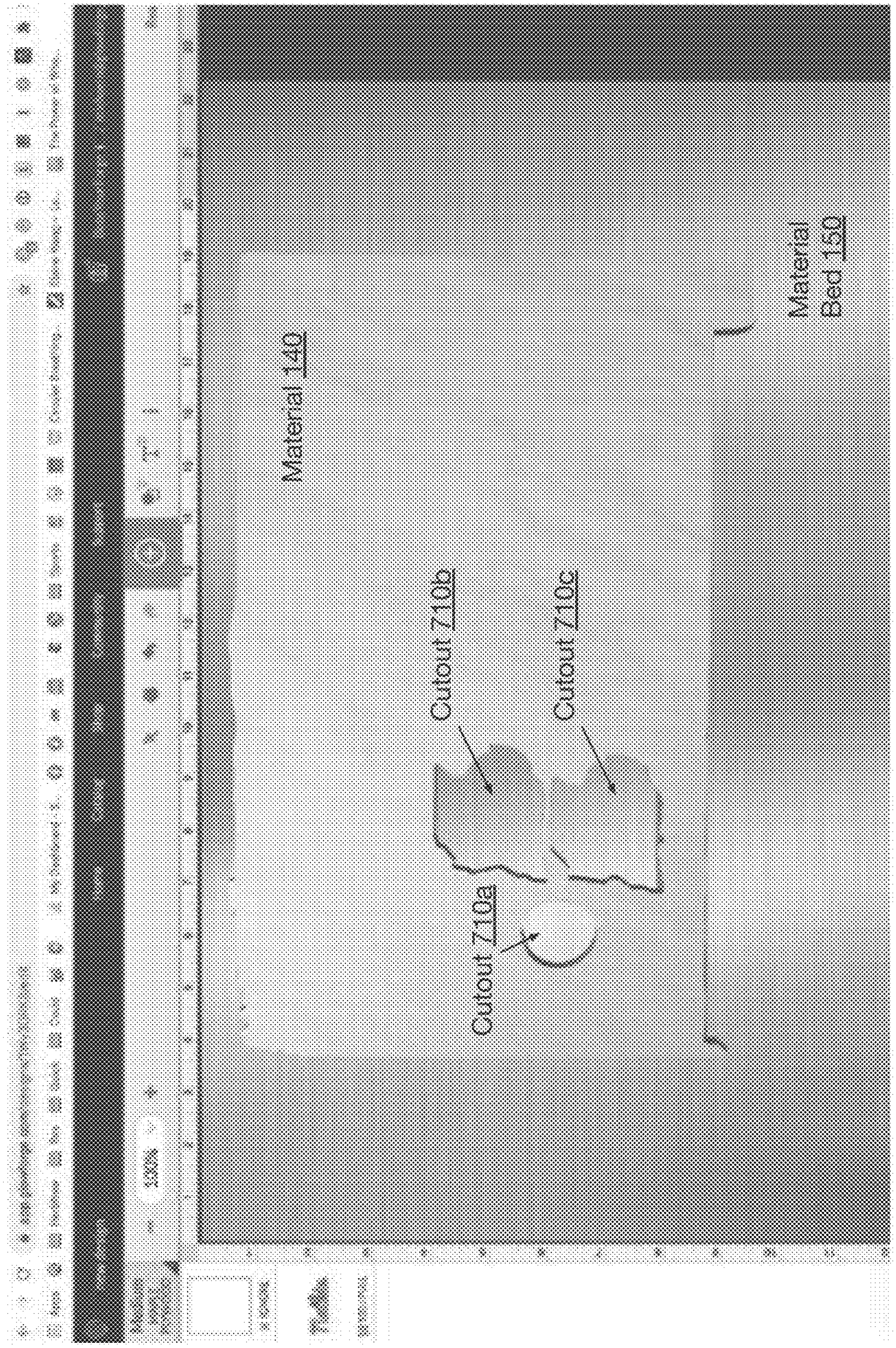
FIG. 7C depicts an example of a user interface displaying a preview of a material subjected to edge detection consistent with implementations of the current subject matter.

FIGS. 7A-C depict another example of the material 140 disposed on the material bed 150 of the computer numerically controlled machine 100. The example of the material 140 shown in FIGS. 7A-C includes multiple cutouts including, for example, a first cutout 710*a*, a second cutout 710*b*, and a third cutout 710*c*. The image of the material 140 shown in FIG. 7A may correspond to a "real world" observation of the material 140 disposed on the material bed 150. Meanwhile, FIG. 7B depicts an image of the material 140 that has been rendered and/or processed by the controller 210 in which edge detection has been performed to identify one or more edges of the material 140. Accordingly, the image shown in FIG. 7B may include an outline superimposed on the edges associated with the outer perimeter of the material 140 as well as the edges associated with the first cutout 710*a*, the second cutout 710*b*, and the third cutout 710*c* in the material 140. FIG. 7C depicts an example of a user interface 700 displaying a preview of the material 140 disposed on the material bed 150. The preview of the material 140 may include a result of the edge detection performed with respect to the material 140 including, for example, a three-dimensional rendering of the edges associated with the outer perimeter of the material 140 as well as the edges associated with the first cutout 710*a*, the second cutout 710*b*, and the third cutout 710*c* in the material 140.

In some implementations of the current subject matter, edge detection may be performed to supplement the analysis of the surface properties of the material 140, which may be useful in effecting the desired manufacturing outcome (e.g., print previews and optimizing for natural variation in material surfaces), support for users in managing material supply (e.g., data systems needed for material tracking), and enabling the production of manufacturing products of increased complexity (e.g., processing mixed or variegated materials). For example, information regarding the surface properties of the material 140 and the location of edges may be used to generate a visualization of the outcome of processing the material 140. An example of this visualization is shown in FIG. 7C in which the user interface 700 provides a three-dimensional preview of the material 140 including a simulation of the various textures that may be present in the material 140. Renderings with greater realism may be achieved by employing the probability of the kinds of patterns typically seen on the surface of different materials.

Information regarding the surface properties of the material 140 may include natural variations present in the material 140. This information may be used for identifying the material 140 as well as for various forms of localization. For example, natural variations present in the material 140, such as wood grain, knots, ply orientations, and/or the like, may be captured and presented to the user for incorporation in the one or more designs placed on the material 140. In some cases, the variations that are present in the material 140 may be conveyed via one or more identifiers disposed directly on the surface of the material 140 or on a covering disposed on the surface of the material 140, for example, as part of a packaging associated with the material 140. Examples of identifiers may include a Quick Response (QR) code, a stock keeping unit (SKU) code, a barcode, and/or the like. The one or more identifiers may also include markings forming a fluorescent pattern (e.g., one or more ultraviolet (UV) barcodes and/or the like) that is invisible in the absence of a fluorescence inducing light source. In cases where the identifiers are disposed on a covering and not on the material 140 directly, an image of the material 140 may be captured (e.g., at the factory) prior to applying a cover on the material 140, and that image may be retrieved based on the one or more identifiers during a design phase (e.g., advanced preview) to show the natural variations that are present in the material 140.

It should be appreciated that a variety of mechanisms may be used to identify the material 140 including, for example, an identifier (e.g., a Quick Response (QR) code, a stock keeping unit (SKU) code, a barcode, and/or the like), one or more user-uploaded images, one or more automatically imaged photographs, and one or more scans and/or camera images of the surface of the material 140 captured by the computer numerically controlled machine, and/or the like. These mechanisms may enable the controller 210 to generate, based on an actual image of the material 140 captured at some point in time before the placement of contact paper, a visualization (or other preview) of the material 140. Doing so may enable a user to exploit the natural variations that are present in the exact piece of the material 140 to achieve a desired outcome. By contrast, this level of customization and optimization, which is specific to the actual piece of the material 140 being processed, is typically unavailable.

Information regarding the surface properties of the material 140 may be used to extract information regarding various physical properties of the material 140 including its shape, contours, and/or the like. In one example use case, information regarding the surface properties of the material 140 may be used to provide an estimate of the warpage that may be present in the material 140 prior to processing by the computer numerically controlled machine 100. For example, the orientation of the wood grain that is present in the material 140, which may be determined based on the one or more identifiers on the material 140, may be used to generate inferences about the direction in which the material 140 is likely to be warped. This inference may inform the location and quantity of height measurements. For instance, if the wood grain of the material 140 causes the material 140 to bow along the y-axis and the material 140 is covered with a grid of height measurements (of the height of the material 140 at various locations), the controller 210 may determine to perform the height measurement at more locations along the y-axis than along the x-axis.

It should be appreciated that additional information may be used to perform warp estimation. For example, if the material 140 is a warped piece of walnut hardwood that is substantially longer than it is wide (e.g., an 18"×1" piece of walnut hardwood), it is possible that the weight of the material 140 being distributed along such a narrow space may cause the material 140 to flatten out under the force of gravity alone. Thus, by understanding the shape of the material 140, as well as the strength and density of the material 140, the controller 210 may generate an accurate estimate of the warpage that may be present in the material 140 and use that information to avoid unnecessary measurements.

As noted, edge detection may be performed in order to support the processing of the material 140 where the material 140 is a mixed material that combines, for example, a first material and a second material. In that particular use case, a user may place one or more designs across the material and process the material 140 in a single print across the first material and the second material forming the material 140. Edge detection in this case may be used to identify the boundaries between the first material and the second material. In addition, additional information regarding the surface properties of the material 140 may be obtained, for example, through multiple autofocus measurements, identifiers patterned across the surface of the material 140, and/or the like. Knowing where the transitions between the first material and the second material occur as well as the various surface properties of the material 140 may ensure appropriate settings (e.g., power of electromagnetic energy, speed of the head 160, quantity of passes, and/or the like) are applied to the processing of the first material and the second material.

In some cases, the controller 210 may apply additional safeguards to account for the transition between the first material and the second material. In one example, the controller 210 may impose a margin (e.g., ¼ inch and/or the like) on either side of the transition from the first material to the second material. This margin may serve as a buffer zone where the settings suitable for one material may be changed to the settings suitable for processing the other material. The settings of the computer numerically controlled machine 100 may be further adjusted to process a third material that is used for joining the first material and the second material (e.g., tape, glue, or other adhesive). For example, the controller 210 may increase the power of the electromagnetic energy, decrease the speed of the head 160, and/or perform a greater quantity of passes in order to process the adhesive joining the first material and the second material. Alternatively and/or additionally, the controller 210 may modify the order in which designs are processed if the processing of one material is expected to alter the features and/or characteristics of the other material in some manner. For instance, the first material may push against the second material due to thermal expansion of the first material. The first material losing mass, for example, due to the removal of a large portion of the first material, may cause the second material to push against the first material. The controller 210 may thus modify the order in which the first material and the second material are cut in order to avoid the aforementioned phenomena.

In some implementations of the current subject matter, the controller 210 may determine, based at least on the one or more edges of the material 140, an optimal design placement that maximizes an efficiency in the utilization of the material 140 including by minimizing the quantity of scrap material and maximizing the output associated with the processing of the material 140. As noted, the controller 210 may track material use over time including across multiple projects, pieces of material, users, and computer numerically controlled machines. It should be appreciated that this historical information from past fabrications may be used to further optimize the design placements generated by the controller. In this context, knowing where the edges of the material 140 are may enable the controller 210 to determine the quantity of material 140 remaining for additional processing. For example, the controller 210 may perform edge detection (with or without user input) to identify which unused portions of the material 140 constitute scrap and/or not scrap. This information may be stored in a database (or another data store) for subsequent use by the controller 210. For instance, the database may store material area estimates including, for example, identifiers of unused material, images of unused material, dimensions of unused material, a total quantity of unused material (e.g., a total area), and usable portions of the unused material (which may consider material margins, shape dimensions (e.g., square/rectangle) that can be accommodated by the unused material, and/or the like). The database may also store other information including, for example, the perimeter of a material (and/or ratio of perimeter to area), convex hull (and/or ratio of area to convex hull area), image moments (e.g., invariants used to measure geometric properties such as scale, orientation, reflection, and location of object center in a segmented image), topological features (e.g., quantity of cutouts such as holes), an embedding of an image of the material into the parameter-space of a neural network, and/or the like.

The material area estimates may be associated with a material identifier, which may be specific to the type of material, the projects using the material, and/or a user associated with the material. In one example use case, a user may load a sheet of plywood used in a previous project (e.g., a pair of earrings) and the controller 210 may retrieve the material area estimates associated with that sheet of plywood based on one or more identifiers (e.g., a Quick Response (QR) code, a stock keeping unit (SKU) code, a barcode, and/or the like) present on the plywood. In another example use case, a user with a design may be provided with a suggestion of material identifier (or a list of material identifiers) for a sheet of plywood and/or an image of the sheet of plywood, within an inventory of new and previously used material that contains material sufficient to place the design on.

In some implementations of the current subject matter, the controller 210 may generate, based on the identification of the material 140, one or more suggestions of designs that the material 140 is able to accommodate. These suggested designs may originate from a general catalog or a custom catalog associated with one or more users (or user groups). If a previous print project was stored for the material 140, then the controller 210 may suggest designs that include those previously processed designs if those designs are able to fit on the material 140. Referring again to the earlier example use case, the controller 210 may generate a prompt asking whether the user who loaded the plywood wishes to print additional pairs of the same earrings on the plywood. The user is thus given the option to open up the same design file and/or select a different design from a catalog. Because the controller 210 tracks historical material use, the controller 210 may detect when additional material is required to complete a project. As such, the controller 210 may generate one or more notifications suggesting more material when the supply of available material falls below a threshold level or when the quantity of available material is insufficient for completing a current project. Alternatively and/or additionally, the controller may automatically establish an order of additional material when the supply of available material falls below a threshold level or when the quantity of available material is insufficient for completing a current project.

In some implementations of the current subject matter, the tracking of historical material usage may also enable the controller 210 to recommend, from an existing supply of materials, one or more pieces of materials that are capable of accommodating a design. Thus, based on one or more designs selected by a user, the controller 210 may search through the database to identify materials whose dimensions are sufficient to accommodate the one or more designs. For example, the controller 210 may support a "history" functionality tracking the materials that are left over from previous projects and provide an inventory of possible materials for completing a project, for example, by referencing each piece of material by an identifier, the type of material, number marking, shape, and/or the like. In some cases, the controller 210 may further provide a confirmation of whether a piece of material placed in the computer numerically controlled machine 100 is a piece of material suggested for the project. This feature may maximize efficiency in the utilization of various materials including by encouraging the use of scrap materials.

If the one or more designs are too large for any single piece of material, the controller 210 may automatically split the designs along one or more detected material edges. The controller 210 may further generate and incorporate, into the designs, a joinery (e.g. puzzle pieces, tabs and slots, and/or the like) such that the split portions of the design may be assembled post-processing. For example, when the controller 210 determines that a design will not fit on a first piece of material, the design can be split into (i) a first portion to be fabricated from the first piece of material and (i) a second portion to be fabricated from a second piece of material. Further, a first joinery is incorporated into the design for the first portion, and a second joinery is incorporated into the design for the second portion. The first joinery is configured to interface with the second joinery so that, after fabricating the first portion from the first piece of material and fabricating the second portion from the second piece of material, the first portion can be joined with the second portion via the first and second joineries.

In some embodiments, the first joinery incorporated into the design for the first portion is based on where the design is placed on the first piece of material and the one or more material edges of the first piece of material, and the geometry of the second joinery is determined based on the geometry of the first joinery. In some embodiments, the second piece of material can be selected from the above-described inventory (including scrap materials) based at least in part on the geometry required for the second joinery.

In some implementations of the current subject matter, edge detection may be performed to support a pass through mode of processing in which the material 140 is moved through the computer numerically controlled machine (e.g., using the horizontal slots in the case of the computer numerically controlled machine 100) to allow the computer numerically controlled machine 100 to process a first portion of the material 140 before a second portion of the material 140. The pass through mode of processing is typically used when the material 140 is larger and cannot be processed by the computer numerically controlled machine 100 at once.

Edge detection may be performed in this case to align the changes effected on the first portion of the material 140 with those effected on the second portion of the material 140. For example, the controller 210 may perform the alignment by comparing a first image of the first portion of the material 140 with a second image of the second portion of the material 140, identifying common features within the first image and the second image, and solving for the translation and rotation needed to align the common features. However, when the material 140 is substantially narrower than the material bed 150, most of the common features identified by the controller 210 will be on the material bed 150 (or another static portion of the workspace). When solving for a corresponding translation and rotation, the controller 210 may incorrectly determine that most of the matching features have not moved at all. Thus, applying edge detection in this case may allow the controller 210 to identify portions of the images corresponding to the material bed 150 and eliminate the features associated with the material bed 150 from consideration. Instead, alignment may be performed based on the features that are present on the material 140, thereby eliminating the risk of an incorrect translation and/or rotation during the alignment process.

In some cases, the material 140 may be identified based on an identifier on the material 140, user inputs, and/or the like, in which case various characteristics of the material 140, such as its dimensions, may be retrieved prior to processing for use in determining an optimal design placement. If the material has been previously used, then the historical material usage data tracked by the controller 210 may be used to identify various features that may be present in the material including, for example, cutouts, holes, and/or the like. If the material 140 is larger, the characteristics of the material 140 may be determined in portions as the material 140 is passed through the computer numerically controlled machine 100. This information may be used to ensure that the designs are appropriately positioned on the material 140 even though the material 140 has an odd shape and/or is being reused with existing cutouts. The controller 210 may further confirm, based on the identifier on the material 140, that the material 140 has been previously used. If the material 140 fails to match a previously used piece of material, the controller 210 may generate a corresponding alert. Contrastingly, if the controller 210 has already encountered the material 140 for a previous project, the computations associated with edge detection may be simplified. For example, when calculating margins to determine an optimal design placement, a cut file or past knowledge of how the processing that the material 140 has been subjected to may be used to reduce or eliminate the need for calibrations such as a deep scan to detect variations in the height (and/or thickness) of the material 140.

Figure 8:
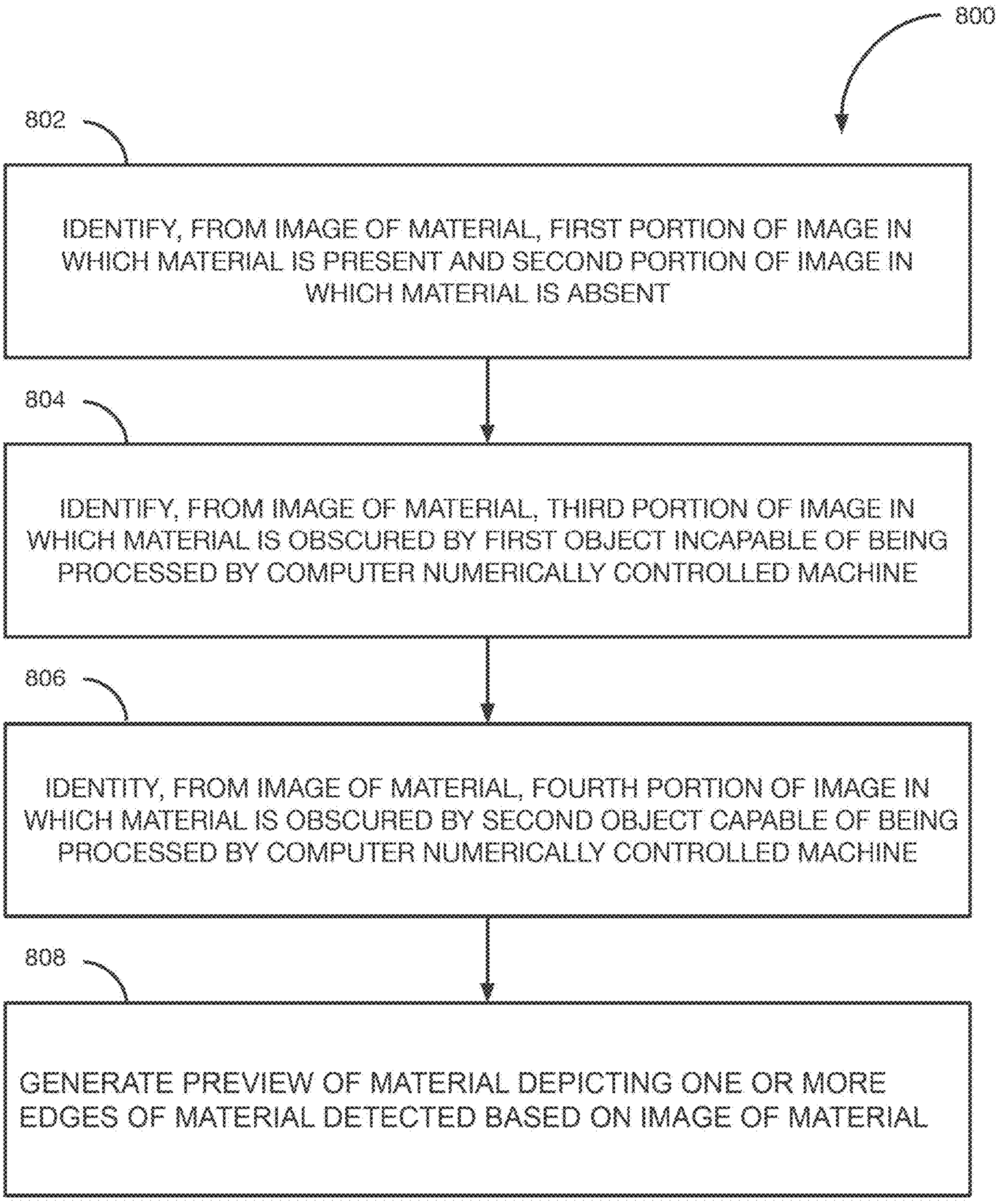
FIG. 8 depicts a flowchart illustrating an example of a process for edge detection consistent with implementations of the current subject matter.

FIG. 8 depicts a flowchart illustrating an example of a process 800 for edge detection consistent with implementations of the current subject matter. The process 800 may be performed by the controller 210 in order to identify one or more edges present in the material 140.

At block 802, the controller 210 may identify, from an image of the material 140, a first portion of the image in which the material 140 is present and a second portion of the image in which the material 140 is absent. In some implementations of the current subject matter, the controller 210 may perform edge detection by analyzing one or more images of the material 140 captured, for example, by one or more cameras such as the lid camera 110 mounted on the lid 130, the head camera 120 mounted on the head 160, and/or the like. For example, the head camera 120 mounted on the head 160 of the computer numerically controlled machine 100 may be deployed to capture multiple images of the material 140. Alternatively and/or additionally, a first image captured by the camera mounted on the lid 130 may be used to identify one or more locations, including where one or more edges of the material 140 are likely to be, where a close-up image is necessary. The head camera 120 mounted on the head 160 may be sent to those locations to capture one or more second images having more details than the first image.

The first image and/or the second image may be analyzed to detect one or more edges including by detecting one or more transitions between a presence of the material 140 and an absence of the material 140. These transitions may occur in areas of the first image and/or the second image having a high contrast (e.g., above threshold contrast) being associated with an absence of the material 140. The presence and/or the absence of the material 140 may also be detected based on a corresponding presence and/or absence of a pattern (e.g., a honeycomb pattern) associated with the material bed 150 on which the material 140 is resting. Alternatively and/or additionally, if one or more identifiers are patterned across the surface of the material 140, one or more edges of the material 140 may be detected based on the presence and/or absence of the pattern associated with the one or more identifiers.

In some implementations of the current subject matter, the controller 210 may determine that an edge is present in the material 140 by detecting a change in height or thickness of the material 140. Accordingly, one or more edges of the material 140 may be detected by detecting a shift (or translation) in a position of the structured light, for example, one or more dots in a grid, projected on the surface of the material 140. Additional details associated with the use of structured light are described in U.S. patent application Ser. No. 17/133,908, the disclosure of which is incorporated herein by reference in its entirety.

In some cases, the controller 210 may use an indication stored in memory of the processing of a previous design to identify one or more edges in the material 140. To verify the presence of the edge, a height map may be referenced (e.g., the height map generated based on one or more measurements of a structured light projected on the surface of the material 140) to determine whether one area of the material 140 is higher (or thicker) than the second area, for example, by more than a threshold quantity. Alternatively and/or additionally, a difference in the height (and/or thickness) between adjacent areas in the material 140 may be compared to an expected height (and/or thickness) of the material 140. It should be appreciated that the expected height and/or thickness of the material 140 may be determined by a variety of means including, for example, by lookup (e.g., based on a barcode associated with the material 140) and/or based on user input. Moreover, the expected height and/or thickness of the material 140 may be calibrated to account for the presence and/or absence of the material bed 150.

In some implementations of the current subject matter, the material bed 150 (or tray) may be used as a background for performing subtraction (or other computations) to help determine a difference between areas occupied by the material 140 and those not occupied by the material. For example, the controller 210 may detect the one or more edges of the material 140 by subtracting a first image of the material bed 150 without the material 140 from a second image of the material bed 150 with the material 140. It should be appreciated that the first image may be captured during the manufacturing and assembly of the computer numerically controlled machine and the second image may be captured during subsequent operation such that, for example, only a single image may be captured during the edge detection procedure. For example, in some embodiments, by using an image captured during manufacturing and/or assembly of the CNC machine, the edge detection procedure can be accomplished by capturing only a single image of the material placed on the material bed. In operation, the image of the material captured for the edge detection procedure can be compared with the image captured during manufacturing and/or assembly of the CNC machine to determine the edges of material. Some embodiments may include two images captured during manufacturing and/or assembly of the CNC machine: (i) a first image with the material bed 150 placed within the CNC machine and (ii) a second image of the bottom of the interior of the CNC machine without the material bed 150 placed therein. Then, when the CNC machine is operated with the material bed 150, the image of the material on the material bed can be compared with the first image that has the material bed 150 placed within the CNC machine for use with determining the edges of the material. And when the CNC machine is operated without the material bed 150, the image of the material on the bottom of the interior of the CNC machine can be compared with the second image of the bottom of the interior of the CNC machine without the material bed for use with determining the edges of the material. In some embodiments, the one or more images captured during manufacturing and/or assembly of the CNC machine are at least one of (i) stored in memory on the CNC machine, (ii) stored in memory of a controller device, and/or (iii) stored at a network location from where the image(s) can be retrieved and used for the edge detection procedure.

In some cases, the outermost edge that is determined by the image subtraction may be shrunken to define a margin of the material 140. Alternatively and/or additionally, the margin of the material 140 may be determined by expanding the innermost edge determined by the image subtraction. The magnitude of this shrinkage and/or expansion may be a function of the type of the material 140, one or more properties of the computer numerically controlled machine 100, and/or the like. Examples of such approaches are described in U.S. Patent Publication No. 2018/0150047, the disclosure of which is incorporated herein by reference in its entirety.

In some implementations of the current subject matter, one or more machine learning models, such as neural networks and/or the like, may be trained to analyze the images of the material 140 to detect one or more edges in the material 140 by detecting the presence and/or absence of the material 140. For example, a neural network, which may include multiple layers trained to extract features from one or more previous layers as a numerical value, may be trained to perform a semantic segmentation task that includes assigning, to each pixel within an image, a class corresponding to whether the pixel represents the material 140 or a background (e.g., the material bed 150). Alternatively, the neural network may be trained to perform an instance segmentation in which the neural network further assigns the pixels associated with the material 140 to a class corresponding to a type of the material 140. The neural network may include one or more initial layers trained to detect simple features such as, for example, "does this 5×5 pixel region look like a line?" "is this 3×3 pixel region bright?". Subsequent layers may apply one or more activation functions to combine the output from the initial layers and extract more complex information such as "do the lines and bright spots in this prior 30×30 pixel region describe a texture usually associated with wood grain?" When an image is passed through sufficient layers, the neural network may ultimately output, for each pixel, a value indicating the likelihood of the pixel being a member of a particular class. For example, for the neural network trained to perform instance segmentation the probability may be a value, for example, between 0 and 1, indicating a certainty of each pixel being the material 140 (e.g., 0=definitely not material and 1=definitely material).

In one example implementation of the current subject matter, the neural network may be trained using distortion-corrected images, for example, captured by one or more cameras such as the lid camera 110 mounted to the lid 130 (or by lid cameras at different computer numerically controlled machines), and the edge detection may be performed using at least some images from the one or more cameras in the computer numerically controlled machine 100. Various techniques using, for example, the height (or thickness) of the material 140 and a calibrated camera model (e.g., converting three-dimensional world coordinates to 2-dimensional camera coordinates) may be used to convert distorted images to distortion-corrected images.

At block 804, the controller 210 may identify, from the image of the material 140, a third portion of the image in which the material 140 is obscured by a first object incapable of being processed by the computer numerically controlled machine 100. In some implementations of the current subject matter, the height (or thickness) of the material may be used to detect the presence of a foreign object such as magnets, weights, pins, tape, and/or the like. In some cases, the foreign object may not be suitable for processing by the computer numerically controlled machine 100. For example, magnets, weights and/or pins on the material 140 may not be cut or engraved by the electromagnetic energy delivered by the computer numerically controlled machine. Thus, to account for the presence of the foreign object, which cannot be processed by the computer numerically controlled machine 100, the controller 210 may incorporate the edges of the foreign object as one or more of the edges of the material 140. An example of the controller incorporating the edges of one or more foreign objects incapable of being processed by the computer numerically controlled machine 100 is shown in FIGS. 5A-B. As shown in FIGS. 5A-B, the edges of the material 140 may include a portion of the material 140 where the material 140 transitions to the foreign object (e.g., the one or more weights 510 in FIGS. 5A-B). For instance, the result of the edge detection depicted in FIGS. 5A-B shows the edges surrounding the perimeter of the material 140 and those associated with the one or more weights 510.

At block 806, the controller 210 may identify, from the image of the material 140, a fourth portion of the image in which the material 140 is obscured by a second object capable of being processed by the computer numerically controlled machine 100. In some cases, instead of and/or in addition to foreign objects that cannot be processed by the computer numerically controlled machine 100, the material 140 may be obscured by one or more foreign objects that are capable of being processed by the computer numerically controlled machine 100. For example, the foreign object may be translucent and capable of being engraved or cut through by the electromagnetic energy delivered by the computer numerically controlled machine, in which case it may be possible to "see through" the foreign object and detect the presence of the edge of the material 140 through the foreign object. Contrastingly, if the foreign object is opaque but can still be subject to processing by the computer numerically controlled machine 100 (e.g., opaque tape and/or the like), edge detection may be performed to assume that edge underneath joins the two visible edges that aren't covered by the foreign object. An example of this use case is shown in FIGS. 6A-B where the result of the edge detection shows the edges surrounding the outer perimeter of the material 140 without the tape 610 applied to the material 140.

At block 808, the controller 210 may generate a preview of the material 140 depicting one or more edges of the material 140 detected based on the image of the material. For example, in some implementations of the current subject matter, the controller 210 may generate a preview depicting the one or more edges of the material 140. The material 140 may include a first edge where the image of the material 140 includes a transition from the first portion where the material 140 is present to the second portion where the material 140 is absent. The existing edges of the material 140 are not affected by the presence of foreign objects capable of being processed by the computer numerically controlled machine 100. Thus, the preview of the material 140 may include the edges of the material 140 obscured by foreign objects capable of being processed by the computer numerically controlled machine 100 (e.g., the edges of the material 140 underneath the tape 610 shown in FIGS. 6A-B). Alternatively, additional edges may be present in areas where the material 140 is obscured by foreign objects incapable of being processed by the computer numerically controlled machine 100. The preview of the material 140 may therefore include the edges surrounding the perimeter of the material 140 as well as the edges surrounding at least a portion of the perimeter of the foreign objects incapable of being processed by the computer numerically controlled machine 100 (e.g., the edges of the weights 510 shown in FIGS. 5A-B).

As noted, the controller 210 may perform edge detection in order to determine an optimal placement of one or more designs on the material 140. Moreover, the controller 210 may provide one or more feedback to encourage a placement of the one or more designs that is consistent with the optimal design placement. In one example, the one or more feedback may discourage a design from being placed beyond one or more edges of the material 140 and/or a margin defined relative to the one or more edges of the material 140. Some examples of feedback may include an alert and an automatic re-positioning and/or re-sizing of the design to avoid a placement that exceeds the edges of the material 140 and/or the corresponding margins. According to some implementations of the current subject matter, the feedback may include a modification of the interaction model presented in a user interface (e.g., a graphical user interface and/or the like). For instance, the interaction with a design and/or the material 140 through the user interface may exhibit a density, drag, weight, velocity, and/or friction as the user modifies the position of the design such that the density, drag, weight, velocity, and/or friction is proportional to a distance of the design relative to an edge of the material 140. Thus, it may become increasingly difficult to move the design via the user interface as the design approaches an edge (or a margin defined relative to the edge) of the material 140.

In some implementations of the current subject matter, feedback in the user interface may be configured to encourage the optimal placement of the one or more designs on the material. In the case of design packing, where designs (or replicas of one or more designs) are placed on the material 140 with a minimum quantity of unused material between adjacent designs, the user interface may exhibit a perceived attractive force that encourages two or more designs (or replicas of the same design) being placed on the material 140 to pack as closely together as possible within the boundary of the material 140. In some cases, densely packing a design to achieve an optimal design placement may include identifying a first edge in a first design that should overlap with a second edge in a second design in order to avoid double-cutting. For example, the first design and the second design may be two equally sized square objects (e.g., both 3×3 inches), in which case the first design and the second design may be packed side-by-side onto the material 140 as a single 6×3 inch rectangle with the first design and the second design sharing an edge that is cut once instead of twice. Absent any changes to pack the two designs, the shared edge between the first design and the second design may be cut twice, which may lead to charring (and other undesirable side effects).

In some cases where a first area of the material 140 is better suited for a design than a second area of the material 140, the controller 210 may provide a feedback via the user interface to encourage the design to be placed in the first area of the material 140. This feedback may include the user interface exhibiting a greater perceived attractive force for placement of the design in the first area of the material 140 than in the second area of the material 140. The magnitude of the perceived attractive force associated with each area of the material 140 may correspond to a probability that the area is sufficiently large to accommodate the design.

Figure 9B:
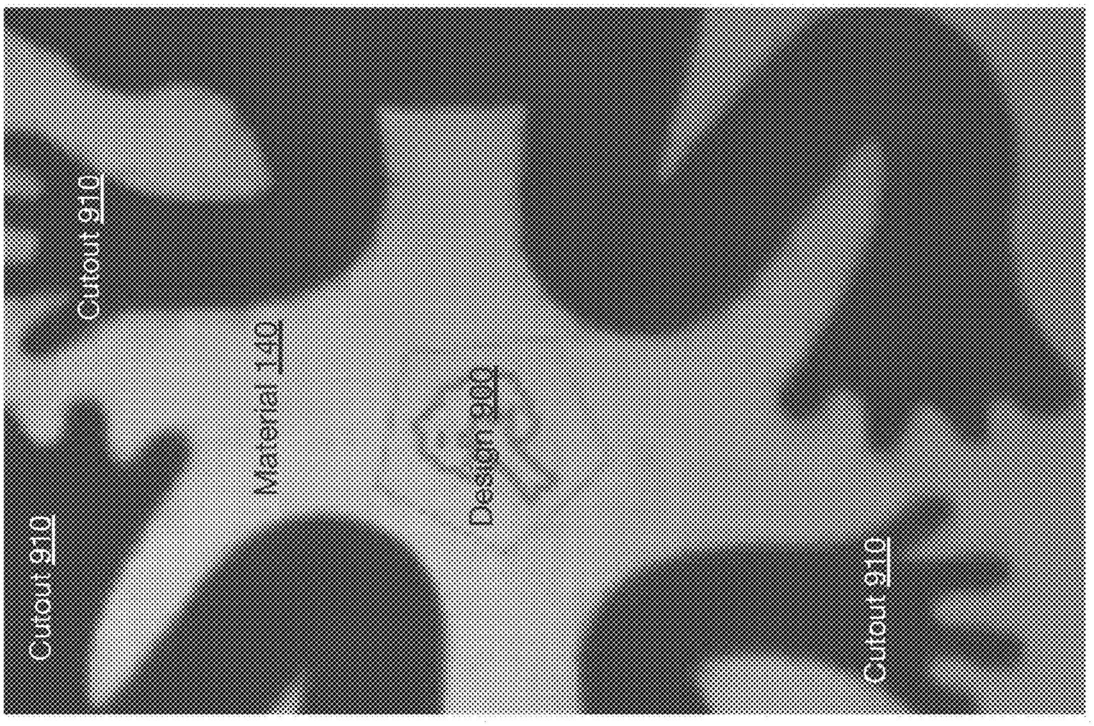
FIG. 9B depicts an image of another example of a user interface consistent with implementations of the current subject matter.
Figure 9A:
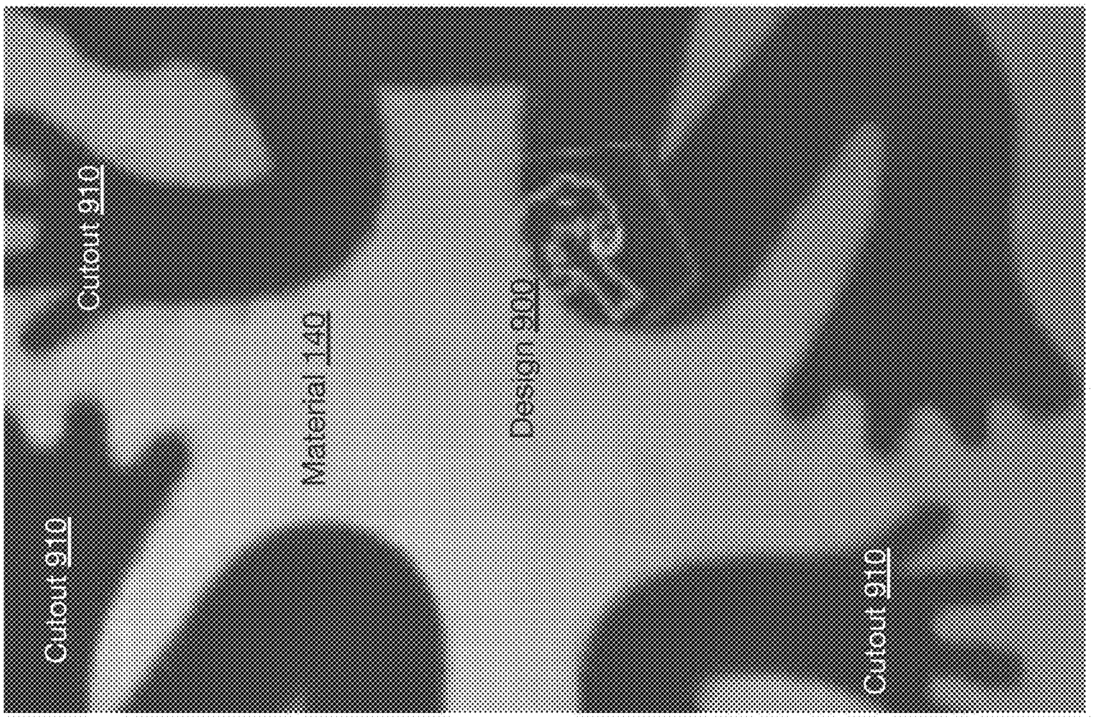
FIG. 9A depicts an image of an example of a user interface consistent with implementations of the current subject matter.

An example of this feature is shown in FIGS. 9A-B, which depicts a design 900 being placed on an example of the material 140 having multiple cutouts 910. In FIG. 9A, the design 900 is placed over an edge of the material 140 and at least partially over a cutout 910 present in the material 140. To discourage this type of suboptimal placement of the design 900, the controller 210 may generate a feedback through a user interface exhibiting a greater perceived attractive force for the design 900 in areas of the material 140 capable of accommodating the design 900. This feedback may be configured to encourage a more optimal placement of the design 900 shown in FIG. 9B, where the design 900 is moved automatically (or by a user) to an area of the material 140 capable of accommodating the entirety of the design 900. For example, the design 900 may be moved automatically from a first area of the material 140 where the design 900 overlaps one or more edges of the material 140 to a second area of the material 140 where the design 900 does not overlap the edges of the material 140. Alternatively and/or additionally, one or more areas where the design 900 overlaps the edges of the material 140 may be highlighted, for example, in a different color than the non-overlapping areas. This visual indication may guide a user's subsequent attempts to reposition the design 900 from the first area of the material 140 where the design 900 overlaps the edges of the material 140 to the second area of the material 140 where the design 900 does not overlap the edges of the material 140.

Figure 9C:
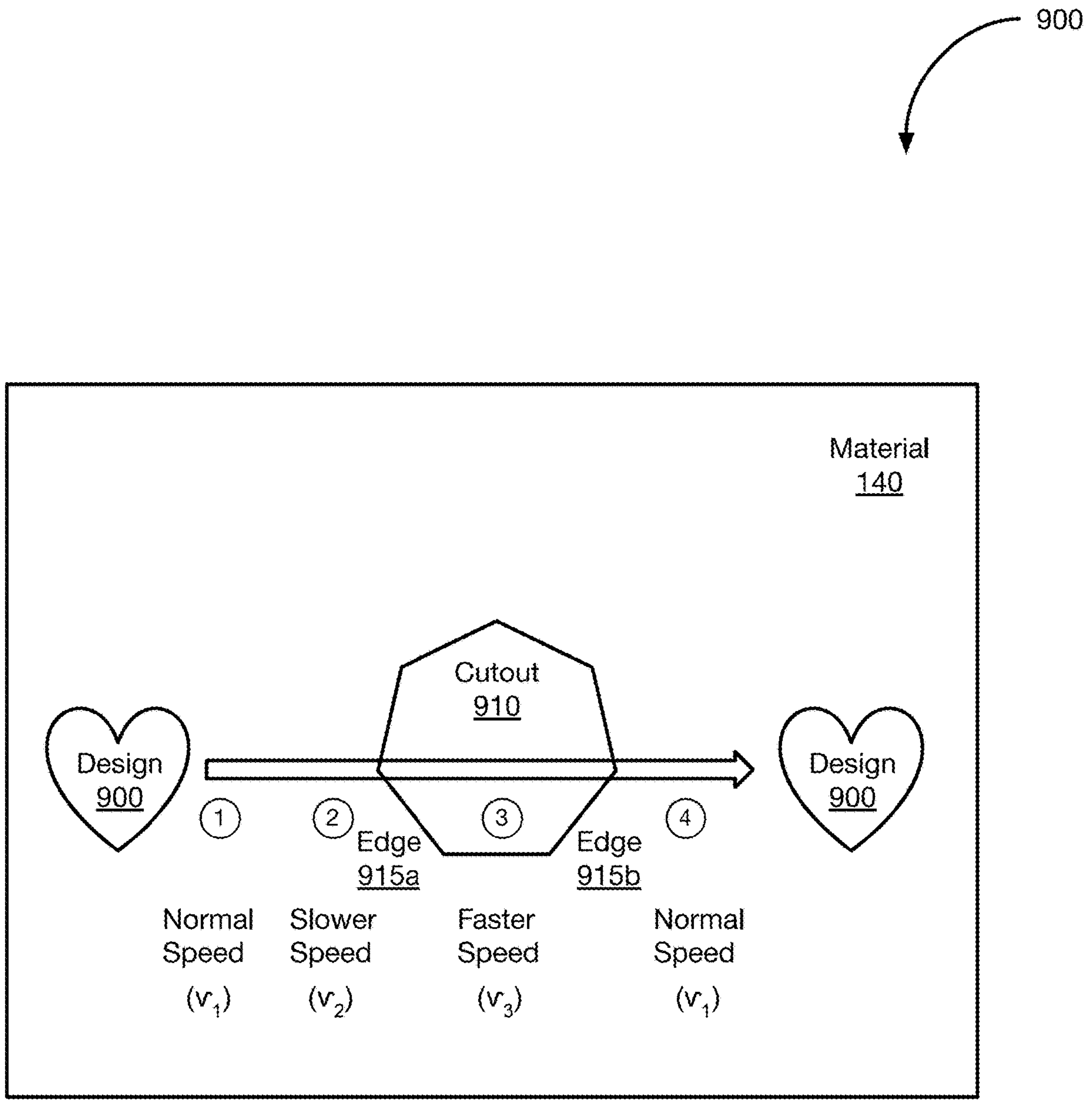
FIG. 9C depicts various examples of a user feedback consistent with implementations of the current subject matter.

As noted, the controller 210 may provide a feedback via the user interface that includes a perceived change in a density, drag, weight, velocity, and/or friction of a design and/or the material 140 to encourage the design from being placed in a suboptimal location, for example, relative to one or more edges of the material 140. FIG. 9C depicts an illustration of various examples of user feedback that includes a change in the velocity of the design 900 corresponding to a distance between the design 900 and an edge of the material 140. This change may be modeled as a force, friction, weight, or drag against the design 900 whose magnitude is inversely proportional to the distance between the design 900 and the edge of the material 140. For example, the design 900 may move slower and/or be subject to more drag when the design 900 is closer to the edge of the material 140. Alternatively and/or additionally, the design 900 may move faster and/or be subject to less drag when the design 900 is farther from the edge of the material 140.

As shown in FIG. 9C, the velocity of the design 900 being moved by a user using a cursor (e.g., a mouse cursor, a finger on a touch screen, and/or the like) may change as the design 900 is moved across the material 140. This change may include a deceleration in the motion of the design 900, corresponding to a constant movement by a user, as the design approaches an edge of the material 140 in order to discourage a movement beyond the edge of the material 140 and/or to encourage the design 900 to settle naturally against the edge of the material 140. For example, FIG. 9C shows that the design 900 may exhibit a first velocity $v_1$ (e.g., a normal speed) while the design 900 is at a first position (1) relative to the material 140. As the design 900 is moved closer towards the cutout 910, for example, to a second position (2) proximate to a first edge 915*a* of the material 140, the design 900 may exhibit a second velocity $v_2$ that is slower than the first velocity $v_1$. Once the design has moved off of the material, for example, to a third position (3) between the first edge 915*a* and a second edge 915*b*, the motion of the design 900 may exhibit a third velocity $v_3$ that is faster than the first velocity $v_1$ and/or the second velocity $v_2$ in order to encourage the design 900 to be moved back onto the material 140. As shown in FIG. 9C, once the design 900 is moved back onto the material 140 and a certain distance away from an edge of the material 140, such as to a fourth position (4), the motion of the design 900 may return to the first velocity $v_1$ (e.g., the normal speed).

In some cases, if the edge (or the corresponding margin) is implemented as a "rule," the design 900 may be unable to move across the edge of the material 140. Contrastingly, if the edge (or the corresponding margin) is implemented as a "guideline," the design 900 may be forced across an edge of the material 140 with sufficient force. In some cases, once the design 900 is moved over the edge of the material 140, the velocity of the design 900 may again increase such that the design 900 moves more quickly across an area unoccupied by any material. This acceleration once the design 900 is off of the material 140 may encourage the design 900 to return onto the material 140 and to settle against an edge within the material 140.

Figure 10A:
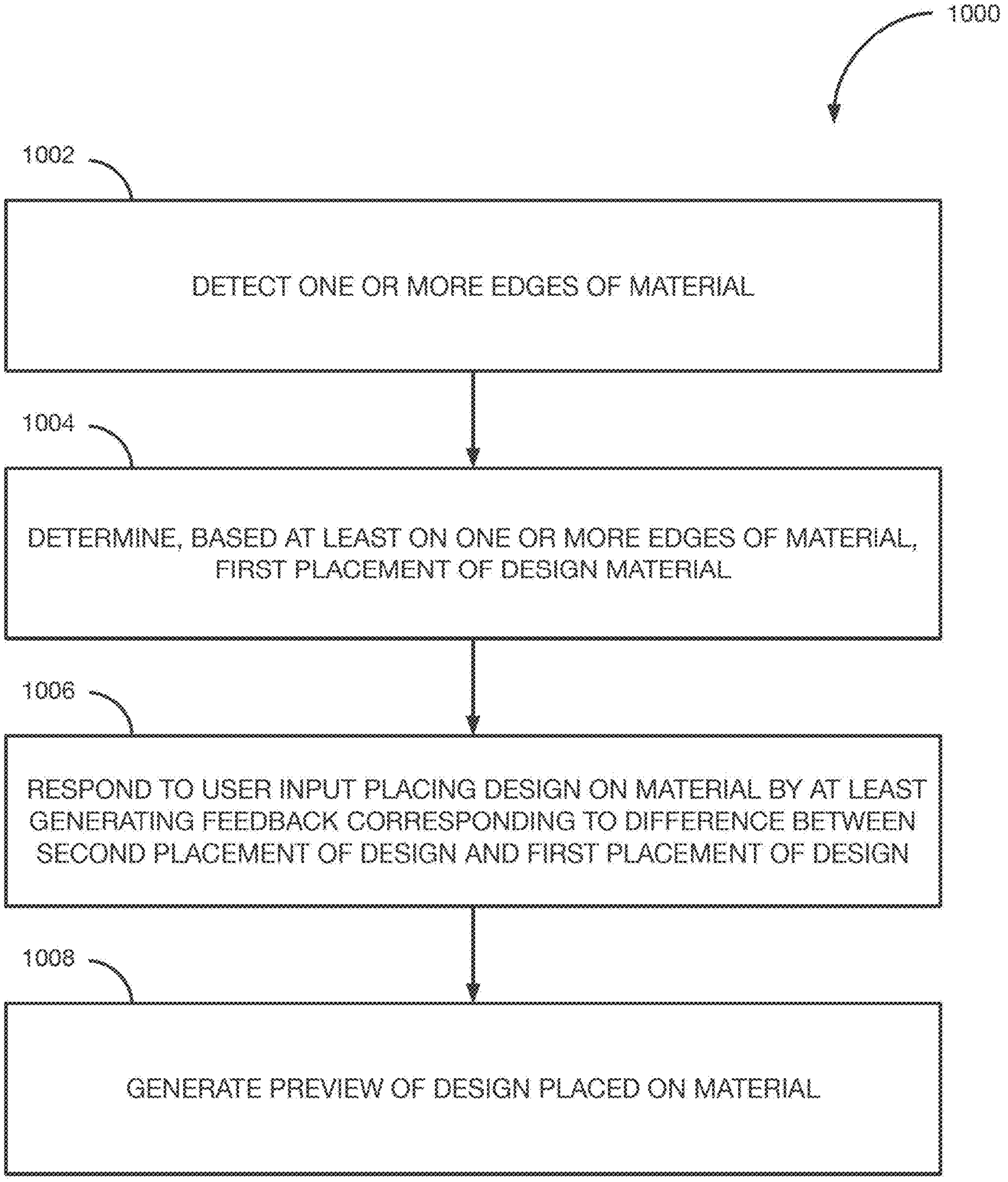
FIG. 10A depicts a flowchart illustrating an example of a process for design placement with edge detection consistent with implementations of the current subject matter.

FIG. 10A depicts a flowchart illustrating an example of a process 1000 for design placement with edge detection consistent with implementations of the current subject matter. Referring to FIG. 10A, the process 1000 may be performed by the controller 210 in order to guide the placement of one or more designs on the material 140.

At block 1002, the controller 210 may detect one or more edges of the material 140. In some implementations of the current subject matter, the controller 210 may apply a variety of edge detection techniques. One example of an edge detection technique includes analyzing one or more images of the material 140 to identify areas of high contrast (e.g., above threshold contrast), which indicates a transition from a presence of the material 140 and to an absence of the material 140. Another example of an edge detection technique includes identifying areas where the material 140 is present based on a corresponding absence of a pattern associated with the material bed 150 and/or identifying areas where the material 140 is absent based on a corresponding presence of the pattern associated with the material bed 150 on which the material 140 is resting. Alternatively and/or additionally, if one or more identifiers are patterned across the surface of the material 140, edge detection may also be performed by detecting the presence and/or absence of the pattern associated with the one or more identifiers. In yet another example, edge detection may be performed by measuring the height (or thickness) of the material 140 and identifying areas exhibiting an above threshold change in the height (or thickness) of the material 140. Edge detection may also be performed using a machine learning model such as, for example, a neural network trained to perform segmentation on one or more images of the material 140 and differentiate between pixels corresponding to the material 140 and pixels corresponding to the background (e.g., the material bed 150 and/or the like).

At 1004, the controller 210 may determine, based at least on the one or more edges of the material 140, a first placement of a design on the material 140. In some implementations of the current subject matter, the controller 210 may determine an optimal placement of the design in which the design does not exceed the one or more edges of the material 140 and/or a margin defined relative to the one or more edges of the material 140. In some cases, the optimal placement of the design may include packing the design such that a maximum quantity of designs (or replicas of the design) may be placed on the material 140 with a minimum quantity of unused material between adjacent designs.

At 1006, the controller 210 may respond to a user input placing the design on the material 140 by at least generating a feedback corresponding to a difference between a second placement of the design and the first placement of the design on the material 140. In some implementations of the current subject matter, the controller 210 may be configured to generate a feedback configured to encourage the optimal placement of the design on the material 140. For example, the feedback may encourage the placement of the design at a first location consistent with the optimal placement of the design and/or discourage the placement of the design at a second location inconsistent with the optimal placement of the design. Accordingly, the feedback may include an alert and/or an automatic re-positioning of the design if the design is placed beyond the one or more edges of the material 140 (or one or more corresponding margins). Alternatively and/or additionally, in the case where the design is being packed onto the material 140, two or more designs (or replicas of the same design) may exhibit a perceived attractive force that encourages the designs to pack as closely together as possible within the boundary of the material 140. If a first area of the material 140 is better suited for the design than a second area of the material 140, the feedback may include the first area of the material 140 exhibiting a greater perceived attractive force than the second area of the material 140.

At block 1008, the controller 210 may generate a preview of the design placed on the material 140. In some implementations of the current subject matter, the preview may depict the one or more edges that are present in the material 140 as well as the position of the design relative to the one or more edges. For example, the preview may include an outline superimposed on the edges of the material 140 and/or the design placed on the material 140. In some cases, the preview may also include a three-dimensional preview of the material 140 simulating the various textures that may be present in the material 140.

In some implementations of the current subject matter, the computer numerically controlled machine 100 may be required to process multiple sides of the material 140 in order to effect a design on multiple sides of the material 140. Multi-side processing, such as duplex processing, may be desirable or even necessary when the design is a multi-sided design (e.g., a double-sided design and/or the like). Alternatively and/or additionally, multi-sided processing, such as duplex processing, may be performed, for example, when the material 140 is too thick to cut through with a single pass from one side, in which case the computer numerically controlled machine 100 may effect a first partial cut through one side of the material 140 before effecting, on an opposite of the material 140, a second partial cut that meets the first partial cut. In other cases, opposite sides of the material 140 may be engraved in order to avoid the char associated with engraving only a single side of the material 140.

Edge detection, including the identification of shapes and/or visually distinct patterns that may be present along one or more edges of the material, may enable a precise localization of a design that is being applied to multiple sides of the material 140. Precision in design placement and in the processing of the material 140 to effect the corresponding changes may be critical for multi-sided processing, such as duplex processing, in order for designs on different sides of the material to join seamlessly. Any inaccuracy may be manifested over the entire design.

In one example workflow for multi-sided processing, the computer numerically controlled machine 100 may first process a first side of the material 140 to effect one or more changes corresponding to, for example, a user specified design. These changes may include cuts, scores, engravings, and/or the like. Multi-sided processing of the material 140 may be initiated when the controller 210 receives one or more corresponding user inputs such as the selection of a user interface element corresponding to a multi-sided processing functionality. It should be appreciated that one or more images of the first side of the material 140 may be captured in response to the selection of this user interface element. At that point, the material 140 may be flipped over to a second side. For example, the controller 210 may generate a notification for the user to open the lid 130 and flip over the material 140. Once the lid 130 is in the closed position, one or more images of the second side of the material 140 may be captured. One or more computer vision processes may be deployed to generate, based at least on images of the first side of the material 140 and the second side of the material 140, a transform describing one or more changes in a placement of the material 140 such as a rotation, reflection, translation, and/or the like. This transform may then be used to align the design on the second side of the material 140 with the changes already effected on the first side of the material 140.

Figure 10B:
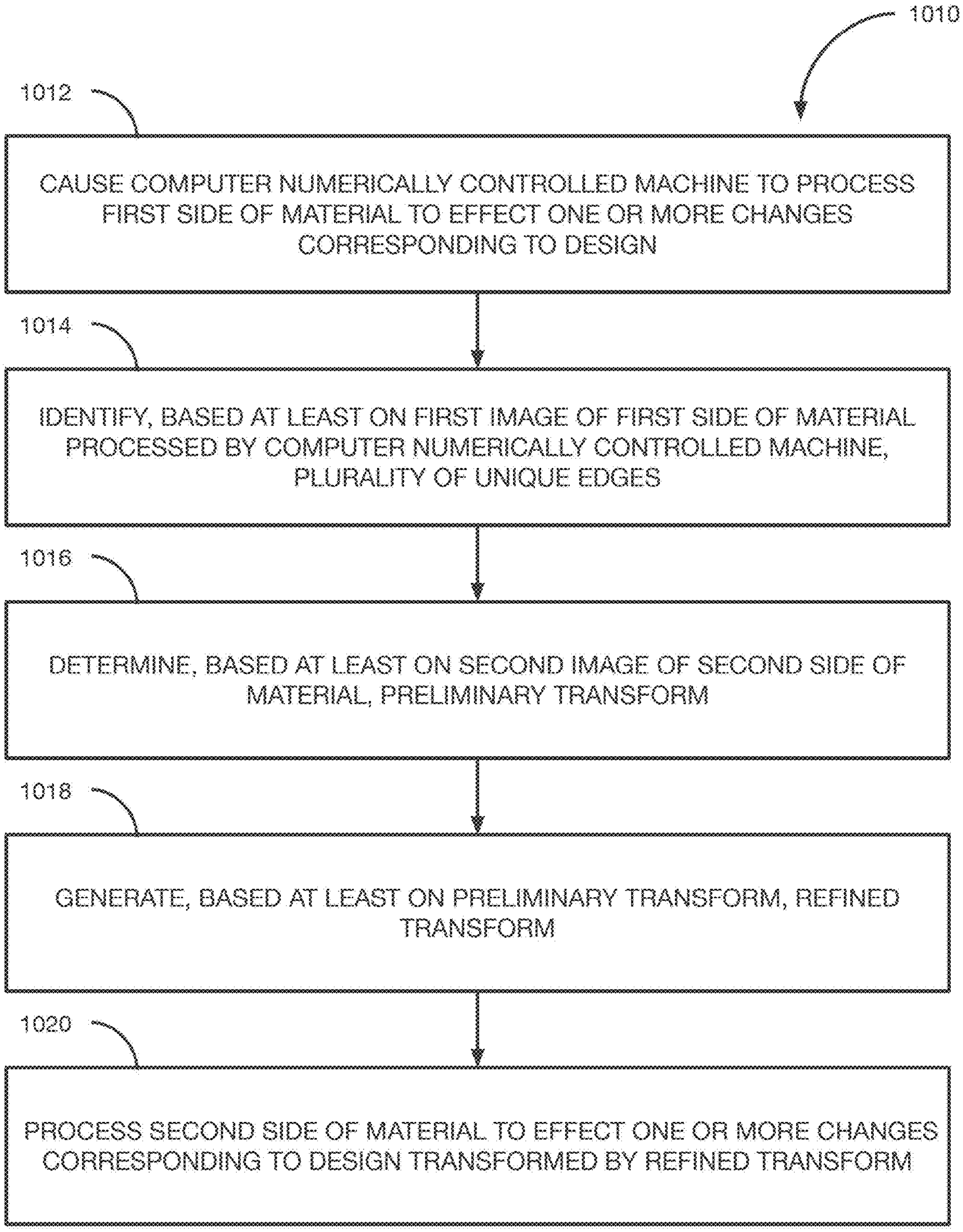
FIG. 10B depicts a flowchart illustrating an example of a process for multi-sided processing consistent with implementations of the current subject matter.

To further illustrate the multi-sided processing workflow, FIG. 10B depicts a flowchart illustrating an example of a process 1010 for multi-sided processing consistent with implementations of the current subject matter. Referring to FIG. 10B, the process 1010 may be performed by the controller 210 in order to process multiple sides of the material 140 including, for example, a first side of the material 140 and a second side of the material 140 that is opposite to the first side of the material 140.

At block 1012, the controller 210 may cause the computer numerically controlled machine 100 to process a first side of the material 140 to effect one or more changes corresponding to a design. For example, the computer numerically controlled machine 100 may effect the one or more changes by delivering, via the head 160, an electromagnetic energy.

At block 1014, the controller 210 may identify, based at least on a first image of the first side of the material 140 processed by the computer numerically controlled machine 100, a plurality of unique edges. In some implementations of the current subject matter, the controller 210 may identify one or more regions of interest in the first side of the material 140 after the computer numerically controlled machine 100 has processed the first side of the material 140 to effect one or more changes corresponding to the design. The one or more regions of the interest may be identified based on an image (e.g., Image A) captured by one or more cameras, such as the lid camera 110 mounted to the lid 130 of the computer numerically controlled machine 100. A first computer vision process may generate a Material Mask A by at least converting Image A into a binary image in which pixels corresponding to the material 140 are assigned a value of "1" and pixels not corresponding to the material 140 are assigned a value of "0." Alternatively, each pixel in the image may be assigned a value corresponding to a probability of that pixel corresponding to the material 140. A second computer vision process may analyze Material Mask A to identify two or more unique edges, which in this case may refer to an edge having an angle not found elsewhere (e.g., a corner on a square and/or the like) or an edge with a visually distinct pattern (e.g., a sawtooth edge and/or the like). Close-ups images of the two or more unique edges may be captured by one or more cameras, such as the head camera 120 mounted to the head 160 of the computer numerically controlled machine 100.

At block 1016, the controller 210 may determine, based at least on a second image of a second side of the material 140, a preliminary transform. In some implementations of the current subject matter, an image (e.g., Image B) of the second side (e.g., reverse side) of the material 140 may be captured by the one or more cameras, such as the lid camera 110 mounted to the lid 130 of the computer numerically controlled machine 100. The controller 210 may apply the first computer vision process to generate a Material Mask B by at least converting Image B into a binary image in which pixels corresponding to the material 140 are assigned a value of "1" and pixels not corresponding to the material 140 are assigned a value of "0." Another computer vision process may be applied to compare Material Mask A and Material Mask B to determine a transformation corresponding to the movement of the material 140. One example of a transformation is a rigid transformation (e.g., Euclidean Group 2 or E(2) transformation), which contains any possible combination of reflections, rotations, and translations but not scaling, skews, and deformation in two dimensions that maintains the rigid structure of the object being transformed. A Euclidean Group 2 transformation may therefore be used to describe the rotation of a rigid material, such as the material 140. The Euclidean Group 2 transformation may be replaced with a Euclidean Group 3 transformation that supports reflection, rotation, and translation in three dimensions, in which case the material 140 may be processed on multiple sides (e.g., a cube, a sphere, and/or the like). Alternatively and/or additionally, the Euclidean Group 2 transformation may be replaced with an Affine Group transformation to support the scaling and skewing of the material 140, for example, if the material 140 being processed is flexible (e.g., fabric, rubber, and/or the like).

At block 1018, the controller 210 may generate, based at least on the preliminary transform, a refined transform. In some implementations of the current subject matter, the controller 210 may apply the preliminary transform to two or more unique edges (e.g., identified at block 1014) to predict the current location of those unique edges. Additional close-up images may be captured of these transformed locations, for example, by one or more cameras such as the head camera 120 mounted to the head 160 of the computer numerically controlled machine 100. A computer vision process may be applied to generate binary masks from the close-up images of the unique edges on the first side of the material 140 and the transformed locations on the second side of the material 140. The controller 210 may then apply another computer vision process to compare the binary masks and determine a new refined rigid transformation and reflection that describes the movement of the material.

At block 1020, the controller 210 may cause the computer numerically controlled machine 100 to process a second side of the material 140 to effect one or more changes corresponding to the design transformed by the refined transform. For example, the refined transform may be applied to the original design in order to determine a precise placement of the design on the second side of the material. The placement of the design on the second side of the material may correspond to the placement of the design on the first side of the material such that the changes effected by the computer numerically controlled machine 100 on the first side of the material 140 are aligned with those the computer numerically controlled machine 100 will effect on the second side of the material 140. In some implementations of the current subject matter, the controller 210 may provide a preview of the transformation, for example, in a user interface at the computer numerically controlled machine 100, the client device 230, and/or the server device 220.

Figure 10C:
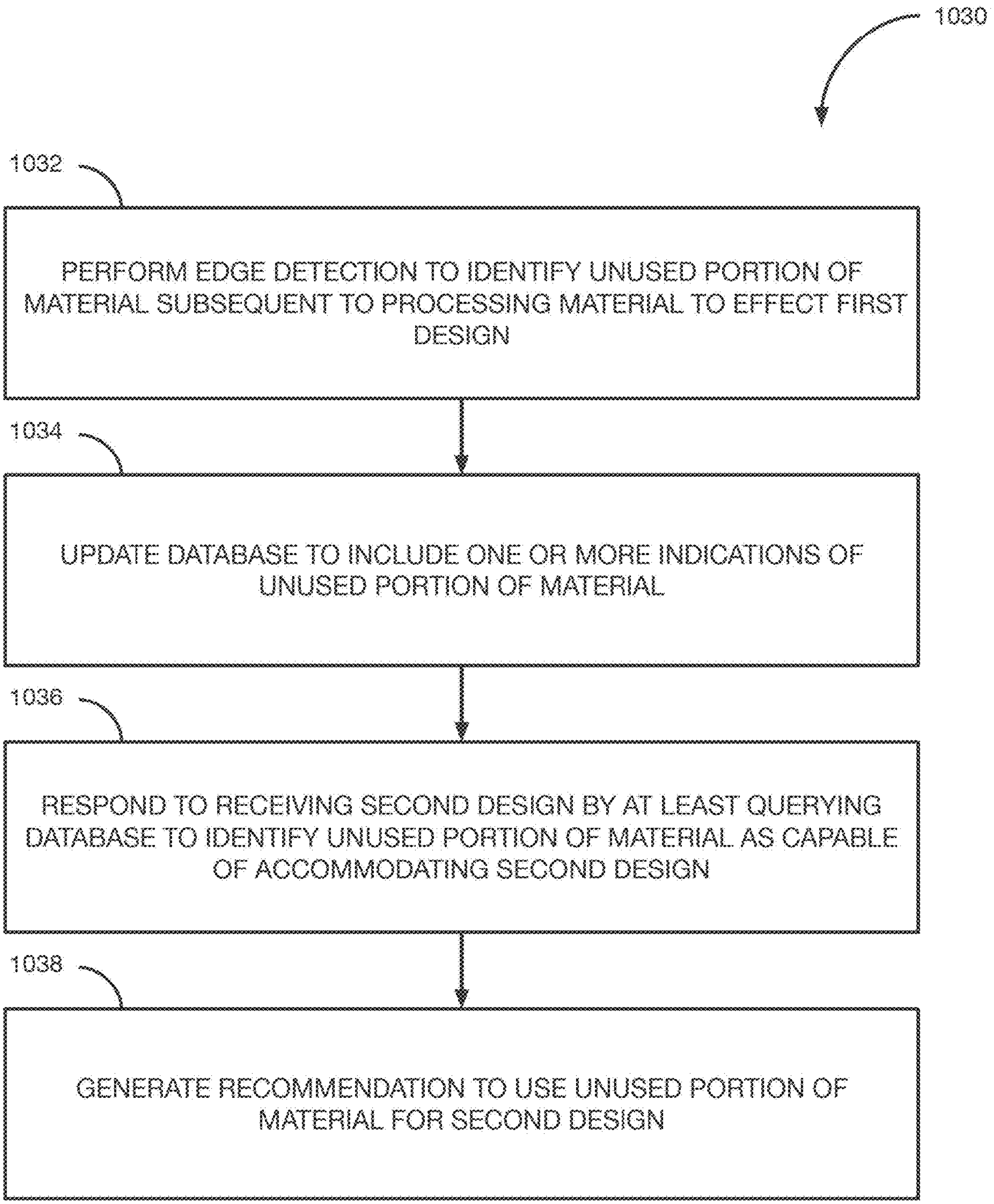
FIG. 10C depicts a flowchart illustrating an example of a process for material tracking consistent with implementations of the current subject matter.

FIG. 10C depicts a flowchart illustrating an example of a process 1030 for design placement with edge detection consistent with implementations of the current subject matter. Referring to FIG. 10C, the process 1030 may be performed by the controller 210 in order to guide the selection of a material capable of accommodating one or more designs.

At block 1032, the controller 210 may perform edge detection to identify an unused portion of the material 140 subsequent to processing the material 140 to effect a first design. In some implementations of the current subject matter, the controller 210 may track historical material use including across multiple projects, pieces of material, users, and/or computer numerically controlled machines. For example, the computer numerically controlled machine 100 may process the material 140 to effect one or more designs after which the controller 210 may perform edge detection (with or without user input) in order to identify unused portions of the material 140 including, for example, which unused portions of the material 140 constitute scrap and/or not scrap.

At block 1034, the controller 210 may update a database to include one or more indications of the unused portion of the material 140. For example, the controller 210 may update a database with information associated with the unused portions of the material 140. This information may include various material area estimates including, for example, images of unused material, dimensions of unused material, a total quantity of unused material (e.g., a total area), and usable portions of the unused material (which may consider material margins, shape dimensions (e.g., square/rectangle) that can be accommodated by the unused material, and/or the like). The material area estimates may be associated with one or more material identifiers, which may be specific to the type of material 140, the projects using the material 140, and/or a user associated with the material 140.

At block 1036, the controller 210 may respond to receiving a second design by at least querying the database to identify the unused portion of the material 140 as capable of accommodating the second design. In some implementations of the current subject matter, the tracking of historical material usage may also enable the controller 210 to identify, within an existing supply of materials, one or more pieces of materials that are capable of accommodating a design. Thus, in response to a user selecting one or more designs, the controller 210 may search through the database to identify materials whose dimensions are sufficient to accommodate the one or more designs. In the event the one or more designs are too large for any single piece of material, the controller 210 may automatically split the designs along one or more detected material edges. The controller 210 may further generate and incorporate, into the designs, a joinery (e.g. puzzle pieces, tabs and slots, and/or the like) such that the split portions of the design may be assembled post-processing.

At 1038, the controller 210 may generate a recommendation to use the unused portion of the material 140 for the second design. For example, the controller 210 may support a "history" functionality for tracking the material that is left over from previous projects. When one or more pieces of existing materials are capable of accommodating the designs selected by the user, the controller 210 may generate a recommendation that identifies the possible materials for completing the project, for example, by referencing each piece of material by an identifier, the type of material, number marking, shape, and/or the like. To further encourage the use of scrap material and maximize the efficiency of material utilization, the controller 210 may further provide a confirmation of whether a piece of material placed in the computer numerically controlled machine 100 is a piece of material suggested for the project.

Figure 10D:
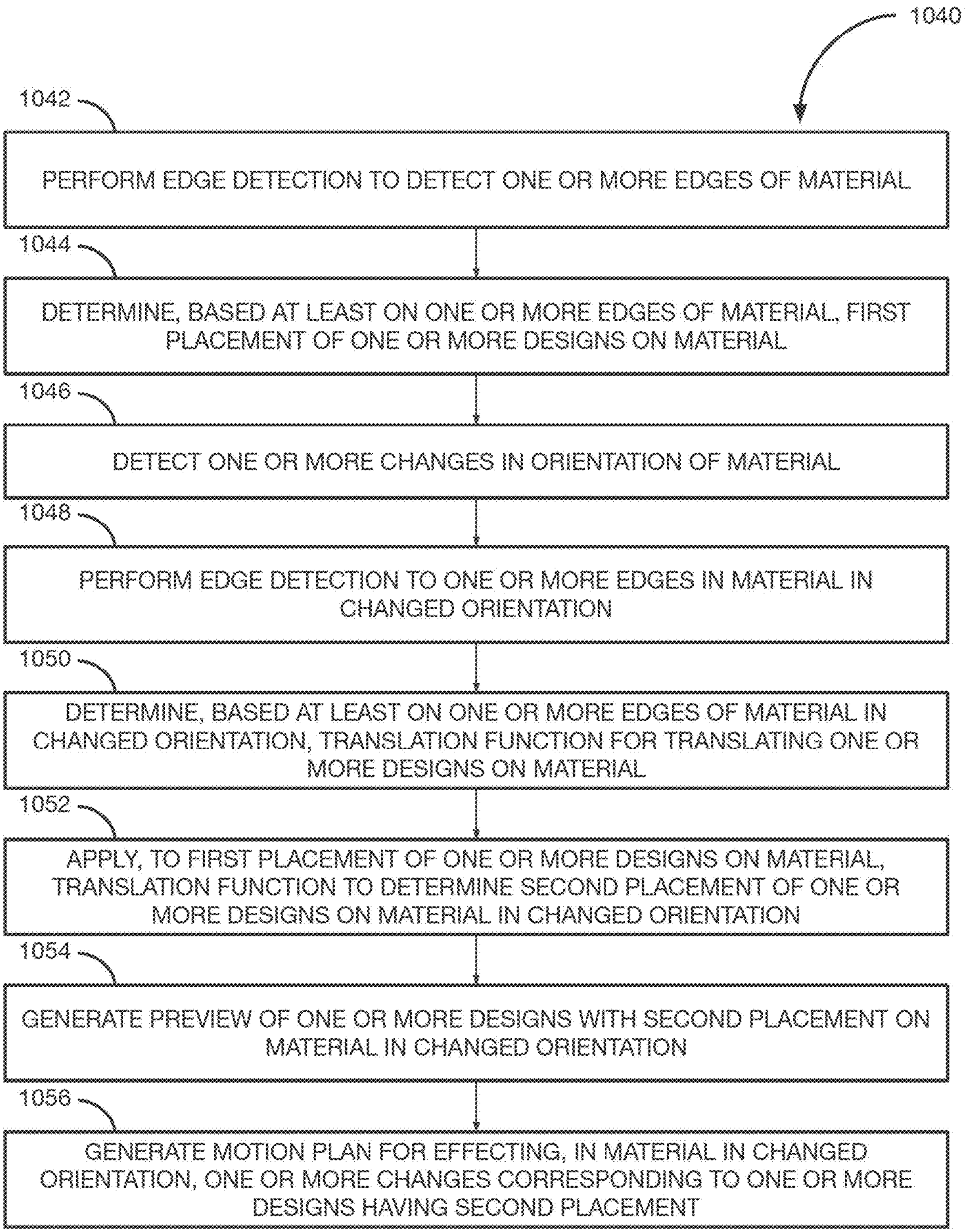
FIG. 10D depicts a flowchart illustrating another example of a process for design placement with edge detection consistent with implementations of the current subject matter.

FIG. 10D depicts a flowchart illustrating an example of a process 1040 for design placement with edge detection consistent with implementations of the current subject matter. Referring to FIG. 10D, the process 1040 may be performed by the controller 210 to retain the placement of one or more designs on the material 140 when the orientation of the material 140 on the material bed 150 undergoes one or more changes, for example, when the user moves the material 140.

At block 1042, the controller 210 may perform edge detection to detect one or more edges of the material 140. In some implementations of the current subject matter, the controller 210 may apply a variety of edge detection techniques. One example of an edge detection technique includes analyzing one or more images of the material 140 to identify areas of high contrast (e.g., above threshold contrast), which indicates a transition from a presence of the material 140 and to an absence of the material 140. Another example of an edge detection technique includes identifying areas where the material 140 is present based on a corresponding absence of a pattern associated with the material bed 150 and/or identifying areas where the material 140 is absent based on a corresponding presence of the pattern associated with the material bed 150 on which the material 140 is resting. Alternatively and/or additionally, if one or more identifiers are patterned across the surface of the material 140, edge detection may also be performed by detecting the presence and/or absence of the pattern associated with the one or more identifiers. In yet another example, edge detection may be performed by measuring the height (or thickness) of the material 140 and identifying areas exhibiting an above threshold change in the height (or thickness) of the material 140. Edge detection may also be performed using a machine learning model such as, for example, a neural network trained to perform segmentation on one or more images of the material 140 and differentiate between pixels corresponding to the material 140 and pixels corresponding to the background (e.g., the material bed 150 and/or the like).

At block 1044, the controller 210 may determine, based at least on the one or more edges of the material 140, a first placement of one or more designs on the material 140. For example, the controller 210 may determine an optimal placement of the design in which the design does not exceed the one or more edges of the material 140 and/or a material margin defined relative to the one or more edges of the material 140. In some cases, the optimal placement of the design may include packing the design such that a maximum quantity of designs (or replicas of the design) may be placed on the material 140 with a minimum quantity of unused material between adjacent designs.

At block 1046, the controller 210 may detect one or more changes in an orientation of the material 140. For example, the material 140 may be moved after the controller 210 determined the placement of the design on the material 140. In some cases, the lid 130 may be opened in order for a user to move the material 140 after which the user may close the lid 130 to start or resume the processing of the material 140. Accordingly, in some implementations of the current subject matter, the opening and/or closing of the lid 130 may cause the controller 210 to determine whether the orientation of the material 140 has changed. Changes in the orientation of the material 140 may be detected by applying a variety of techniques. For instance, the controller 210 may compare a first image of the material 140 captured at a first time $t_1$ prior to the opening of the lid 130 to a second image of the material 140 captured at a second time $t_2$ subsequent to the closing of the lid 130. The changes in the orientation of the material 140 may be detected based on changes in the orientation and/or position of one or more features of the material 140 including, for example, the edges of the material 140, one or more previously effected changes such as cuts, scores, and engravings present in the material 140, or natural variations such as wood grain, knots, ply orientations, and/or the like. In some cases, the controller 210 may perform edge detection in order to detect changes in the orientation and/or position of the edges of the material 140 that are indicative of a change in the orientation of the material 140. Alternatively and/or additionally, the changes in the orientation of the material 140 may be detected when one or more internal mechanisms within the computer numerically controlled machine 100, such as a jig, a conveyer belt, and/or the like, are activated to translate the material 140.

At block 1048, the controller 210 may perform edge detection to detect one or more edges in the material 140 in the changed orientation. As noted, the controller 210 may apply a variety of edge detection techniques including, for example, analyzing one or more images of the material 140 to identify areas of high contrast (e.g., above threshold contrast). Another example of an edge detection technique includes identifying areas where the material 140 is present based on a corresponding absence of a pattern associated with the material bed 150 and/or identifying areas where the material 140 is absent based on a corresponding presence of the pattern associated with the material bed 150 on which the material 140 is resting. Alternatively and/or additionally, if one or more identifiers are patterned across the surface of the material 140, edge detection may also be performed by detecting the presence and/or absence of the pattern associated with the one or more identifiers. In yet another example, edge detection may be performed by measuring the height (or thickness) of the material 140 and identifying areas exhibiting an above threshold change in the height (or thickness) of the material 140. Edge detection may also be performed using a machine learning model such as, for example, a neural network trained to perform segmentation on one or more images of the material 140 and differentiate between pixels corresponding to the material 140 and pixels corresponding to the background (e.g., the material bed 150 and/or the like).

At block 1050, the controller 210 may determine, based on the one or more edges of the material 140 in the changed orientation, a translation function for translating the one or more designs on the material 140. For example, in cases where the material 140 is not translated by the computer numerically controlled machine 100 itself, the new orientation of the material 140 may not be associated with an existing translation function. As such, in those cases, the controller 210 may determine a translation function based on changes in the orientation and/or position of one or more features of the material 140 including, for example, the edges of the material 140, one or more previously effected changes such as cuts, scores, and engravings present in the material 140, or natural variations such as wood grain, knots, ply orientations, and/or the like.

At block 1052, the controller 210 may apply, to the first placement of the one or more designs on the material 140, the translation function to determine a second placement for the one or more designs on the material 140 in the changed orientation.

At block 1054, the controller 210 may generate a preview of the one or more designs with the second placement on the material 140 in the changed orientation. In some implementations of the current subject matter, the controller 210 may generate a preview of the placement of the design relative to one or more edges of the material 140. This preview may be displayed as part of a user interface, for example, at the computer numerically controlled machine 100, the client device 230, and/or the server device 220. Furthermore, the controller 210 may provide feedback configured to discourage an incorrect design placement relative to one or more edges of the material 140.

At block 1056, the controller 210 may generate a motion plan for effecting, in the material 140 in the changed orientation, one or more changes corresponding to the one or more designs having the second placement.

Figure 11:
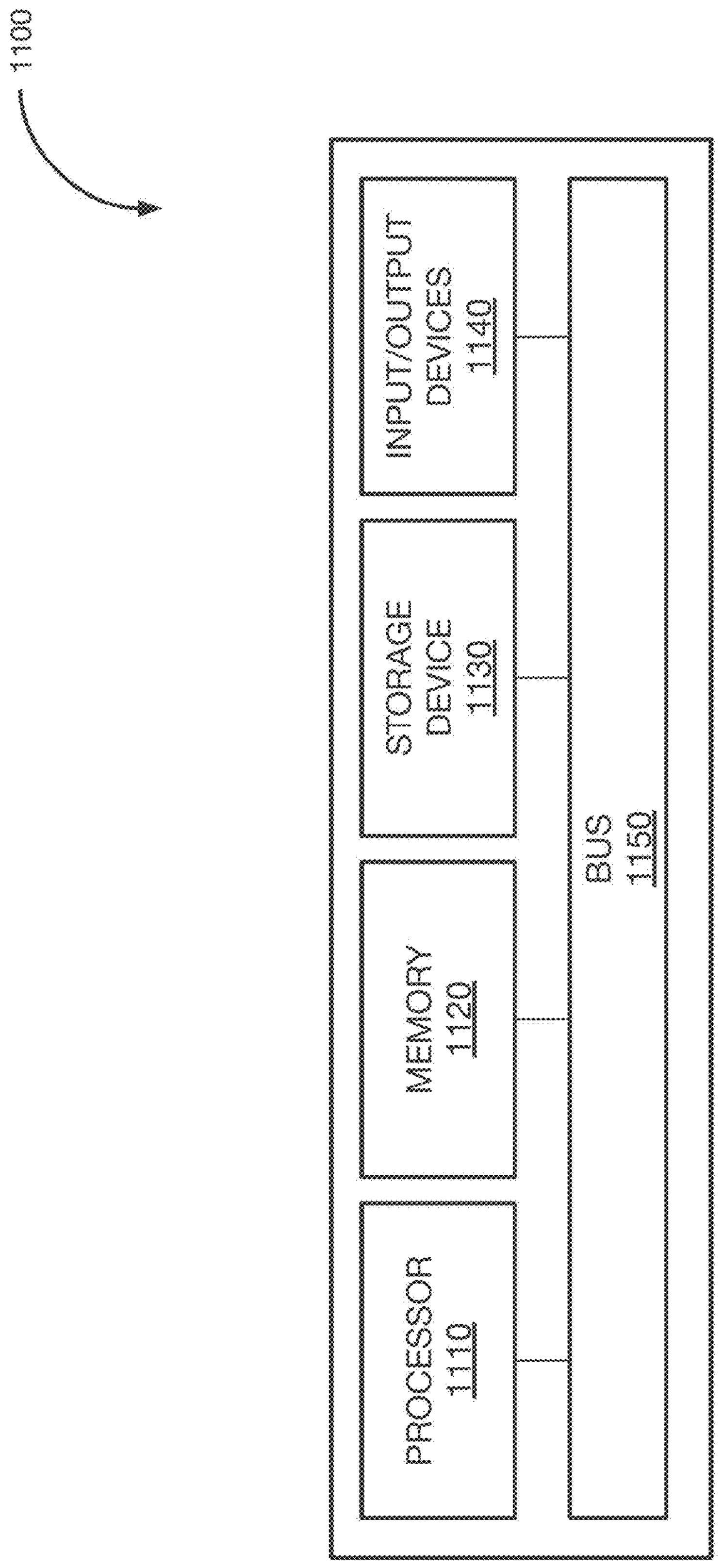
FIG. 11 depicts a block diagram illustrating a computing system, consistent with implementations of the current subject matter.

FIG. 11 depicts a block diagram illustrating a computing system 1100, consistent with implementations of the current subject matter. Referring to FIG. 11, the computing system 1100 may implement the controller 210 and/or any components therein.

As shown in FIG. 11, the computing system 1100 can include a processor 1110, a memory 1120, a storage device 1130, and an input/output device 1140. The processor 1110, the memory 1120, the storage device 1130, and the input/output device 1140 can be interconnected via a system bus 1150. The processor 1110 is capable of processing instructions for execution within the computing system 1100. Such executed instructions can implement one or more components of, for example, the controller 210. In some implementations of the current subject matter, the processor 1110 can be a single-threaded processor. Alternately, the processor 1110 can be a multi-threaded processor. The processor 1110 is capable of processing instructions stored in the memory 1120 and/or on the storage device 1130 to control at least some of the operations of the computer numerically controlled machine 100.

The memory 1120 is a computer readable medium such as volatile or non-volatile that stores information within the computing system 1100. The memory 1120 can store data structures representing configuration object databases, for example. The storage device 1130 is capable of providing persistent storage for the computing system 1100. The storage device 1130 can be a solid state drive, a floppy disk device, a hard disk device, an optical disk device, or a tape device, or other suitable persistent storage means. The input/output device 1140 provides input/output operations for the computing system 1100. In some implementations of the current subject matter, the input/output device 1140 can provide input/output operations for a network device. For example, the input/output device 1140 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Figure 12:
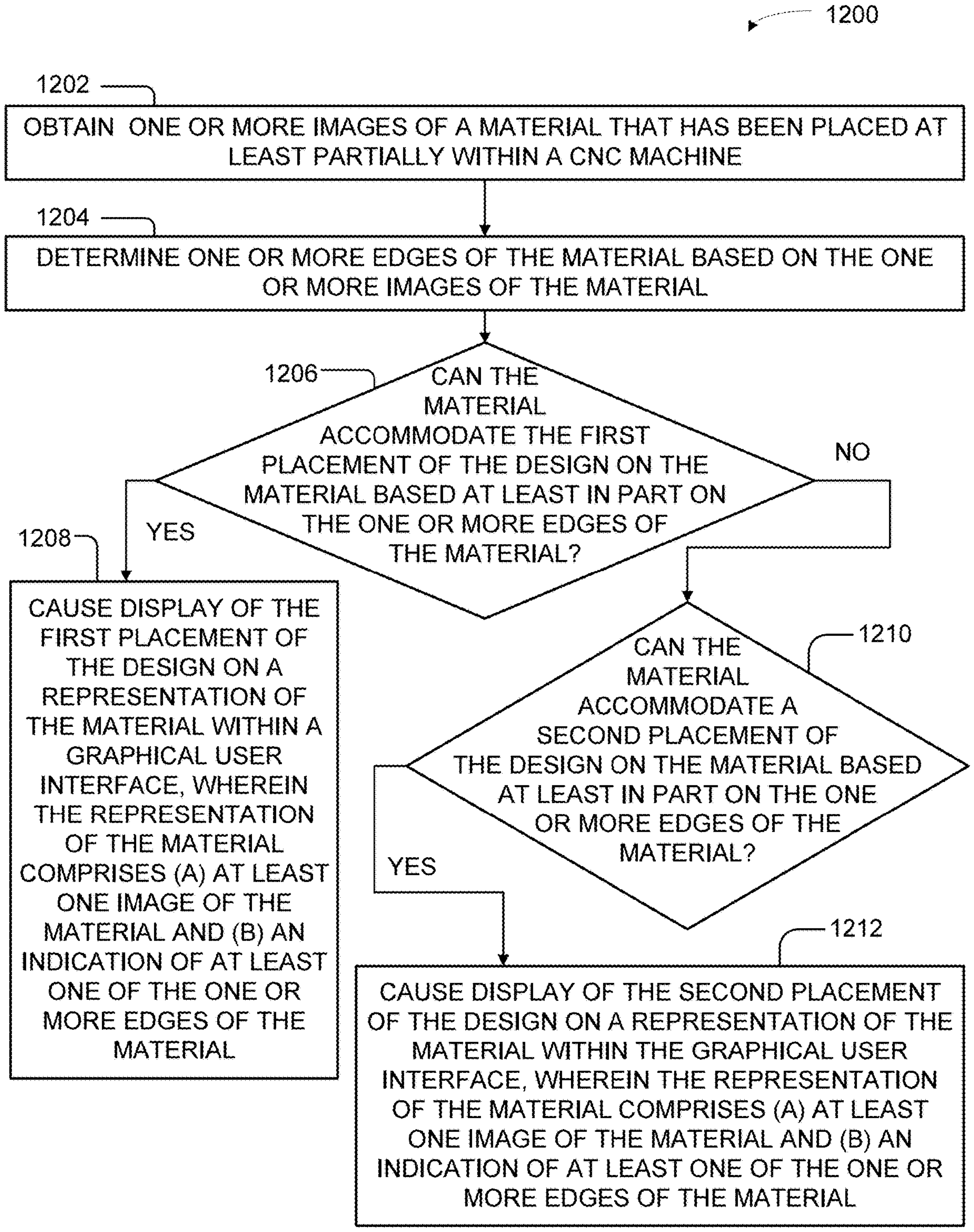
FIG. 12 depicts a flowchart illustrating aspects of an example method involving edge detection according to some embodiments.

FIG. 12 depicts a flowchart illustrating aspects of an example of method 1200 involving edge detection according to some embodiments. In some embodiments, method 1200 is performed by a computing system that includes any one or more of (i) a CNC machine, (ii) a controller device configured to control the CNC machine, and/or (iii) a cloud computing system configured to communicate with the CNC machine and/or the controller device.

Method 1200 begins at block 1202, which includes obtaining one or more images of a material that has been placed at least partially within a CNC machine. In operation, the images of the material may be obtained by any of the image capture methods disclosed herein or any other image capture method now known or later developed that is suitable for capturing images of material placed at least partially with a CNC machine. For example, in some embodiments, the one or more images are captured via one or more sensors associated with the CNC machine. In some embodiments obtaining one or more images of a material that has been placed at least partially within a CNC machine includes (i) after a lid of the CNC machine been closed, and while the material is at least partially within the CNC machine, obtaining a first image of the material via a first camera mounted to the lid of the CNC machine; and (ii) after the CNC machine has moved a second camera via a movable head within the CNC machine to a position over the material based on the first image, obtaining a second image of the material via the second camera.

Next, method 1200 advances to block 1204, which includes determining one or more edges of the material based on the one or more images of the material. In some embodiments, determining one or more edges of the material based on the one or more images of the material at block 1204 includes determining the one or more edges of the material based on at least one of (i) a first pattern on a surface of the material, (ii) a second pattern present in a working area of the CNC machine, (iii) a height of the material, (iv) a thickness of the material, (v) a two-dimensional shape of the material, or (vi) a three-dimensional shape of the material. In operation, determining one or more edges of the material based on the one or more images of the material may be carried out according to any of the edge detection techniques disclosed herein, including but not limited to: (i) analyzing the one or more images of the material to identify areas of high contrast (e.g., above threshold contrast), which indicates a transition from a presence of the material to an absence of the material; (ii) identifying areas where the material is present based on a corresponding absence of a pattern associated with a material bed in the CNC machine and/or identifying areas where the material is absent based on a corresponding presence of the pattern associated with the material bed on which the material is resting; (iii) detecting the presence and/or absence of a pattern associated with the one or more identifiers, patterns, or other distinguishing items and/or characteristics on the surface of the material; (iv) measuring the height (or thickness) of the material and identifying areas exhibiting an above threshold change in the height (or thickness) of the material; (v) using a machine learning model such as, for example, a neural network trained to perform segmentation on one or more images of the material and differentiate between pixels corresponding to the material and pixels corresponding to the background (e.g., the material bed and/or the like); and/or (vi) any other edge detection techniques now known or later developed that are suitable for detecting edges of a material based on one or more images of the material.

In some embodiments, when one or more portions of the material are obscured by one or more structures arranged to secure the material during processing of the material by the CNC machine, determining one or more edges of the material based on the one or more images of the material at block 1204 includes: (i) considering the one or more structures when determining the one or more edges of the material when the CNC machine cannot process the one or more structures when processing the material; and (ii) ignoring the one or more structures when determining the one or more edges of the material when the CNC machine is able to process the one or more structures when processing the material.

Next, at block 1206, method 1200 includes determining whether the material can accommodate a first placement of a design on the material based at least in part on the one or more edges of the material.

In some embodiments, determining whether the material can accommodate the first placement of the design on the material based on the one or more material margins at block 1206 includes, after obtaining one or more images of the material at a first orientation within the CNC machine, determining whether the material has been moved to a second orientation within the CNC machine. And when the material has been moved from the first orientation to the second orientation, (i) determining a transform based on one or more differences between the first orientation and the second orientation, and (ii) applying the transform to the design to determine whether the material can accommodate the first placement of the design based on the one or more edges of the material. In some embodiments, determining whether the material has been moved to a second orientation within the CNC machine includes determining whether the material has been moved to a second orientation within the CNC machine based on one or more physical features of the material. In some embodiments, the one or more physical features of the material include at least one of (i) an edge of the material, (ii) a visible marking on the material, (iii) a sticker or decal on the material, and/or (iv) an angle of a material edge, e.g., a material edge determined at block 1204.

If the material can accommodate the first placement of the design on the material based at least in part on the one or more edges of the material at block 1206, then method 1200 advances to block 1208, which includes causing display of the first placement of the design on a representation of the material within a graphical user interface, wherein the representation of the material comprises (a) at least one image of the material and (b) an indication of at least one of the one or more edges of the material. In some embodiments, the graphical user interface is a component of one of (i) the CNC machine or (ii) a controller device configured to control one or more operating aspects the CNC machine, e.g., a smartphone, tablet computer, laptop/desktop computer, or similar computing device that executes one or more software programs for controlling and/or operating the CNC machine. In some embodiments, the first placement of the design on the material includes a first portion of the design on a first side of the material and a second portion of the design on a second side of the material.

In some embodiments, when the material can accommodate the first placement of the design on the material based at least in part on the one or more edges of the material at block 1206, method 1200 additionally or alternatively includes determining whether the material can accommodate a third placement of the design on the material, where the third placement, if implemented, would result in more efficient use of the material as compared to the first placement. For example, the third placement may result in a more efficient use of the material as compared to the first placement when implementing the design according to the third placement (rather than the first placement) results in larger usable areas of the material remaining after processing the design according to the third placement than if the design had been processed according to the first placement. In some embodiments, the third placement of the design on the material comprises one of the first portion or the second portion of the design on the first side of the material and the other of the first portion or the second portion of the design on the second side of the material.

If the material can accommodate the third, more efficient placement of the design on the material, some embodiments of method 1200 additionally include recommending the third placement of the design on the material, for example, by causing display of the third placement of the design on a representation of the material via the graphical user interface, where the representation of the material comprises (a) at least one image of the material and (b) an indication of at least one of the one or more edges of the material. In some embodiments, the third placement includes one or more of (i) positioning the design in a center of the material, (ii) positioning the design in a corner of the material, (iii) positioning the design at a top or bottom of the material, or (iv) packing two or more instances of the design on the material.

If the material cannot accommodate the first placement of the design on the material at block 1206, then method 1200 advances to block 1210, which includes determining whether the material can accommodate a second placement of the design on the material based at least in part on the one or more edges of the material.

If the material can accommodate the second placement of the design on the material based at least in part on the one or more edges of the material at block 1210, then method 1200 advances to block 1212, which includes causing display of the second placement of the design on a representation of the material via the graphical user interface, where the representation of the material comprises (a) at least one image of the material and (b) an indication of at least one of the one or more edges of the material.

If the material cannot accommodate the second placement of the design on the material based at least in part on the one or more edges of the material at block 1210, some embodiments of method 1200 include generating a notification that the material cannot accommodate the design and causing the notification to be displayed via the graphical user interface or otherwise communicated to an operator of the CNC machine.

After causing display of the first placement of the design on the representation of the material vi the graphical user interface at block 1208, some embodiments of method 1200 additionally include, while the design is being moved over a representation of the material via the graphical user interface, causing generation of feedback via the graphical user interface that at least one of (i) encourages moving the design to the third placement or (ii) discourages moving the design away from the third placement. In some embodiments, causing generation of feedback via the graphical user interface that at least one of (i) encourages moving the design to the third placement or (ii) discourages moving the design away from the third placement includes causing a change in at least one of a velocity or friction of movement of the design via the graphical user interface while the design is being moved over the representation of the material via the graphical user interface.

Some embodiments of method 1200 additionally include, for material remaining after the CNC machine has implemented the design on the material, obtaining one or more images of the remaining material via the one or more sensors associated with the CNC machine. And some embodiments additionally include storing in a database (i) an identifier corresponding to the remaining material and (ii) at least one of (a) the one or more images of the remaining material or (b) data associated with the remaining material.

FIG. 13 depicts a flowchart illustrating aspects of an example method 1300 involving edge detection and material margin detection according to some embodiments. In some embodiments, method 1300 is performed by a computing system that includes any one or more of (i) a CNC machine, (ii) a controller device configured to control the CNC machine, and/or (iii) a cloud computing system configured to communicate with the CNC machine and/or the controller device.

In some embodiments, method 1300 is a variation of method 1200 that additionally accounts for material margins. Although additionally accounting for material margins can be more computationally expensive to implement as compared to embodiments that do not account for material margins, additionally accounting for material margins can yield better outcomes in some scenarios by helping to avoid processing of the material by the CNC machine in areas of the material where processing is not recommended or perhaps even prohibited, as explained earlier in detail herein.

Method 1300 begins at block 1302, which is the same as or similar to block 1202 in method 1200. Method block 1302 includes obtaining one or more images of a material that has been placed at least partially within a CNC machine. In operation, the images of the material may be obtained by any of the image capture methods disclosed herein or any other image capture method now known or later developed that is suitable for capturing images of material placed at least partially with a CNC machine. For example, in some embodiments, the one or more images are captured via one or more sensors associated with the CNC machine.

In some embodiments obtaining one or more images of a material that has been placed at least partially within a CNC machine includes (i) after a lid of the CNC machine been closed, and while the material is at least partially within the CNC machine, obtaining a first image of the material via a first camera mounted to the lid of the CNC machine; and (ii) after the CNC machine has moved a second camera via a movable head within the CNC machine to a position over the material based on the first image, obtaining a second image of the material via the second camera.

In some embodiments, obtaining one or more images of a material that has been placed at least partially within a CNC machine includes using a camera mounted to and/or integrated with the inside of the lid of the CNC machine to obtain one or more images of the material after the lid of the CNC machine has been closed. In still other embodiments, obtaining one or more images of a material that has been placed at least partially within a CNC machine includes using the camera mounted to and/or integrated with the inside of the lid of the CNC machine to obtain only a single image of the material after the lid of the CNC machine has been closed.

Next, method 1300 advances to block 1304, which is the same as or similar to block 1204 in method 1200. Block 1304 includes determining one or more edges of the material based on the one or more images of the material. In some embodiments, determining one or more edges of the material based on the one or more images of the material at block 1204 includes determining the one or more edges of the material based on at least one of (i) a first pattern on a surface of the material, (ii) a second pattern present in a working area of the CNC machine, (iii) a height of the material, (iv) a thickness of the material, (v) a two-dimensional shape of the material, or (vi) a three-dimensional shape of the material. In operation, determining one or more edges of the material based on the one or more images of the material may be carried out according to any of the edge detection techniques disclosed herein, including but not limited to: (i) analyzing the one or more images of the material to identify areas of high contrast (e.g., above threshold contrast), which indicates a transition from a presence of the material to an absence of the material; (ii) identifying areas where the material is present based on a corresponding absence of a pattern associated with a material bed in the CNC machine and/or identifying areas where the material is absent based on a corresponding presence of the pattern associated with the material bed on which the material is resting; (iii) detecting the presence and/or absence of a pattern associated with the one or more identifiers, patterns, or other distinguishing items and/or characteristics on the surface of the material; (iv) measuring the height (or thickness) of the material and identifying areas exhibiting an above threshold change in the height (or thickness) of the material; (v) using a machine learning model such as, for example, a neural network trained to perform segmentation on one or more images of the material and differentiate between pixels corresponding to the material and pixels corresponding to the background (e.g., the material bed and/or the like); and/or (vi) any other edge detection techniques now known or later developed that are suitable for detecting edges of a material based on one or more images of the material.

Next, method 1300 advances to block 1306, which includes determining one or more material margins based on the material and the one or more edges of the material. In operation, determining the one or more material margins based the material and the one or more edges of the material at block 1306 may be carried out according to any of the material margin determination techniques disclosed herein, including but not limited to determining the one or more material margins based on at least one of (i) a physical characteristic of the material, (ii) a type of operation to be performed on the material, or (iii) a user input associated with at least one material margin.

At block 1308, method 1300 includes determining whether the material can accommodate the first placement of a design on the material based at least in part on the one or more material margins that were determined at block 1306. In some embodiments, determining whether the material can accommodate the first placement of the design on the material based on the one or more material margins at block 1308 includes determining whether the first placement of the design at least partially overlaps at least one material margin of the one or more material margins.

In some embodiments, determining whether the material can accommodate the first placement of the design on the material based on the one or more material margins at block 1308 includes (i) after obtaining one or more images of the material at a first orientation within the CNC machine, determining whether the material has been moved to a second orientation within the CNC machine, (ii) when the material has been moved from the first orientation to the second orientation, determining a transform based on one or more differences between the first orientation and the second orientation; and (iii) applying the transform to the design to determine whether the material can accommodate the first placement of the design based on the one or more material margins. In some embodiments, determining whether the material has been moved to a second orientation within the CNC machine includes determining whether the material has been moved to a second orientation within the CNC machine based on one or more physical features of the material. In some embodiments, the one or more physical features of the material include at least one of (i) an edge of the material, (ii) a visible marking on the material, (iii) a sticker or decal on the material, and/or (iv) an angle of a material edge.

If the material can accommodate the first placement of the design on the material based at least in part on the one or more material margins at block 1308, then method 1300 advances to block 1310, which includes causing display of the first placement of the design on a representation of the material within a graphical user interface, where the representation of the material comprises (a) at least one image of the material and (b) an indication of at least one of the one or more material margins. In some embodiments, the graphical user interface is a component of one of (i) the CNC machine or (ii) a controller device configured to control one or more operating aspects the CNC machine, e.g., a smartphone, tablet computer, laptop/desktop computer, or similar computing device that executes one or more software programs for controlling and/or operating the CNC machine.

In some embodiments, when the material can accommodate the first placement of the design on the material based at least in part on the one or more material margins at block 1308, method 1300 additionally or alternatively includes determining whether the material can accommodate a third placement of the design on the material, where the third placement, if implemented, would result in more efficient use of the material as compared to the first placement. For example, the third placement may result in a more efficient use of the material as compared to the first placement when implementing the design according to the third placement (rather than the first placement) results in larger usable areas of the material remaining after processing the design according to the third placement than if the design had been processed according to the first placement. In some embodiments, the third placement of the design on the material includes placing one of the first portion or the second portion of the design on the first side of the material and placing the other of the first portion or the second portion of the design on the second side of the material.

And if the material can accommodate the third, more efficient placement of the design on the material, some embodiments of method 1300 additionally include recommending the third placement of the design on the material. In some embodiments, recommending the third placement of the design on the material includes causing display of the third placement of the design on a representation of the material via the graphical user interface, where the representation of the material comprises (a) at least one image of the material and (b) an indication of at least one of the one or more material margins. In some embodiments, the third placement includes one or more of (i) positioning the design in a center of the material, (ii) positioning the design in a corner of the material, (iii) positioning the design at a top or bottom of the material, or (iv) packing two or more instances of the design on the material.

But if the material cannot accommodate the first placement of the design on the material at block 1308, then method 1308 advances to block 1312, which includes determining whether the material can accommodate a second placement of the design on the material based at least in part on the one or more material margins. In some embodiments, determining whether the material can accommodate at least one second placement of the design on the material based on the one or more material margins at block 1312 includes determining at least one second placement of the design that does not overlap any material margin of the one or more material margins.

If the material can accommodate the second placement of the design on the material based at least in part on the one or more material margins at block 1312, then method 1300 advances to block 1314, which includes causing display of the second placement of the design on a representation of the material via the graphical user interface, wherein the representation of the material comprises (a) at least one image of the material and (b) an indication of at least one of the one or more material margins.

But if the material cannot accommodate the second placement of the design on the material based at least in part on the one or more material margins at block 1312, some embodiments of method 1300 include generating a notification that the material cannot accommodate the design and causing the notification to be displayed via the graphical user interface or otherwise communicated to an operator of the CNC machine.

After causing display of the first placement of the design on the representation of the material via the graphical user interface at block 1310, some embodiments of method 1300 additionally include, while the design is being moved over a representation of the material via the graphical user interface, causing generation of feedback via the graphical user interface that at least one of (i) encourages moving the design to the third placement or (ii) discourages moving the design away from the third placement. In some embodiments, causing generation of feedback via the graphical user interface that at least one of (i) encourages moving the design to the third placement or (ii) discourages moving the design away from the third placement includes causing a change in at least one of a velocity or friction of movement of the design via the graphical user interface while the design is being moved over the representation of the material via the graphical user interface.

Some embodiments of method 1300 additionally include, for material remaining after the CNC machine has implemented the design on the material, obtaining one or more images of the remaining material via the one or more sensors associated with the CNC machine. And some embodiments additionally include storing in a database (i) an identifier corresponding to the remaining material and (ii) at least one of (a) the one or more images of the remaining material or (b) data associated with the remaining material.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. Tangible, non-transitory computer-readable media comprising program instructions stored therein, wherein the program instructions, when executed by one or more processors, cause a computing system to perform functions comprising:

obtaining one or more images of a material that has been placed at least partially within a computer numerical control (CNC) machine, wherein the one or more images are captured via one or more sensors associated with the CNC machine;

determining one or more edges of the material based on the one or more images of the material;

determining one or more material margins based on hardness and/or density of the material;

determining whether (i) the material can accommodate a user's first placement of a design on the material based at least in part on the one or more edges of the material and the one or more material margins or (ii) the material cannot accommodate the user's first placement of the design on the material based at least in part on the one or more edges of the material and the one or more material margins;

after determining that the material can accommodate the user's first placement of the design on the material based at least in part on the one or more edges of the material and the one or more material margins, causing display of the first placement of the design on a representation of the material within a graphical user interface, wherein the representation of the material comprises (a) at least one image of the material and (b) an indication of at least one of the one or more edges of the material;

after determining that the material cannot accommodate the user's first placement of the design on the material, determining whether the material can accommodate a second placement of the design on the material based at least in part on the one or more edges of the material and the one or more material margins; and when the material can accommodate the second placement of the design on the material based at least in part on the one or more edges of the material, causing display of the second placement of the design on a representation of the material via the graphical user interface, wherein the representation of the material comprises (a) at least one image of the material and (b) an indication of at least one of the one or more edges of the material.

2. The tangible, non-transitory computer-readable media of claim 1, wherein the functions further comprise, when the material can accommodate the user's first placement of the design, additionally:

determining whether the material can accommodate a third placement of the design on the material, wherein the third placement, if implemented, would result in more efficient use of the material as compared to the user's first placement.

3. The tangible, non-transitory computer-readable media of claim 2, wherein the functions further comprise recommending the third placement of the design on the material, wherein recommending the third placement of the design on the material comprises:

causing display of the third placement of the design on a representation of the material via the graphical user interface, wherein the representation of the material comprises (a) at least one image of the material and (b) an indication of at least one of the one or more edges of the material.

4. The tangible, non-transitory computer-readable media of claim 2, wherein the functions further comprise:

while the design is being moved over a representation of the material via the graphical user interface, causing generation of feedback via the graphical user interface that at least one of (i) encourages moving the design to the third placement or (ii) discourages moving the design away from the third placement.

5. The tangible, non-transitory computer-readable media of claim 4, wherein causing generation of feedback via the graphical user interface that at least one of (i) encourages moving the design to the third placement or (ii) discourages moving the design away from the third placement comprises:

causing a change in at least one of a velocity or friction of movement of the design via the graphical user interface while the design is being moved over the representation of the material via the graphical user interface.

6. The tangible, non-transitory computer-readable media of claim 2, wherein the third placement comprises one or more of (i) positioning the design in a center of the material, (ii) positioning the design in a corner of the material, (iii) positioning the design at a top or bottom of the material, or (iv) packing two or more instances of the design on the material.

7. The tangible, non-transitory computer-readable media of claim 2, wherein the user's first placement of the design on the material comprises a first portion of the design on a first side of the material and a second portion of the design on a second side of the material, and wherein the third placement of the design on the material comprises one of the first portion or the second portion of the design on the first side of the material and the other of the first portion or the second portion of the design on the second side of the material.

8. The tangible, non-transitory computer-readable media of claim 1, wherein obtaining or more images of a material that has been placed at least partially within a computer numerical control (CNC) machine, wherein the one or more images are captured via one or more sensors associated with the CNC machine comprises:

after a lid of the CNC machine been closed, and while the material is at least partially within the CNC machine, obtaining a first image of the material via a first camera mounted to the lid of the CNC machine; and after the CNC machine has moved a second camera via a movable head within the CNC machine to a position over the material based on the first image, obtaining a second image of the material via the second camera.

9. The tangible, non-transitory computer-readable media of claim 1, wherein determining one or more edges of the material based on the one or more images of the material comprises:

determining the one or more edges of the material based on at least one of (i) a first pattern on a surface of the material, (ii) a second pattern present in a working area of the CNC machine, (iii) a height of the material, (iv) a thickness of the material, (v) a two-dimensional shape of the material, or (vi) a three-dimensional shape of the material.

10. The tangible, non-transitory computer-readable media of claim 1, wherein when one or more portions of the material are obscured by one or more structures arranged to secure the material during processing of the material by the CNC machine, determining one or more edges of the material based on the one or more images of the material comprises:

considering the one or more structures when determining the one or more edges of the material when the CNC machine cannot process the one or more structures when processing the material; and ignoring the one or more structures when determining the one or more edges of the material when the CNC machine is able to process the one or more structures when processing the material.

11. The tangible, non-transitory computer-readable media of claim 1, wherein the determining of the one or more material margins further comprises:

determining the one or more material margins based on at least one of (i) a type of operation to be performed on the material, or (ii) a user input associated with at least one material margin.

12. The tangible, non-transitory computer-readable media of claim 1, wherein determining whether the material can accommodate a user's first placement of a design on the material based on the one or more material margins comprises determining whether the user's first placement of the design at least partially overlaps at least one material margin of the one or more material margins; and wherein determining whether the material can accommodate at least one second placement of the design on the material based on the one or more material margins comprises determining at least one second placement of the design that does not overlap any material margin of the one or more material margins.

13. The tangible, non-transitory computer-readable media of claim 1, wherein determining whether the material can accommodate a user's first placement of a design on the material based on the one or more material margins comprises:

after obtaining one or more images of the material at a first orientation within the CNC machine, determining whether the material has been moved to a second orientation within the CNC machine;

when the material has been moved from the first orientation to the second orientation, determining a transform based on one or more differences between the first orientation and the second orientation; and applying the transform to the design to determine whether the material can accommodate the user's first placement of the design based on the one or more material margins.

14. The tangible, non-transitory computer-readable media of claim 13, wherein determining whether the material has been moved to a second orientation within the CNC machine comprises determining whether the material has been moved to a second orientation within the CNC machine based on one or more physical features of the material.

15. The tangible, non-transitory computer-readable media of claim 14, wherein the one or more physical features of the material comprise at least one of (i) an edge of the material, (ii) a visible marking on the material, or (iii) an angle of a material edge.

16. The tangible, non-transitory computer-readable media of claim 1, wherein the functions further comprise:

when the material cannot accommodate any placement of the design on the material based on the one or more material margins, causing display of a notification via the graphical user interface that the material cannot accommodate the design.

17. The tangible, non-transitory computer-readable media of claim 1, wherein the functions further comprise, for material remaining after the CNC machine has implemented the design on the material:

obtaining one or more images of the remaining material via at least one of the one or more sensors associated with the CNC machine; and storing in a database (i) an identifier corresponding to the remaining material and (ii) at least one of (a) the one or more images of the remaining material or (b) data associated with the remaining material.

18. The tangible, non-transitory computer-readable media of claim 1, wherein the computing system comprises one of (i) the CNC machine, (ii) a controller device configured to control the CNC machine, or (iii) a cloud computing system configured to communicate with one or both of the CNC machine or the controller device; and wherein the graphical user interface is a component of one of (i) the CNC machine or (ii) a controller device configured to control the CNC machine.

* * * * *